(12) United States Patent
Dedonato et al.

(10) Patent No.: US 11,423,624 B2
(45) Date of Patent: Aug. 23, 2022

(54) MAPPING AND LOCALIZATION OF A PASSABLE WORLD

(71) Applicant: Magic Leap, Inc., Plantation, FL (US)

(72) Inventors: Amy Dedonato, Maumee, OH (US); James Cameron Petty, Pleasant Hill, CA (US); Griffith Buckley Hazen, San Francisco, CA (US); Jordan Alexander Cazamias, Menlo Park, CA (US); Karen Stolzenberg, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/098,855

(22) Filed: Nov. 16, 2020

(65) Prior Publication Data

US 2021/0150818 A1 May 20, 2021

Related U.S. Application Data

(60) Provisional application No. 62/968,751, filed on Jan. 31, 2020, provisional application No. 62/937,056, filed on Nov. 18, 2019.

(51) Int. Cl.
*G06T 19/00* (2011.01)
*G06T 15/06* (2011.01)
(Continued)

(52) U.S. Cl.
CPC .......... *G06T 19/006* (2013.01); *G06T 13/20* (2013.01); *G06T 15/06* (2013.01); *G06T 19/003* (2013.01); *G06V 20/20* (2022.01); *G06T 2210/21* (2013.01)

(58) Field of Classification Search
CPC ....... G06T 19/006; G06T 15/06; G06T 13/20; G06T 19/003; G06T 2210/21;
(Continued)

(56) References Cited

U.S. PATENT DOCUMENTS 6,111,852 A 8/2000 Jenkins
6,525,729 B1 * 2/2003 Akerman ................ G06T 15/06
345/422

(Continued)

FOREIGN PATENT DOCUMENTS

WO WO 2015/192117 12/2015
WO WO 2018/224847 12/2018

OTHER PUBLICATIONS

International Search Report and Written Opinion for PCT Application No. PCT/US 20/60762, dated Feb. 17, 2021.
(Continued)

*Primary Examiner* — Motilewa Good-Johnson
(74) *Attorney, Agent, or Firm* — Knobbe, Martens, Olson & Bear, LLP

(57) ABSTRACT

An augmented reality (AR) device can be configured to generate a virtual representation of a user's physical environment. The AR device can capture images of the user's physical environment to generate or identify a user's location. The AR device can project graphics at designated locations within the user's environment to guide the user to capture images of the user's physical environment. The AR device can provide visual, audible, or haptic guidance to direct the user of the AR device to explore the user's environment.

10 Claims, 45 Drawing Sheets

(51) Int. Cl.
*G06T 13/20* (2011.01)
*G06V 20/20* (2022.01)

(58) Field of Classification Search
CPC .............. G06K 9/00671; G06K 9/6272; G06K 9/00597; G06F 3/012; G06F 3/011
See application file for complete search history.

(56) References Cited

U.S. PATENT DOCUMENTS

| | | | |
|---|---|---|---|
| 6,850,221 B1 | 2/2005 | Tickle | |
| 8,442,306 B2* | 5/2013 | Garaas | G06T 17/05 382/154 |
| D704,734 S | 5/2014 | Wafapoor | |
| 9,081,426 B2 | 7/2015 | Armstrong | |
| 9,215,293 B2 | 12/2015 | Miller | |
| D756,401 S | 5/2016 | Soldner et al. | |
| 9,348,143 B2 | 5/2016 | Gao et al. | |
| D762,673 S | 8/2016 | Seo et al. | |
| D763,309 S | 8/2016 | Seo et al. | |
| 9,417,452 B2 | 8/2016 | Schowengerdt et al. | |
| D769,930 S | 10/2016 | Agrawal | |
| 9,470,906 B2 | 10/2016 | Kaji et al. | |
| 9,547,174 B2 | 1/2017 | Gao et al. | |
| D788,785 S | 6/2017 | Flood et al. | |
| D788,807 S | 6/2017 | Broughton et al. | |
| D790,588 S | 6/2017 | Bebbington et al. | |
| 9,671,566 B2 | 6/2017 | Abovitz et al. | |
| D793,422 S | 8/2017 | Gagnier et al. | |
| 9,733,824 B2 | 8/2017 | Brown et al. | |
| 9,740,006 B2 | 8/2017 | Gao | |
| D801,382 S | 10/2017 | Seo et al. | |
| 9,791,700 B2 | 10/2017 | Schowengerdt et al. | |
| D806,118 S | 12/2017 | Durrant et al. | |
| 9,851,563 B2 | 12/2017 | Gao et al. | |
| D807,913 S | 1/2018 | Lee et al. | |
| 9,857,591 B2 | 1/2018 | Welch et al. | |
| 9,874,749 B2 | 1/2018 | Bradski | |
| D830,384 S | 10/2018 | Lepine et al. | |
| D845,992 S | 4/2019 | Davis et al. | |
| D852,209 S | 6/2019 | Wei | |
| D857,046 S | 8/2019 | Huang et al. | |
| D857,048 S | 8/2019 | Anzures et al. | |
| D860,234 S | 9/2019 | Li et al. | |
| D868,103 S | 11/2019 | Lewis et al. | |
| D868,812 S | 12/2019 | Schwer et al. | |
| D873,285 S | 1/2020 | Pazmino et al. | |
| D873,845 S | 1/2020 | Keyzer et al. | |
| D873,852 S | 1/2020 | Pazmino et al. | |
| 10,534,962 B2* | 1/2020 | Hovden | G06T 17/00 |
| D882,615 S | 4/2020 | Dye et al. | |
| D884,012 S | 5/2020 | Krenkler et al. | |
| D884,722 S | 5/2020 | Kim | |
| D884,723 S | 5/2020 | Stutts et al. | |
| D884,737 S | 5/2020 | Tran et al. | |
| D886,854 S | 6/2020 | Pazmino et al. | |
| 10,699,481 B2* | 6/2020 | Spring | G06T 19/00 |
| D889,500 S | 7/2020 | Lee et al. | |
| D889,509 S | 7/2020 | Choi | |
| 10,708,507 B1* | 7/2020 | Dawson | G06F 3/011 |
| D892,849 S | 8/2020 | Sharma | |
| D892,854 S | 8/2020 | Yoo et al. | |
| D893,523 S | 8/2020 | Pazmino et al. | |
| D893,537 S | 8/2020 | Cho et al. | |
| D894,222 S | 8/2020 | Nesladek et al. | |
| D895,659 S | 9/2020 | Guzman et al. | |
| D896,254 S | 9/2020 | Lin et al. | |
| D896,262 S | 9/2020 | Broughton et al. | |
| D897,369 S | 9/2020 | Zurmoehle et al. | |
| 10,809,066 B2* | 10/2020 | Colburn | G06T 17/10 |
| 10,834,317 B2* | 11/2020 | Shan | H04N 7/185 |
| 10,930,057 B2* | 2/2021 | Dougherty | G06K 9/00201 |
| 10,937,235 B2* | 3/2021 | Dougherty | G06T 17/20 |
| 10,937,247 B1* | 3/2021 | Chuah | G01C 21/3848 |
| 11,024,079 B1* | 6/2021 | Chuah | G06T 17/00 |
| 11,057,561 B2* | 7/2021 | Boyadzhiev | H04N 5/23222 |
| 11,095,869 B2* | 8/2021 | Holzer | H04N 13/189 |
| 11,107,280 B1* | 8/2021 | Clohset | G06F 3/017 |
| D940,189 S | 1/2022 | DeDonato et al. | |
| D940,748 S | 1/2022 | DeDonato et al. | |
| D940,749 S | 1/2022 | DeDonato et al. | |
| D941,353 S | 1/2022 | DeDonato et al. | |
| 2006/0028436 A1 | 2/2006 | Armstrong | |
| 2007/0081123 A1 | 4/2007 | Lewis | |
| 2010/0007582 A1* | 1/2010 | Zalewski | H04N 13/383 345/8 |
| 2011/0035199 A1* | 2/2011 | Kristofik | G06F 30/20 703/6 |
| 2011/0169830 A1* | 7/2011 | D'Amora | G06T 15/08 345/424 |
| 2012/0127062 A1 | 5/2012 | Bar-Zeev et al. | |
| 2012/0162549 A1 | 6/2012 | Gao et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0267420 A1 | 9/2014 | Schowengerdt | |
| 2014/0306866 A1 | 10/2014 | Miller et al. | |
| 2015/0016777 A1 | 1/2015 | Abovitz et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0268415 A1 | 9/2015 | Schowengerdt et al. | |
| 2015/0302652 A1 | 10/2015 | Miller et al. | |
| 2015/0309263 A2 | 10/2015 | Abovitz et al. | |
| 2015/0326570 A1 | 11/2015 | Publicover et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026242 A1* | 1/2016 | Burns | G02B 27/017 345/633 |
| 2016/0026253 A1* | 1/2016 | Bradski | H04N 13/167 345/8 |
| 2016/0148433 A1* | 5/2016 | Petrovskaya | G02B 27/01 345/633 |
| 2017/0328725 A1 | 11/2017 | Schlesinger et al. | |
| 2018/0137373 A1 | 5/2018 | Rasmusson, Jr. et al. | |
| 2018/0144547 A1* | 5/2018 | Shakib | G06T 15/60 |
| 2018/0323972 A1* | 11/2018 | Reed | G02B 27/017 |
| 2019/0121364 A1 | 4/2019 | Tsai et al. | |
| 2019/0179509 A1* | 6/2019 | Daie | G06F 3/0485 |
| 2019/0392643 A1* | 12/2019 | Busto | G06K 9/00604 |
| 2020/0034624 A1* | 1/2020 | Sharma | G06F 1/1686 |
| 2020/0213527 A1 | 7/2020 | Bleyer et al. | |
| 2020/0410751 A1* | 12/2020 | Omari | G06F 16/29 |

OTHER PUBLICATIONS

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapei Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pd.

Jacob, "Eye Tracking in Advanced Interface Design," Human-Computer Interaction Lab Naval Research Laboratory, Washington, D.C. / paper/ in Virtual Environments and Advanced interface Design, ed. by W. Barfield and T.A. Furness, pp. 258-288, Oxford University Press, New York (1995).

(56) References Cited

OTHER PUBLICATIONS

Tanriverdi and Jacob "interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

Amazon.com_Painted Sphere—Icon Pack, https://www.amazon.com/Cantallupe-Painted-Sphere-Icon-Pack/dp/B01C89UKJ6 (Year: 2016) in 2 pages.

Circle animation—with particles, https://www.youtube.com/watch?v=oeDZg6tqQ0A (Year: 2016) in 1 page.

Circle particle, logo reveal intro, https://www.youtube.com/watch?v=CTuX0G8TPIw (Year 2016) in 1 page.

Dusty Particle Sphere—Martinius, https://dribble.com/shots/2649284-Dusty-Partcle-Sphere?utm_source=Pinterest_Shot&utm_campaign=TaminoMartinius&utm_content=Dusty%20Particle%20Sphere&utm_medium=Social_Share (Year: 2016) in 2 pages.

Green ball logo, https://favpng.com/png_view/curves-vector-circle-png/dFdeaS1p (Year: 2017.

How to make sci-fi particle effects in blender—Iridesium, https://www.youtube.com/watch?v=dMf-PHxSrho (Year: 2018) in 1 page.

Particle circle—Neverdraw, https://www.youtube.com/watch?v=6ZyMXUE5F3o (Year: 2017) in 1 page.

Particle circle color—Samir, https://www.youtube.com/watch?v=FsMCd-6DwYA (Year: 2013).

Particle Explosion—Sergio, https://dribble.com/shots/4209296-Particle-Explosion (Year: 2018) in 2 pages.

Particle sphere hd—Serrano, https://www.youtube.com/watch?v=ITw5H54CNxo (Year 2013) in 1 page.

Sphere animation using trapcode form, https://www.youtube.com/watch?v=TYcM7baCN-o (Year: 2019) in 1 page.

Sphere call vector—pikepicture, https://depositphotos.com/251655426/stock-illustration-sphere-ball-vector-orb-shining.html (Year: 2018) ub 1 page.

Yarn ball icon, https://iconscout.com/icon/yarn-ball-1853170 (Year: 2019).

\* cited by examiner

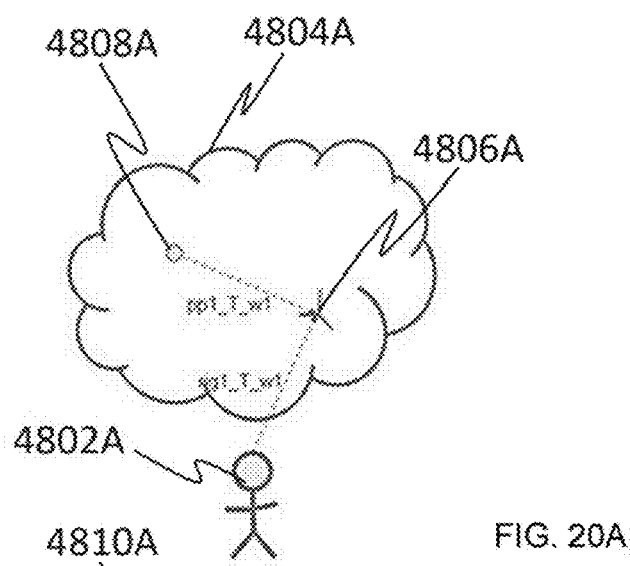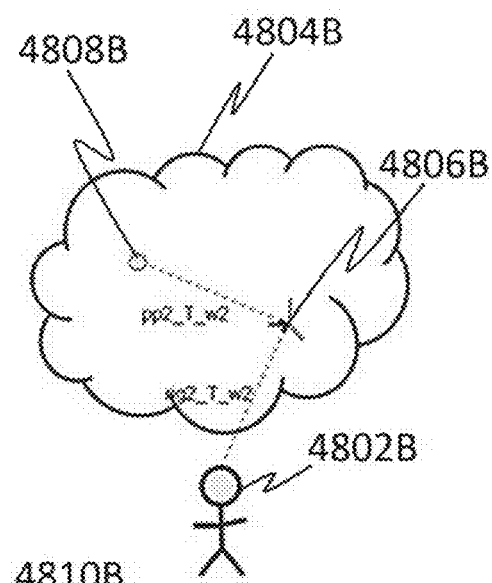
FIG. 20A
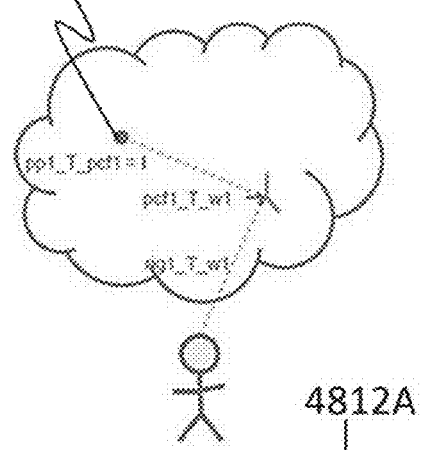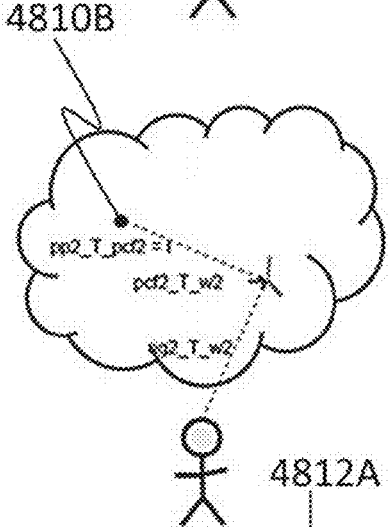
FIG. 20B
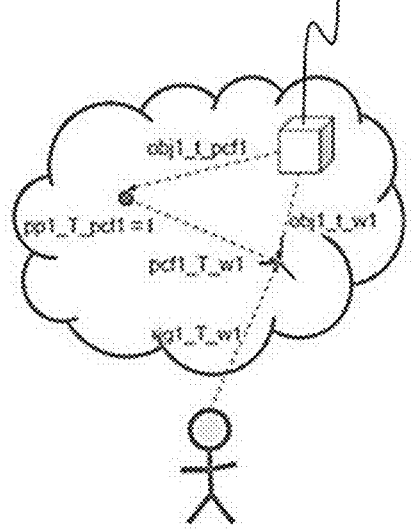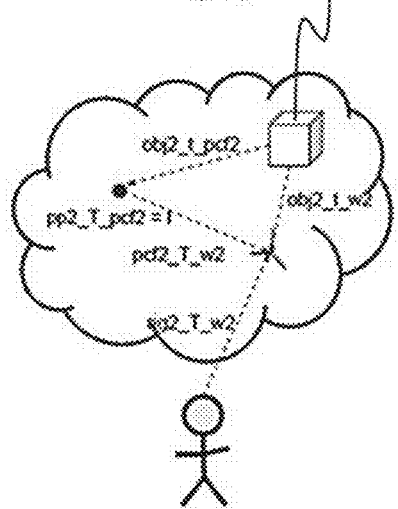
FIG. 20C

Personal World Options

| | Configuration 2 | Configuration 3 | Configuration 4 | Configuration 5 |
|---|---|---|---|---|
| World Features | On Device<br>◉ Personal World<br>Shared World | On Device<br>◉ Personal World<br>Shared World | On Device<br>◉ Personal World<br>Shared World | On Device<br>◉ Personal World<br>Shared World |
| World Models | ◉ On Device<br>Personal World<br>*Shared World* | ◉ On Device<br>Personal World<br>*Shared World* | ◉ On Device<br>Personal World<br>*Shared World* | ◉ On Device<br>Personal World<br>*Shared World* |
| World Understanding | OFF ◉ ON | OFF ◉ ON | *OFF* ◉ ON | *OFF* ◉ ON — Objects stored on Personal World |

KEY
◉ Visible and Selected
○ Visible and Selectable
*Visible, but NOT Selectable (No Known State)*

FIG. 24B-2

Shared World Options

| | Configuration 6 | Configuration 7 | Configuration 8 | Configuration 9 |
|---|---|---|---|---|
| World Features | On Device<br>Personal World<br>◉ Shared World | On Device<br>Personal World<br>◉ Shared World | On Device<br>Personal World<br>◉ Shared World | On Device<br>Personal World<br>◉ Shared World |
| World Models | ◉ On Device<br>*Personal World*<br>Shared World | On Device<br>*Personal World*<br>◉ Shared World | ◉ On Device<br>*Personal World*<br>Shared World | On Device<br>*Personal World*<br>◉ Shared World |
| World Understanding | OFF ◉ *ON* | OFF ◉ *ON* | *OFF* ◉ ON | *OFF* ◉ ON<br>Objects stored on Shared World |

KEY
◉ Visible and Selected
Visible and Selectable
*Visible, But NOT Selectable (No Hover State)*

FIG. 24B-3

MAPPING AND LOCALIZATION OF A PASSABLE WORLD

CROSS-REFERENCE TO RELATED APPLICATION(S)

This application claims the benefit of priority to U.S. Patent App. No. 62/937,056 entitled "MAPPING AND LOCALIZATION OF A PASSABLE WORLD," filed Nov. 18, 2019 and U.S. Patent App. No. 62/968,751 entitled "MAPPING AND LOCALIZATION OF A PASSABLE WORLD," filed Jan. 31, 2020. This application is related to U.S. patent application Ser. No. 14/690,401 entitled "SYSTEMS AND METHOD FOR AUGMENTED AND VIRTUAL REALITY," filed on Apr. 18, 2015. This application is further related to U.S. patent application Ser. No. 15/859,277 entitled "SYSTEMS AND METHODS FOR AUGMENTED REALITY," filed on Dec. 29, 2017, and U.S. Pat. No. 9,767,616, entitled "RECOGNIZING OBJECTS IN A PASSABLE WORLD MODEL IN AN AUGMENTED OR VIRTUAL REALITY SYSTEM," filed May 8, 2015. This application is further related to U.S. patent application Ser. No. 16/448,743 entitled "WAYPOINT CREATION IN MAP DETECTION," filed Jun. 21, 2019. This application is further related to U.S. Design patent application Ser. No. 29/716368, entitled "PORTION OF A DISPLAY SCREEN WITH GUIDING GRAPHICS," filed Dec. 9, 2019. This application is further related to U.S. Design patent application Ser. No. 29/716361, entitled "PORTION OF A DISPLAY SCREEN WITH GUIDING GRAPHICS," filed Dec. 9, 2019. This application is further related to U.S. Design patent application Ser. No. 29/716375, entitled "PORTION OF A DISPLAY SCREEN WITH GUIDING GRAPHICS," filed Dec. 9, 2019. This application is further related to U.S. Design patent application Ser. No. 29/716363, entitled "PORTION OF A DISPLAY SCREEN WITH GUIDING GRAPHICS," filed Dec. 9, 2019. This application is further related to U.S. Design patent application Ser. No. 29/716367, entitled "PORTION OF A DISPLAY SCREEN WITH GUIDING GRAPHICS," filed Dec. 9, 2019. This application is further related to U.S. Design patent application Ser. No. 29/716364, entitled "PORTION OF A DISPLAY SCREEN WITH GUIDING GRAPHICS," filed Dec. 9, 2019. The contents of the aforementioned patent documents are hereby expressly incorporated by reference herein in their entireties.

FIELD

The present disclosure generally relates to systems and methods to facilitate interactive virtual or augmented reality environments for one or more users.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR, and MR technology.

SUMMARY

Embodiments of the present disclosure are directed to devices, systems, and methods for facilitating virtual or augmented reality interaction for one or more users.

Further details of features, objects, and advantages of the disclosure are described below in the detailed description, drawings, and claims. Both the foregoing general description and the following detailed description are exemplary and explanatory and are not intended to be limiting as to the scope of the disclosure.

In some examples, an augmented reality (AR) system can include an AR display configured to present virtual content to a user of the AR system; an outward facing camera configured to capture one or more images of an environment of the user, wherein a portion of the environment of the user visible to the user comprises the Field of View (FOV) of the user; and a hardware processor in communication with the AR display and the outward facing camera, the hardware processor programmed to: generate a plurality of raycasts from a point of origin comprising a location associated with the head of the user; analyze the plurality of raycasts to identify a raycast associated with an unmapped location of the environment; update the virtual content to include a graphic associated with the unmapped location; collect data associated with the environment of the user; and in response to collecting sufficient data associated with the unmapped location, signal to the user that data was successfully collected.

In some examples, an augmented reality (AR) system can include an AR display configured to present virtual content to a user of the AR system; an outward facing camera configured to capture one or more images of an environment of the user, wherein a portion of the environment of the user visible to the user comprises the Field of View (FOV) of the user; and a hardware processor in communication with the AR display and the outward facing camera, the hardware processor programmed to: receive a user selection of a map; generate a plurality of raycasts from a point of origin comprising a location associated with the head of the user; analyze the plurality of raycasts to identify a raycast associated with an unmapped location of the environment; update the virtual content to include a graphic associated with the unmapped location; direct the user to observe the graphic; collect data associated with the environment of the user; in response to collecting sufficient data associated with the unmapped location, signal to the user that data was successfully collected; and in response to determining that at least one marker within the collected data correspond to at least one marker in the map, displaying virtual reality content associated with the map; or in response to determining that no marker in the collected data corresponds to a marker in the map, repeating said updating, directing, collecting, and signaling for another unmapped location.

In some examples, a method of creating or updating an augmented reality map of a user environment, the method performed by a computing system having one or more hardware computer processors and one or more non-transitory computer readable storage device storing software instructions executable by the computing system to perform the computerized method comprising: obtaining distance data from each of a plurality of directions around a user, the distance data indicating distances at which physical objects are detected in the respective direction; creating a ranked list of the waypoints associated with distance data having distances exceeding a threshold distance, wherein a waypoint associated with a largest distance is first in the ranked list; displaying a graphic positioned with reference to the highest ranked waypoint for viewing on an augmented reality (AR) device worn by a user, the graphic configured to direct the user to an area of the user environment wherein the augmented reality map is incomplete; detecting movement of the user that allows collection of data by the AR device associated with waypoint; determining whether additional waypoints in the ranked list remain; in response to determining that additional waypoints remain in the ranked list, performing said displaying, detecting, and determining with the next highest ranked waypoint.

In some examples, an augmented reality (AR) system can include: an AR display configured to present virtual content to a user of the AR system; an outward facing camera configured to capture one or more images of a three-dimensional (3D) environment of the user; and a hardware processor in communication with the AR display and the outward facing camera, the hardware processor can be programmed to: receive an invitation to access a shared map; facilitate user access to the shared map; guide the user to observe the 3D environment of the user; collect data associated with the 3D environment of the user; and load content associated with the shared map if data associated with the shared map is found in the 3D environment of the user.

In some examples, an augmented reality (AR) system can include: an AR display configured to present virtual content to a user of the AR system; an outward facing camera configured to capture one or more images of a three-dimensional (3D) environment of the user; and a hardware processor in communication with the AR display and the outward facing camera, the hardware processor can be programmed to: receive user input to update a map; guide the user to observe the 3D environment of the user; collect data associated with the 3D environment of the user; determine a map quality index associated with the map; display an indication of the map quality index on the AR display; update the map based on the collected data; and stop guiding the user in response to identifying a stopping condition comprising a user input to stop or a determination that the map quality index passes a threshold.

BRIEF DESCRIPTION OF THE DRAWINGS

Throughout the drawings, reference numbers are re-used to indicate correspondence between referenced elements. The following drawings and the associated descriptions are provided to illustrate embodiments of the present disclosure and do not limit the scope of the claims.

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosure briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which:

FIGS. 20A to 20C are schematic diagrams illustrating an example of creating PCFs, according to some embodiments.

FIGS. 24B-1, 24B-2, and 24B-3 illustrate various examples of map permissions and/or storage configurations.

DETAILED DESCRIPTION

A. Introduction

Virtual and augmented reality environments are generated by computers using, in part, data that describes the environment. This data may describe, for example, various objects with which a user may sense and interact with. Examples of these objects include objects that are rendered and displayed for a user to see, audio that is played for a user to hear, and tactile (or haptic) feedback for a user to feel. Users may sense and interact with the virtual and augmented reality environments through a variety of visual, auditory, and tactile means.

Virtual or augmented reality (AR) systems may be useful for many applications, spanning the fields of scientific visualization, medicine and military training, engineering design and prototyping, tele-manipulation and tele-presence, and personal entertainment. Augmented reality, in contrast to virtual reality, comprises one or more virtual objects in relation to real objects of the physical world. Such an experience greatly enhances the user's experience and enjoyability with the augmented reality system, and also opens the door for a variety of applications that allow the user to experience real objects and virtual objects simultaneously.

However, there are significant challenges in providing such a system. To provide a realistic augmented reality experience to users, the AR system should always know the user's physical surroundings in order to correctly correlate a location of virtual objects in relation to real objects. Further, the AR system should correctly know how to position virtual objects in relation to the user's head, body etc. This requires extensive knowledge of the user's position in relation to the world at all times. Additionally, these functions advantageously should be performed in a manner such that costs (e.g., energy costs, etc.) are kept low while speed and performance are maintained.

There, thus, is a need for improved systems to provide a realistic augmented reality experience to users.

B. Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be a head-mounted device (HMD) which is used interchangeably as an AR device (ARD). Further, for the purpose of the present disclosure, the term "AR" is used interchangeably with the term "MR".

Figure 1:
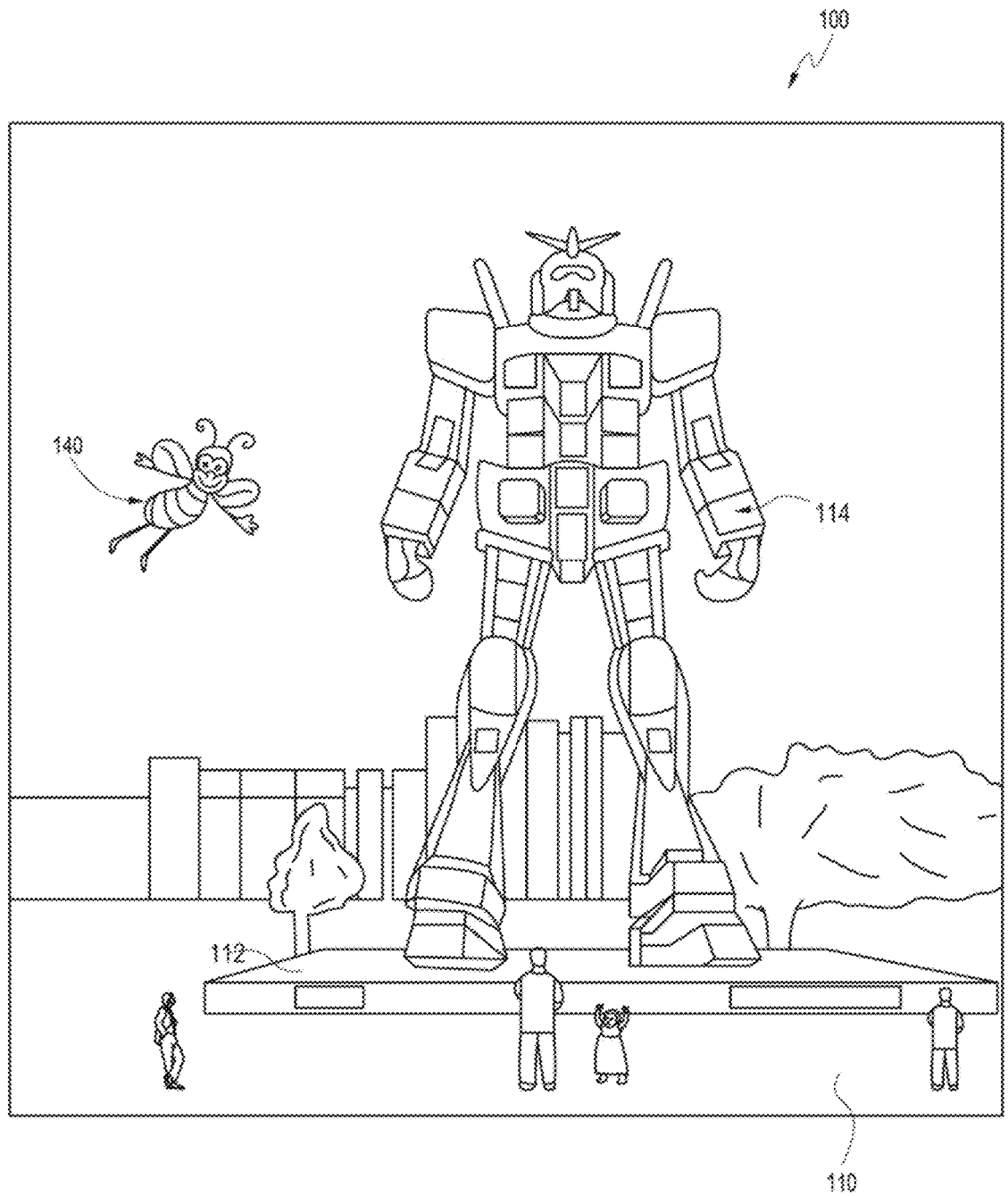
FIG. 1 depicts an illustration of a mixed reality scenario with certain virtual reality objects, and certain physical objects viewed by a person.

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 112. In addition to these items, the user of the MR technology also perceives that he "sees" a robot statue 114 standing upon the real-world platform 112, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
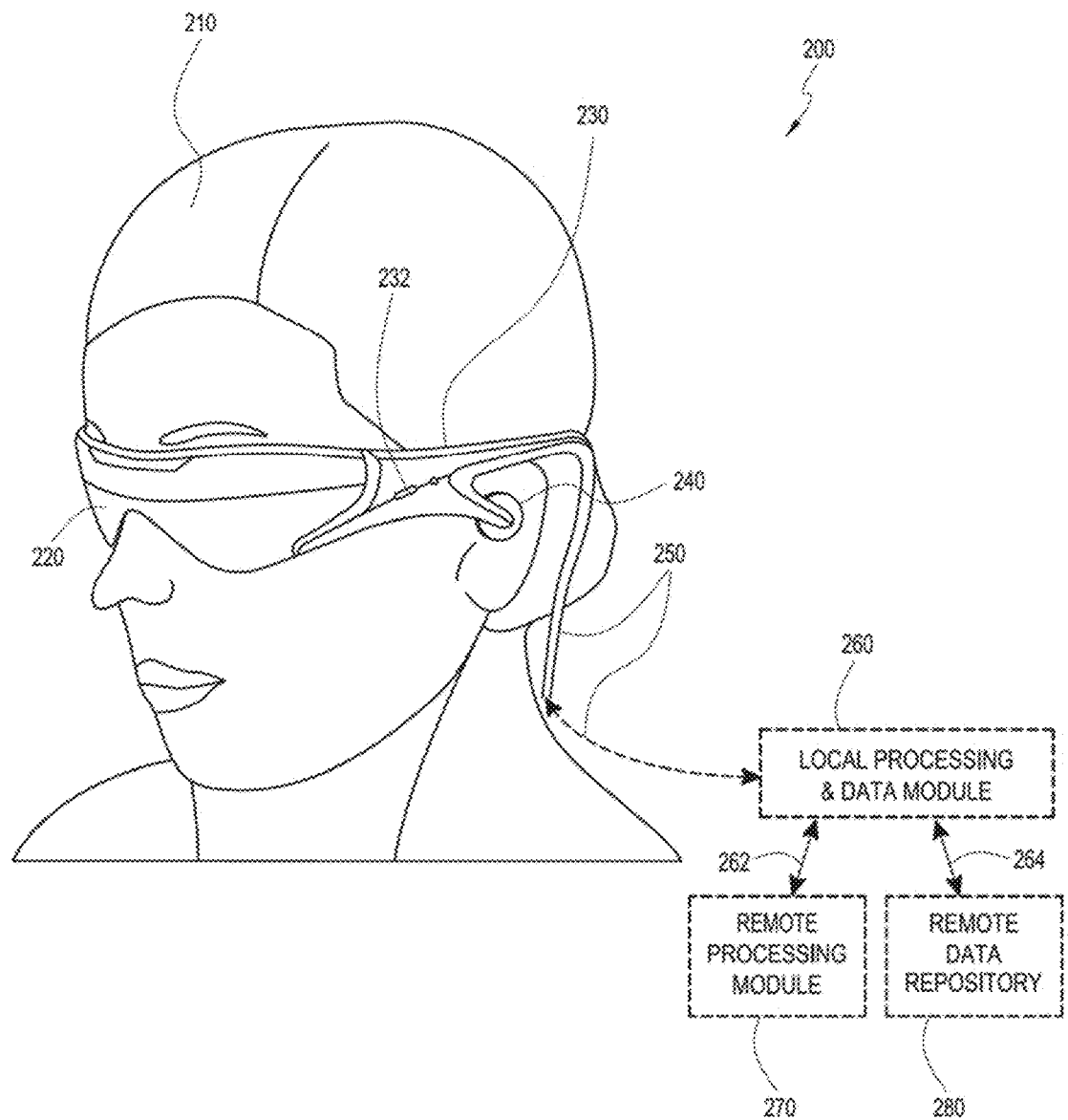
FIG. 2 schematically illustrates an example of a wearable system which can implement an example waypoint system.

FIG. 2 illustrates an example of wearable system 200 which can be configured to provide an AR/VR/MR scene and can include an example waypoint system described herein. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display that is worn on the head of the user. In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. One or more other audio sensors, not shown, can be positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 270 and remote data repository 280 may be operatively coupled to each other.

The remote processing module 270 can include one or more processors configured to analyze and process data or image information. The remote data repository 280 can include a digital data storage facility, which may be available through the internet or other networking configuration in a "cloud" resource configuration. Data can be stored, and computations can be performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
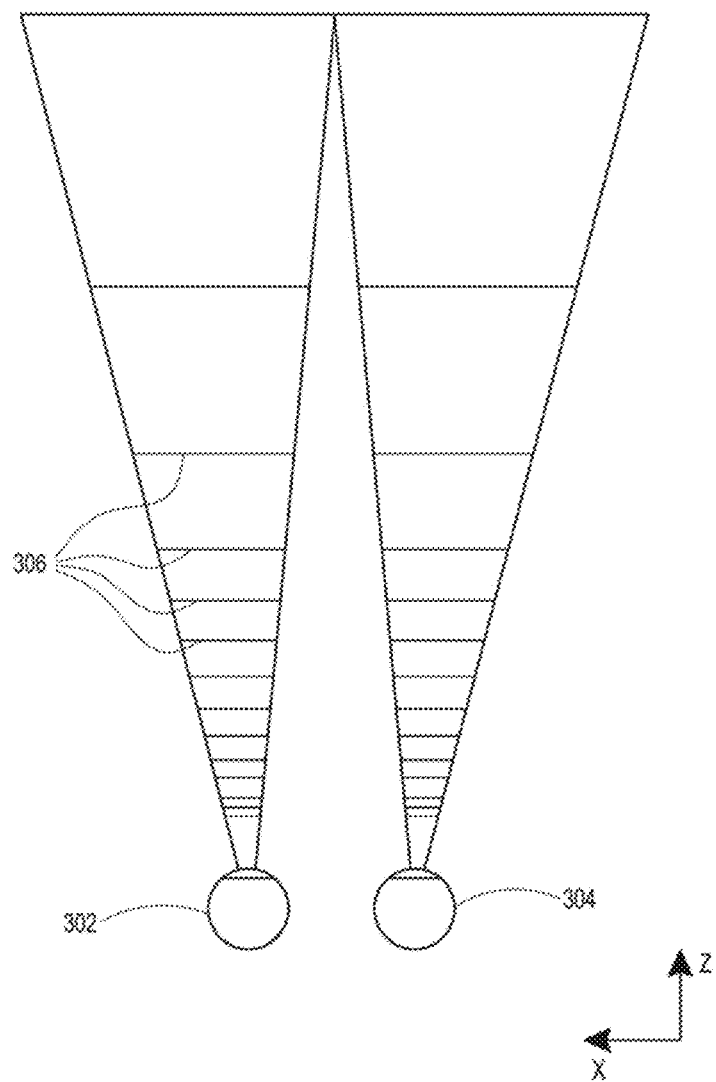
FIG. 3 schematically illustrates aspects of an approach for simulating three-dimensional imagery using multiple depth planes.

FIG. 3 illustrates aspects of an approach for simulating a three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, which has an associated focal distance, such that objects or parts of objects in a particular depth plane are in focus when the eye is in the accommodated state for that depth plane. Three-dimensional imagery can be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

C. Waveguide Stack Assembly

Figure 4:
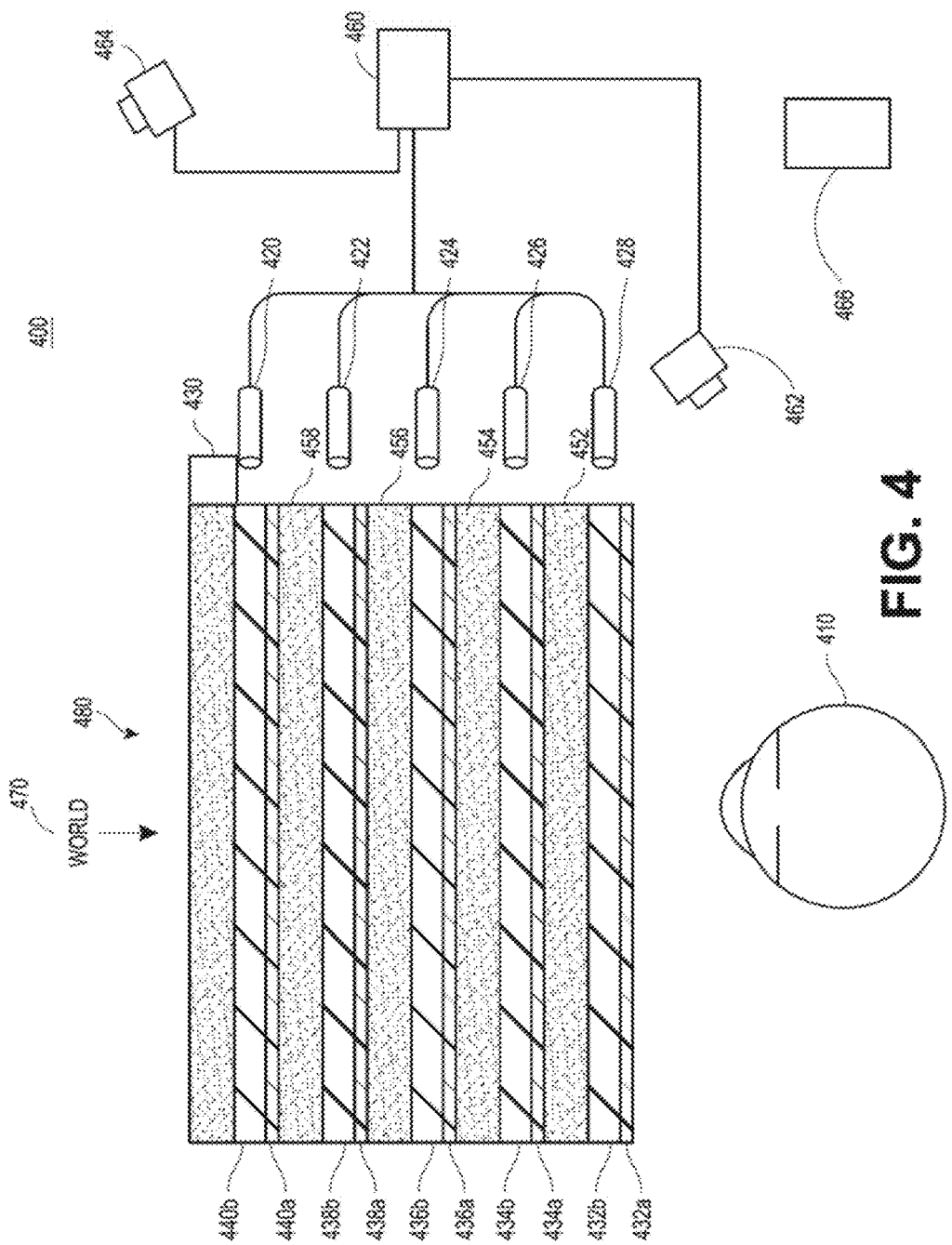
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. The wearable system 400 can correspond to wearable system 200 of FIG. 2, with FIG. 4 schematically showing some parts of that wearable system 200 in greater detail. For example, the waveguide assembly 480 can be integrated into the display 220 of FIG. 2.

With continued reference to FIG. 4, the waveguide assembly 480 may also include a plurality of features 458, 456, 454, 452 between the waveguides. The features 458, 456, 454, 452 may be lenses. The features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. A single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

The image injection devices 420, 422, 424, 426, 428 can be discrete displays that each produce image information for injection into a corresponding waveguide 440b, 438b, 436b, 434b, 432b, respectively. Additionally or alternatively, the image injection devices 420, 422, 424, 426, 428 can be the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 can include programming (e.g., instructions in a non-transitory computer-readable medium) that regulates the timing and provision of image information to the waveguides 440b, 438b, 436b, 434b, 432b. The controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light can be outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity the light extracting optical elements 440a, 438a, 436a, 434a, 432a may be disposed at the top or bottom major surfaces, or may be disposed directly in the volume of the waveguides 440b, 438b, 436b, 434b, 432b. The light extracting optical elements 440a, 438a, 436a, 434a, 432a may be formed in a layer of material that is attached to a transparent substrate to form the waveguides 440b, 438b, 436b, 434b, 432b. The waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b can be configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic, or electro-active). Additionally or alternatively, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. As discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

One or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

The number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

The display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

It may be desirable to have an exit beam meet the condition of having a diameter that is less than the diameter of the eye of a viewer. However, meeting this condition may be challenging in view of the variability in size of the viewer's pupils. This condition may be met over a wide range of pupil sizes by varying the size of the exit beam in response to determinations of the size of the viewer's pupil. For example, as the pupil size decreases, the size of the exit beam may also decrease. The exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include $4\pi$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 232 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 462 (e.g., a digital camera), which observes the movements of the user, such as the eye movements and the facial movements. The inward-facing imaging system 462 may be used to capture images of the eye 410 to determine the size or orientation of the pupil of the eye 304. The inward-facing imaging system 462 can be used to obtain images for use in determining the direction the user is looking (e.g., eye pose) or for biometric identification of the user (e.g., via iris identification). At least one camera may be utilized for each eye, to separately determine the pupil size or eye pose of each eye independently, thereby allowing the presentation of image information to each eye to be dynamically tailored to that eye. The pupil diameter or orientation of only a single eye 410 (e.g., using only a single camera per pair of eyes) can be determined and assumed to be similar for both eyes of the user. The images obtained by the inward-facing imaging system 462 may be analyzed to determine the user's eye pose or mood, which can be used by the wearable system 400 to decide which audio or visual content should be presented to the user. Additionally or alternatively, the wearable system 400 may determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. The user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
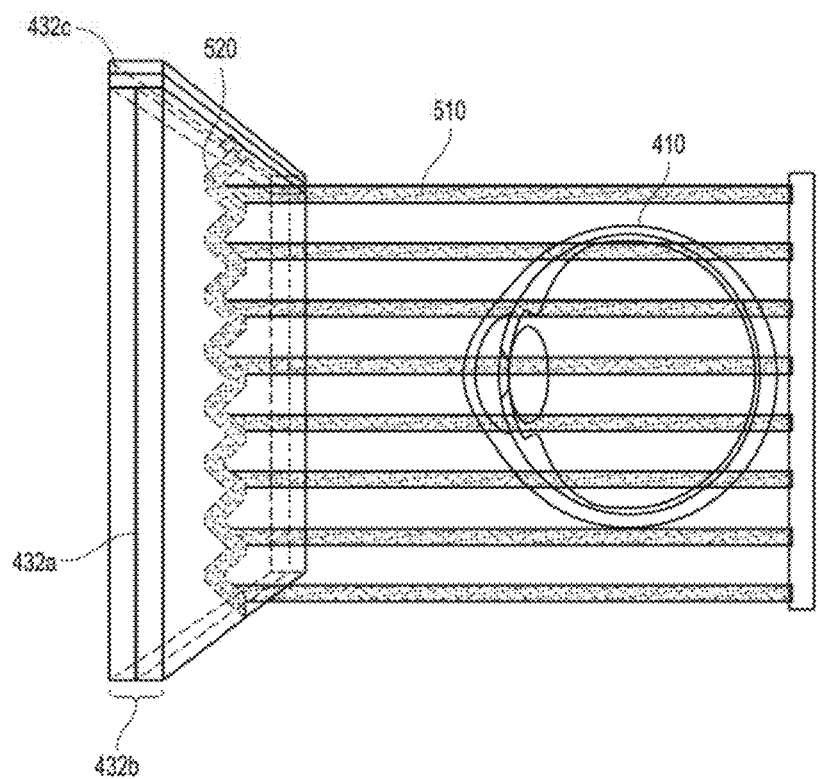
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 can be injected into the waveguide 432b at the input edge 432c of the waveguide 432b and propagates within the waveguide 432b by TIR. At points where the light 520 impinges on the DOE 432a, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432b. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
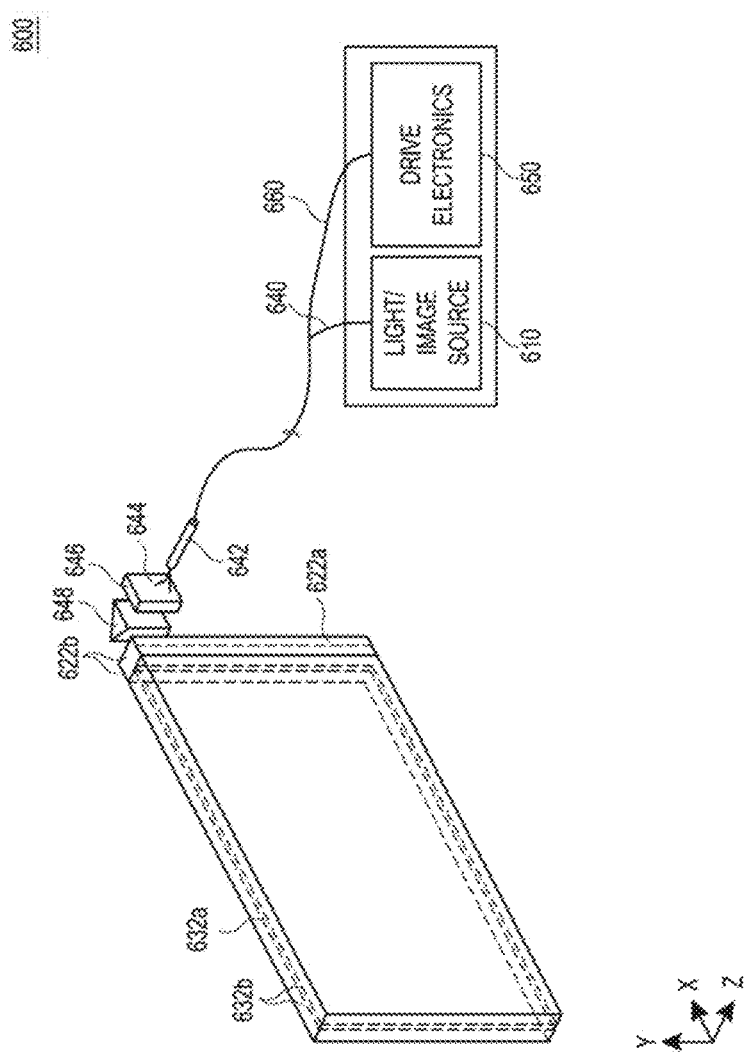
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632a (only one is shown in FIG. 6) and one or more DOEs 632b associated with each of at least some of the primary waveguides 632a. The planar waveguides 632b can be similar to the waveguides 432b, 434b, 436b, 438b, 440b discussed with reference to FIG. 4. The optical system may employ a distribution waveguide apparatus to relay light along a first axis (vertical or Y-axis in view of FIG. 6) and expand the light's effective exit pupil along the first axis (e.g., Y-axis). The distribution waveguide apparatus may, for example, include a distribution planar waveguide 622b and at least one DOE 622a (illustrated by double dash-dot line) associated with the distribution planar waveguide 622b. The distribution planar waveguide 622b may be similar or identical in at least some respects to the primary planar waveguide 632b, having a different orientation therefrom. Likewise, at least one DOE 622a may be similar to or identical in at least some respects to the DOE 632a. For example, the distribution planar waveguide 622b or DOE 622a may be comprised of the same materials as the primary planar waveguide 632b or DOE 632a, respectively. Embodiments of the optical display system 600 shown in FIG. 6 can be integrated into the wearable system 200 shown in FIG. 2.

The relayed and exit-pupil expanded light may be optically coupled from the distribution waveguide apparatus into the one or more primary planar waveguides 632b. The primary planar waveguide 632b can relay light along a second axis, preferably orthogonal to first axis (e.g., horizontal or X-axis in view of FIG. 6). Notably, the second axis can be a non-orthogonal axis to the first axis. The primary planar waveguide 632b expands the light's effective exit pupil along that second axis (e.g., X-axis). For example, the distribution planar waveguide 622b can relay and expand light along the vertical or Y-axis and pass that light to the primary planar waveguide 632b which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery, or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever 644 is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622b which contains the at least one diffractive optical element (DOE) 622a. The collimated light can propagate vertically (relative to the view of FIG. 6) along the distribution planar waveguide 622b by TIR, and in doing so repeatedly intersects with the DOE 622a. The DOE 622a preferably has a low diffraction efficiency. This can cause a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light can be diffracted toward the entrance of the primary waveguide 632b. By dividing the incoming light into multiple outcoupled sets, the exit pupil of the light can be expanded vertically by the DOE 622a in the distribution planar waveguide 622b. This vertically expanded light coupled out of distribution planar waveguide 622b can enter the edge of the primary planar waveguide 632b.

Light entering primary waveguide 632b can propagate horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR and emerge from the face of the primary waveguide 632b. The radially symmetric diffraction pattern of the DOE 632a additionally can impart a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue, and green light at a first focal depth. A second set of three adjacent layers may be employed to respectively produce red, blue, and green light at a second focal depth. Multiple sets may be employed to generate a full 3D or 4D color image light field with various focal depths.

D. Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

E. Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
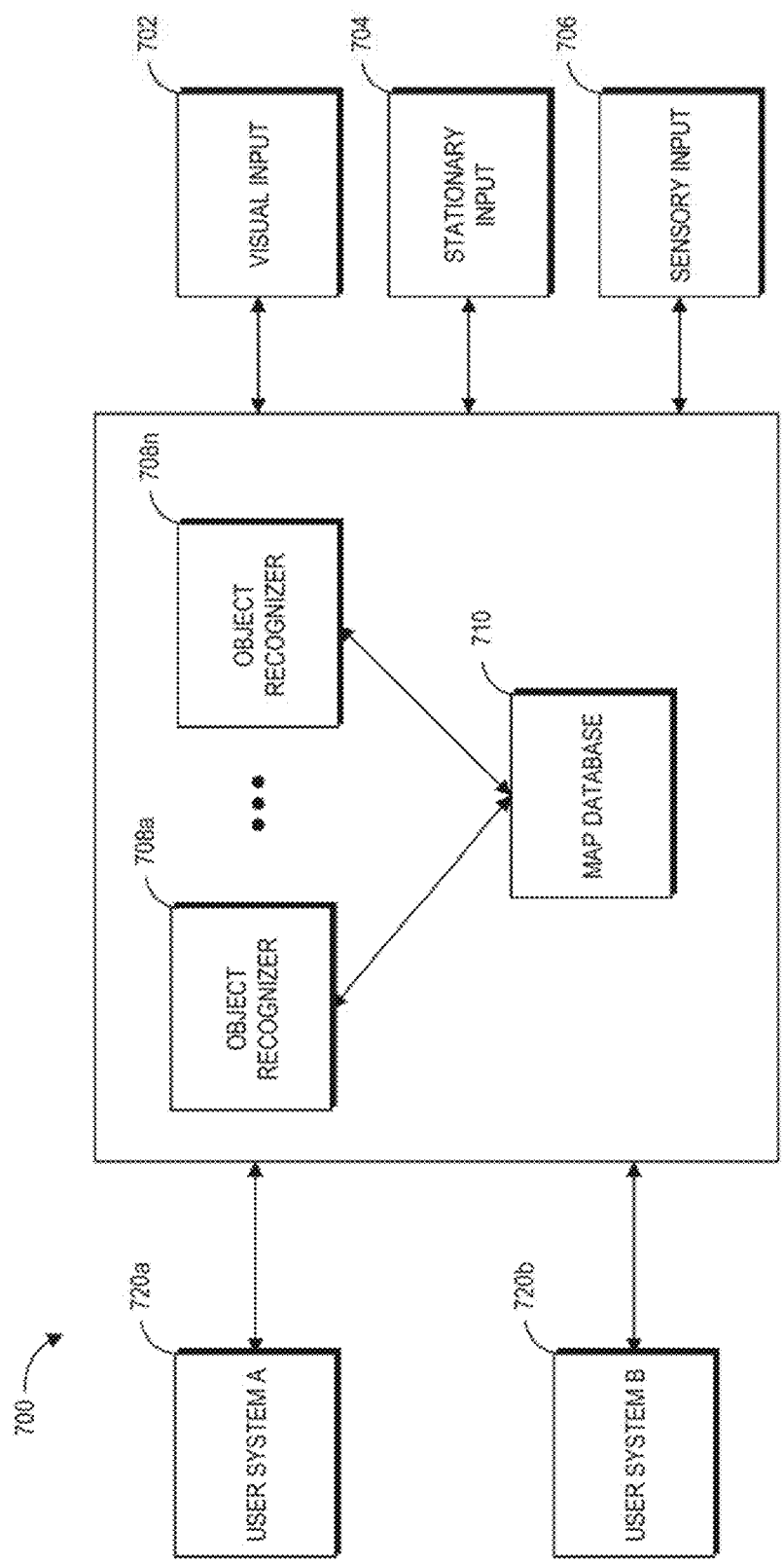
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), or other machine learning algorithms. Individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. The wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
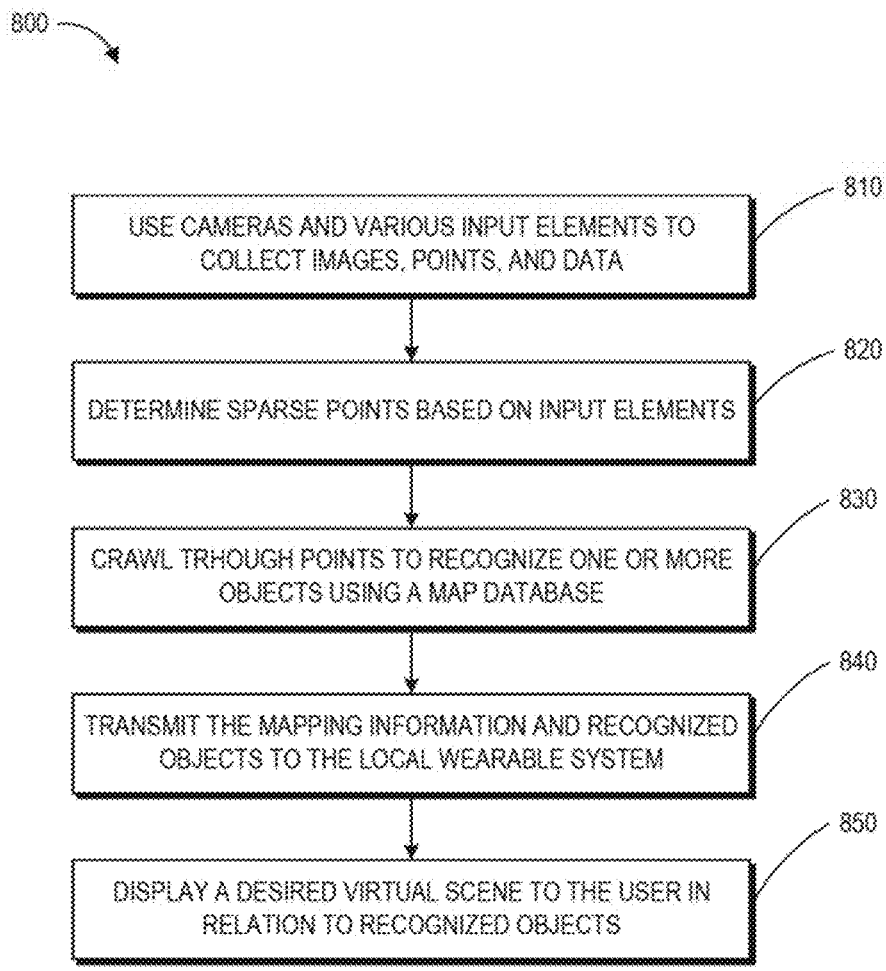
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
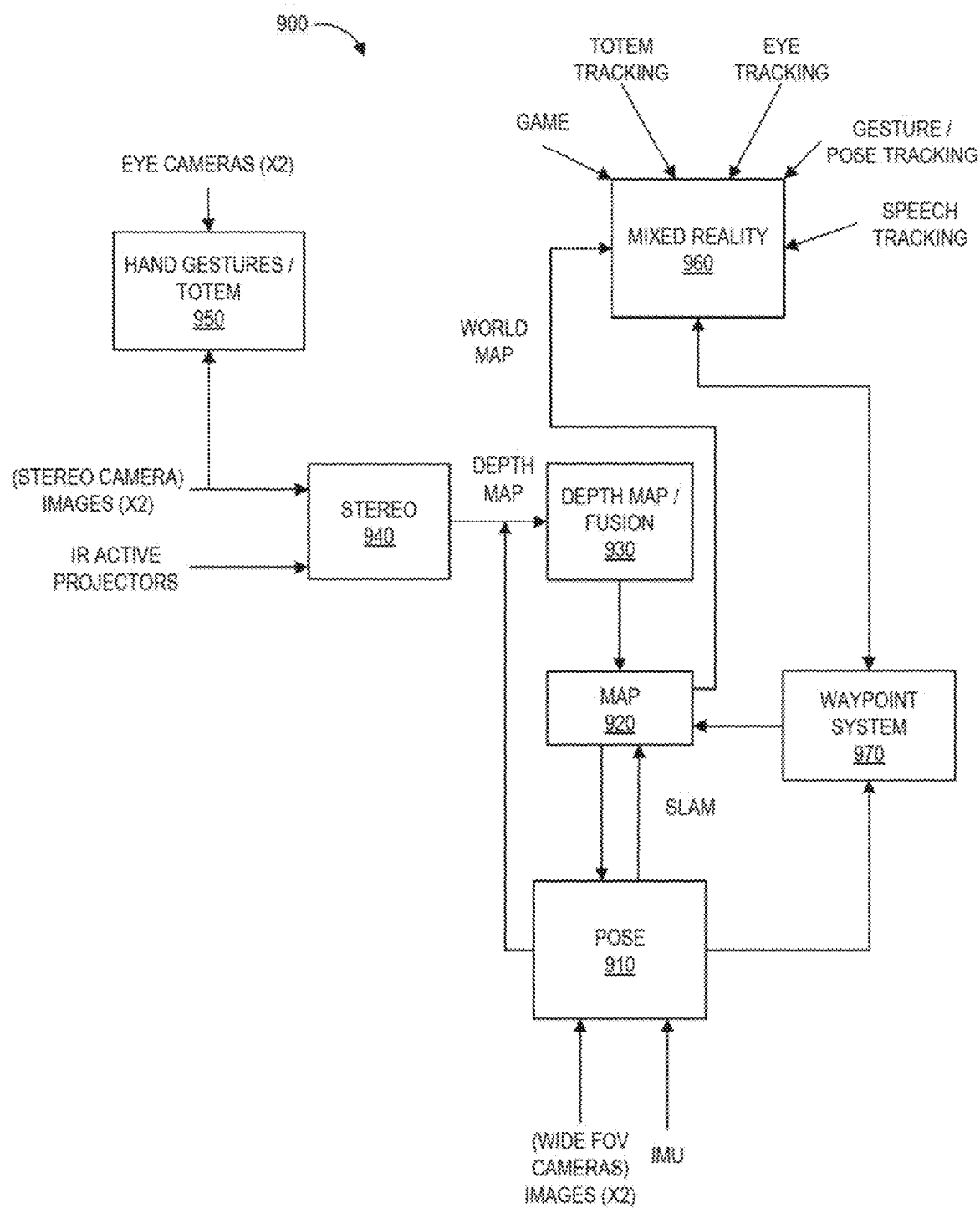
FIG. 9 is a block diagram of another example of a wearable system that includes an example waypoint system.

FIG. 9 is a block diagram of another example of a wearable system. In this example, the wearable system 900 comprises a map 920, which may include the map database 710 containing map data for the world. The map may partly reside locally on the wearable system and may partly reside at networked storage locations accessible by wired or wireless network (e.g., in a cloud system). A pose process 910 may be executed on the wearable computing architecture (e.g., processing module 260 or controller 460) and utilize data from the map 920 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors), images acquired from image cameras, or hand gestures/totem 950 may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose 910 may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects and the world map can be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. A totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). Vergence of the eyes may be determined using triangulation, and then using a vergence/accommodation model developed for that particular person, accommodation may be determined. The eye camera(s) can perform eye tracking to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 900 can include an audio sensor (e.g., a microphone) that receives an audio stream from the environment. The system 900 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc. In some cases, the speech will come from multiple sources, for example, from another person in the vicinity of the user, from an announcer on a television playing in the vicinity of the person, and from speech content that is being played to the user of the ARD via the speaker 240. As further described below, these different speech sources (e.g., a person, a television announcer, and an audio stream in this example) may be content analyzed and different topics may be presented differently to the user by a user interface of the ARD (e.g., different topics organized into different threads, speech by different speakers organized into different threads, or a combination of these).

The local data & processing module 260 or the remote processing module 270 can also apply voice recognition algorithms which can identify the identity of the speaker, such as whether the speaker is the user 210 of the wearable system 900 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a waypoint mapping system 970 can use these user controls or inputs via a user interface (UI). UI elements (e.g., controls, popup windows, bubbles, data entry fields, etc.) can be used, for example, to dismiss a display of auxiliary information, or to add a word to a common word dictionary. Examples of such implementations of the waypoint mapping system 970 and these uses are described with reference to FIGS. 13-24.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras and the pair of cameras for the stereo process 940 may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
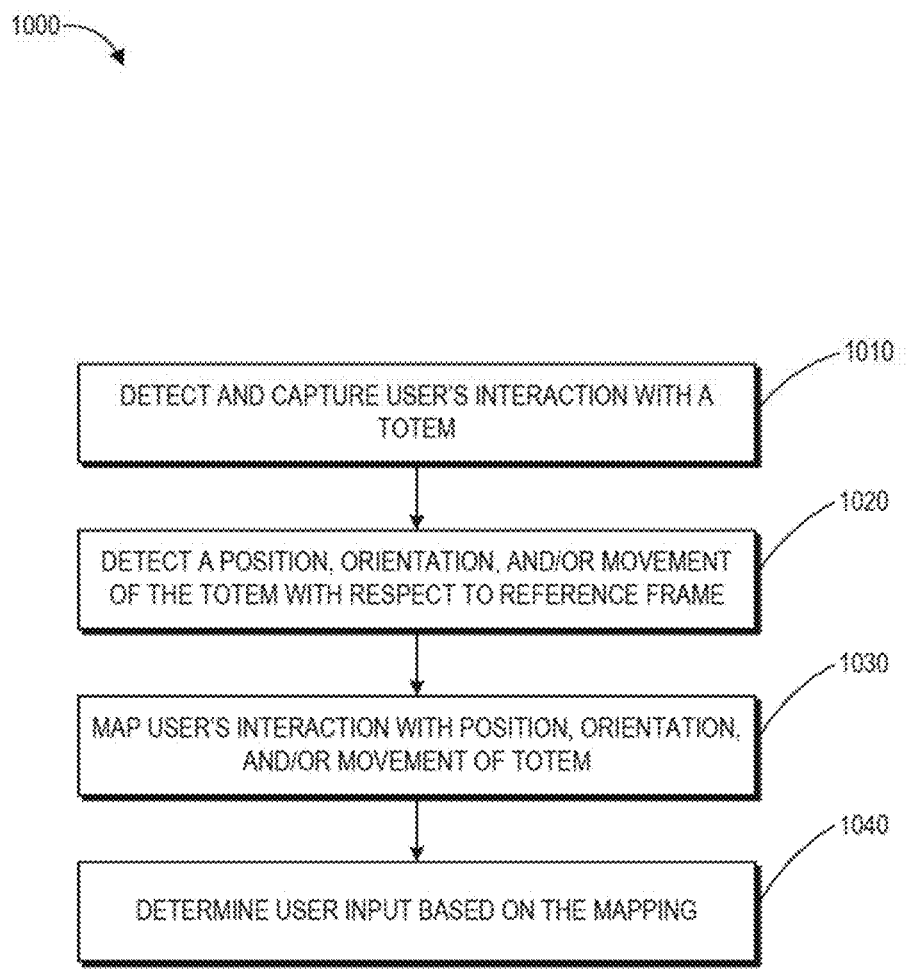
FIG. 10 is a process flow diagram of an example of a method for determining user input to a wearable system.

FIG. 10 is a process flow diagram of an example of a method 1000 for determining user input to a wearable system. In this example, the user may interact with a totem. The user may have multiple totems. For example, the user may have designated one totem for a social media application, another totem for playing games, etc. At block 1010, the wearable system may detect a motion of a totem. The movement of the totem may be recognized through the outward-facing imaging system or may be detected through sensors (e.g., haptic glove, image sensors, hand tracking devices, eye-tracking cameras, head pose sensors, etc.).

Based at least partly on the detected gesture, eye pose, head pose, or input through the totem, the wearable system detects a position, orientation, or movement of the totem (or the user's eyes or head or gestures) with respect to a reference frame, at block 1020. The reference frame may be a set of map points based on which the wearable system translates the movement of the totem (or the user) to an action or command. At block 1030, the user's interaction with the totem is mapped. Based on the mapping of the user interaction with respect to the reference frame 1020, the system determines the user input at block 1040.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. The vergence of the user's eyes can be tracked and an accommodation/vergence model can be used to determine the accommodation state of the user's eyes, which provides information on a depth plane on which the user is focusing. The wearable system can use ray casting techniques to determine which real or virtual objects are along the direction of the user's head pose or eye pose. The ray casting techniques can include casting thin, pencil rays with substantially little transverse width or casting rays with substantial transverse width (e.g., cones or frustums).

The user interface may be projected by the display system as described herein (such as the display 220 in FIG. 2). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 462 or the outward-facing imaging system 464).

Figure 11:
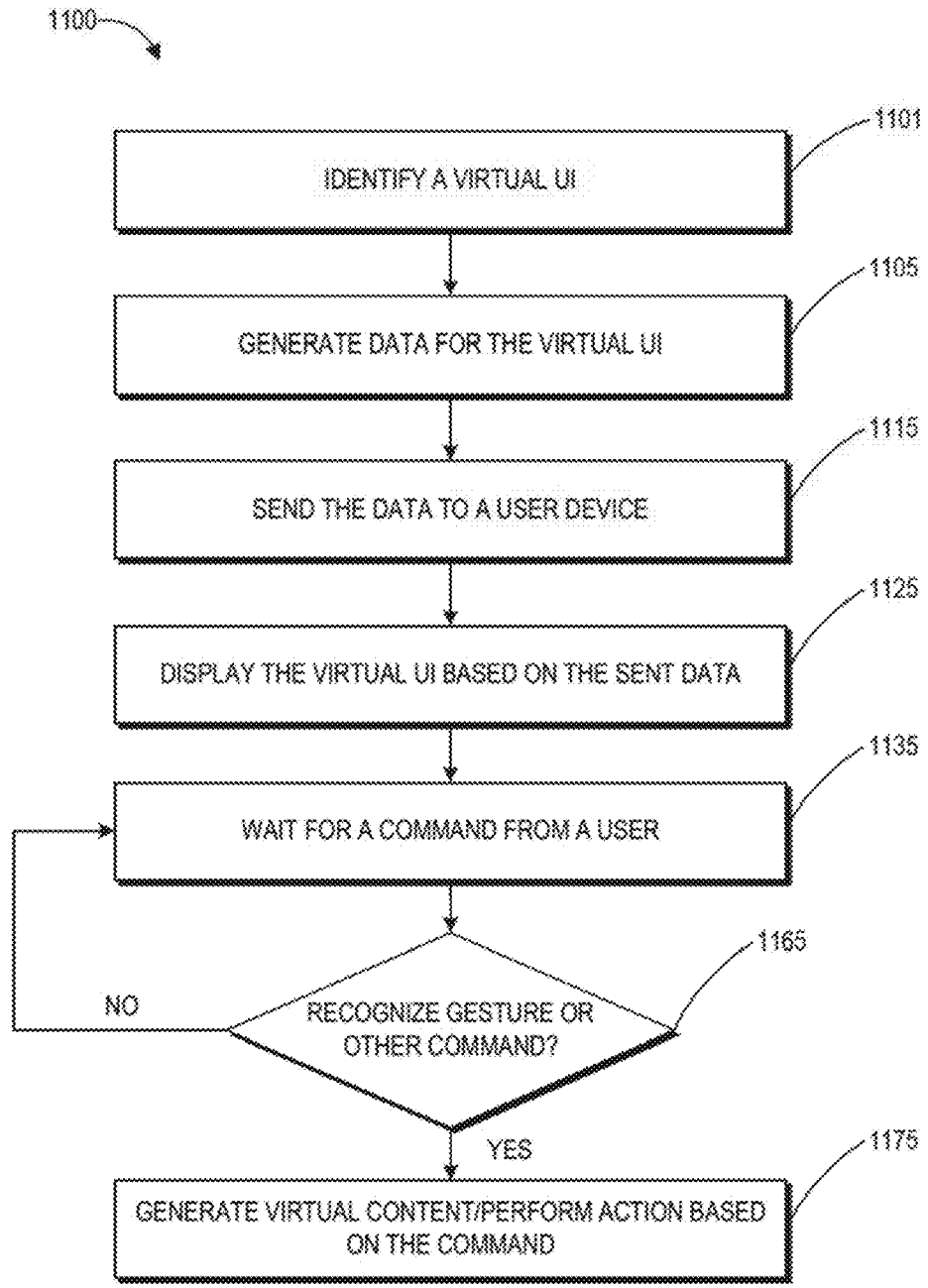
FIG. 11 is a process flow diagram of an example of a method for interacting with a virtual user interface.

FIG. 11 is a process flow diagram of an example of a method 1100 for interacting with a virtual user interface. The method 1100 may be performed by the wearable system described herein. Embodiments of the method 1100 can be used by the wearable system to detect persons or documents in the FOV of the wearable system.

At block 1101, the wearable system may identify a particular UI. The type of UI may be determined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 1105, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 1115, the wearable system may send the data to the display from the cloud or the data may be sent from a local database to the display components. At block 1125, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1135. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 1165), virtual content associated with the command may be displayed to the user (block 1175).

Additional examples of wearable systems, UIs, and user experiences (UX) are described in U.S. Patent Publication No. 2015/0016777, which is incorporated by reference herein in its entirety.

F. Example Communications Among Wearable Systems

Figure 12:
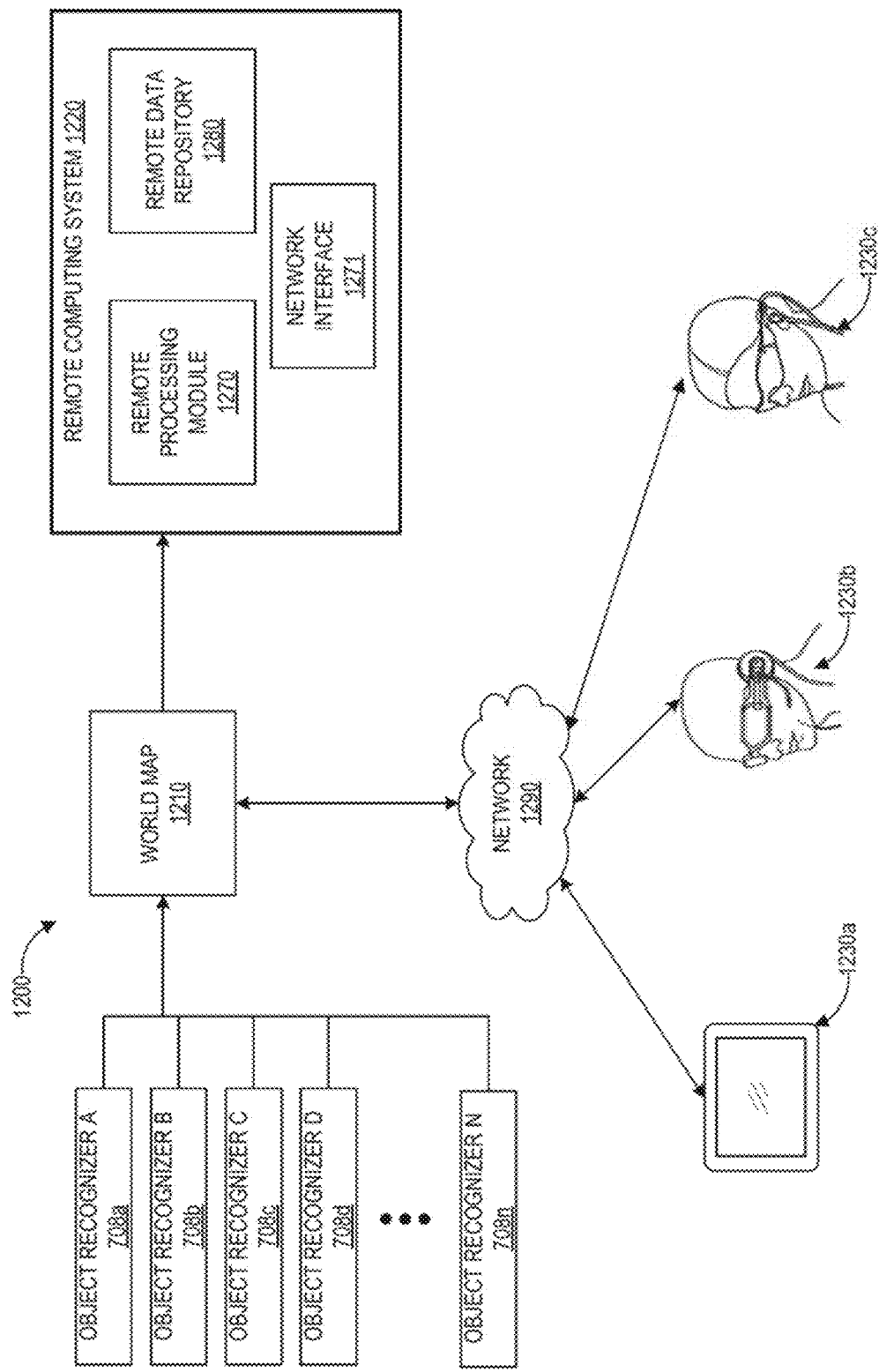
FIG. 12 schematically illustrates an overall system view depicting multiple user devices interacting with each other.

FIG. 12 schematically illustrates an overall system view depicting multiple user devices interacting with each other. The computing environment 1200 includes user devices 1230*a*, 1230*b*, 1230*c*. The user devices 1230*a*, 1230*b*, and 1230*c* can communicate with each other through a network 1290. The user devices 1230*a*-1230*c* can each include a network interface to communicate via the network 1290 with a remote computing system 1220 (which may also include a network interface 1271). The network 1290 may be a LAN, WAN, peer-to-peer network, radio, Bluetooth, or any other network. The computing environment 1200 can also include one or more remote computing systems 1220. The remote computing system 1220 may include server computer systems that are clustered and located at different geographic locations. The user devices 1230*a*, 1230*b*, and 1230*c* may communicate with the remote computing system 1220 via the network 1290.

The remote computing system 1220 may include a remote data repository 1280 which can maintain information about a specific user's physical or virtual worlds. The remote data repository may be an embodiment of the remote data repository 280 shown in FIG. 2. The remote computing system 1220 may also include a remote processing module 1270. The remote processing module 1270 may be an embodiment of the remote processing module 270 shown in FIG. 2. The remote processing module 1270 may include one or more processors which can communicate with the user devices (1230*a*, 1230*b*, 1230*c*) and the remote data repository 1280. The processors can process information obtained from user devices and other sources. At least a portion of the processing or storage can be provided by the local processing and data module 260 (as shown in FIG. 2). The remote computing system 1220 may enable a given user to share information about the specific user's own physical or virtual worlds with another user.

The user device may be a wearable device (such as an HMD or an ARD), a computer, a mobile device, or any other devices alone or in combination. For example, the user devices 1230*b* and 1230*c* may be an embodiment of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device or remote computing system 1220 can construct, update, and build a collection of images, points and other information using the information obtained from the user devices. For example, the user device may process raw information acquired and send the processed information to the remote computing system 1220 for further processing. The user device may also send the raw information to the remote computing system 1220 for processing. The user device may receive the processed information from the remote computing system 1220 and provide final processing before projecting to the user. The user device may also process the information obtained and pass the processed information to other user devices. The user device may communicate with the remote data repository 1280 while processing acquired information. Multiple user devices or multiple server computer systems may participate in the construction or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 7 and 9, information acquired by the user devices may be used to construct a world map 1210. The world map 1210 may include at least a portion of the map 920 described in FIG. 9. Various object recognizers (e.g. 708a, 708b, 708c . . . 708n) may be used to recognize objects and tag images, as well as to attach semantic information to the objects. These object recognizers are also described in FIG. 7.

The remote data repository 1280 can be used to store data and to facilitate the construction of the world map 1210. The user device can constantly update information about the user's environment and receive information about the world map 1210. The world map 1210 may be created by the user or by someone else. As discussed herein, user devices (e.g. 1230a, 1230b, 1230c) and remote computing system 1220, alone or in combination, may construct or update the world map 1210. For example, a user device may be in communication with the remote processing module 1270 and the remote data repository 1280. The user device may acquire or process information about the user and the user's environment. The remote processing module 1270 may be in communication with the remote data repository 1280 and user devices (e.g. 1230a, 1230b, 1230c) to process information about the user and the user's environment. The remote computing system 1220 can modify the information acquired by the user devices (e.g. 1230a, 1230b, 1230c), such as, e.g. selectively cropping a user's image, modifying the user's background, adding virtual objects to the user's environment, annotating a user's speech with auxiliary information, etc. The remote computing system 1220 can send the processed information to the same or different user devices.

G. Example Map

Figure 13A:
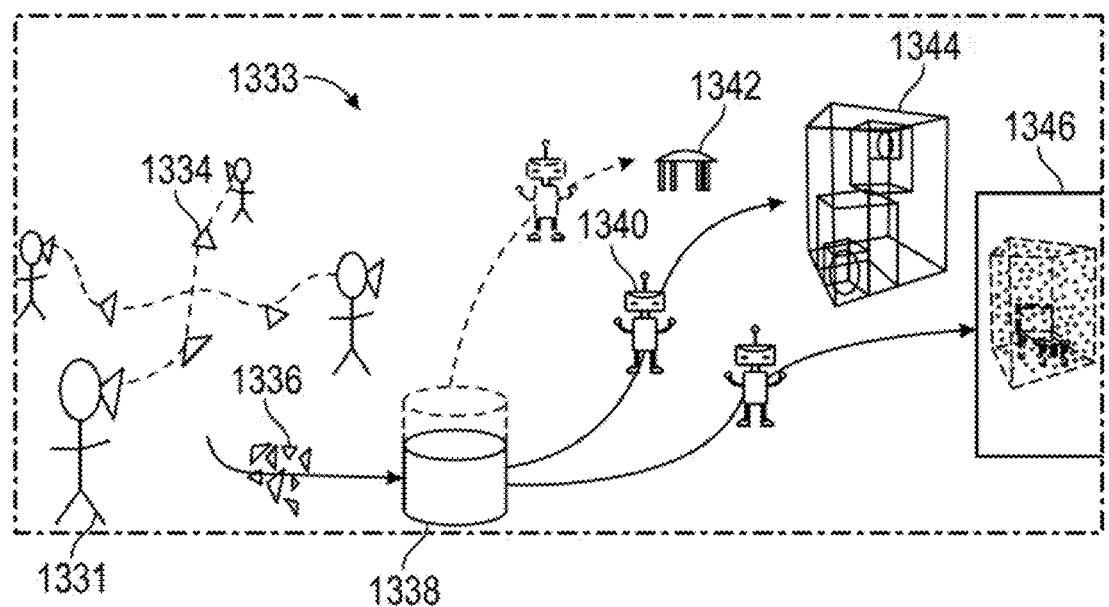
FIG. 13A is a schematic diagram illustrating a user wearing an AR display system rendering AR content as the user moves through a physical world environment, according to some embodiments.

FIG. 13A illustrates a user 1331 wearing an AR display system rendering AR content as the user 1331 moves through a physical world environment 1333 (hereinafter referred to as "environment 1333"). The information captured by the AR system along the movement path of the user may be processed into one or more tracking maps. The user 1331 positions the AR display system at positions 1334, and the AR display system records ambient information of a passable world (e.g., a digital representation of the real objects in the physical world that can be stored and updated with changes to the real objects in the physical world) relative to the positions 1334. That information may be stored as poses in combination with images, features, directional audio inputs, or other desired data. The positions 1334 are aggregated to data inputs 1336, for example, as part of a tracking map, and processed at least by a passable world module 1338, which may be implemented, for example, by processing on a remote processing module. In some embodiments, the passable world module 1338 may include a head pose component and the world reconstruction component, such that the processed information may indicate the location of objects in the physical world in combination with other information about physical objects used in rendering virtual content.

The passable world module 1338 determines, at least in part, where and how AR content 1340 can be placed in the physical world as determined from the data inputs 1336. The AR content is "placed" in the physical world by presenting via the user interface both a representation of the physical world and the AR content, with the AR content rendered as if it were interacting with objects in the physical world and the objects in the physical world presented as if the AR content were, when appropriate, obscuring the user's view of those objects. In some embodiments, the AR content may be placed by appropriately selecting portions of a fixed element 1342 (e.g., a table) from a reconstruction to determine the shape and position of the AR content 1340. As an example, the fixed element may be a table and the virtual content may be positioned such that it appears to be on that table. In some embodiments, the AR content may be placed within structures in a field of view 1344, which may be a present field of view or an estimated future field of view. In some embodiments, the AR content may be persisted relative to a model 1346 of the physical world (e.g. a mesh).

As depicted, the fixed element 1342 serves as a proxy (e.g. digital copy) for any fixed element within the physical world which may be stored in the passable world module 1338 so that the user 1331 can perceive content on the fixed element 1342 without the system having to map to the fixed element 1342 each time the user 1331 sees it. The fixed element 1342 may, therefore, be a mesh model from a previous modeling session or determined from a separate user but nonetheless stored by the passable world module 1338 for future reference by a plurality of users. Therefore, the passable world module 1338 may recognize the environment 1333 from a previously mapped environment and display AR content without a device of the user 1331 mapping all or part of the environment 1333 first, saving computation process and cycles and avoiding latency of any rendered AR content.

The mesh model 1346 of the physical world may be created by the AR display system and appropriate surfaces and metrics for interacting and displaying the AR content 1340 can be stored by the passable world module 1338 for future retrieval by the user 1331 or other users without the need to completely or partially recreate the model. In some embodiments, the data inputs 1336 are inputs such as geolocation, user identification, and current activity to indicate to the passable world module 1338 which fixed element 1342 of one or more fixed elements are available, which AR content 1340 has last been placed on the fixed element 1342, and whether to display that same content (such AR content being "persistent" content regardless of user viewing a particular passable world model).

Even in embodiments in which objects are considered to be fixed (e.g. a kitchen table), the passable world module 1338 may update those objects in a model of the physical world from time to time to account for the possibility of changes in the physical world. The model of fixed objects may be updated with a very low frequency. Other objects in the physical world may be moving or otherwise not regarded as fixed (e.g. kitchen chairs). To render an AR scene with a realistic feel, the AR system may update the position of these non-fixed objects with a much higher frequency than is used to update fixed objects. To enable accurate tracking of all of the objects in the physical world, an AR system may draw information from multiple sensors, including one or more image sensors.

Figure 13B:
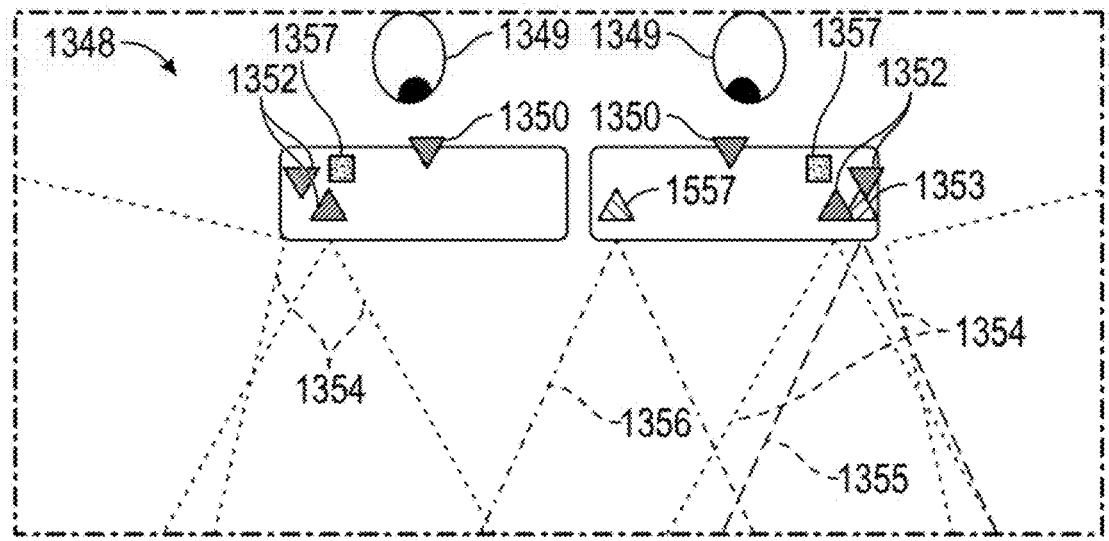
FIG. 13B is a schematic diagram illustrating a viewing optics assembly and attendant components, according to some embodiments.
Figure 13C:
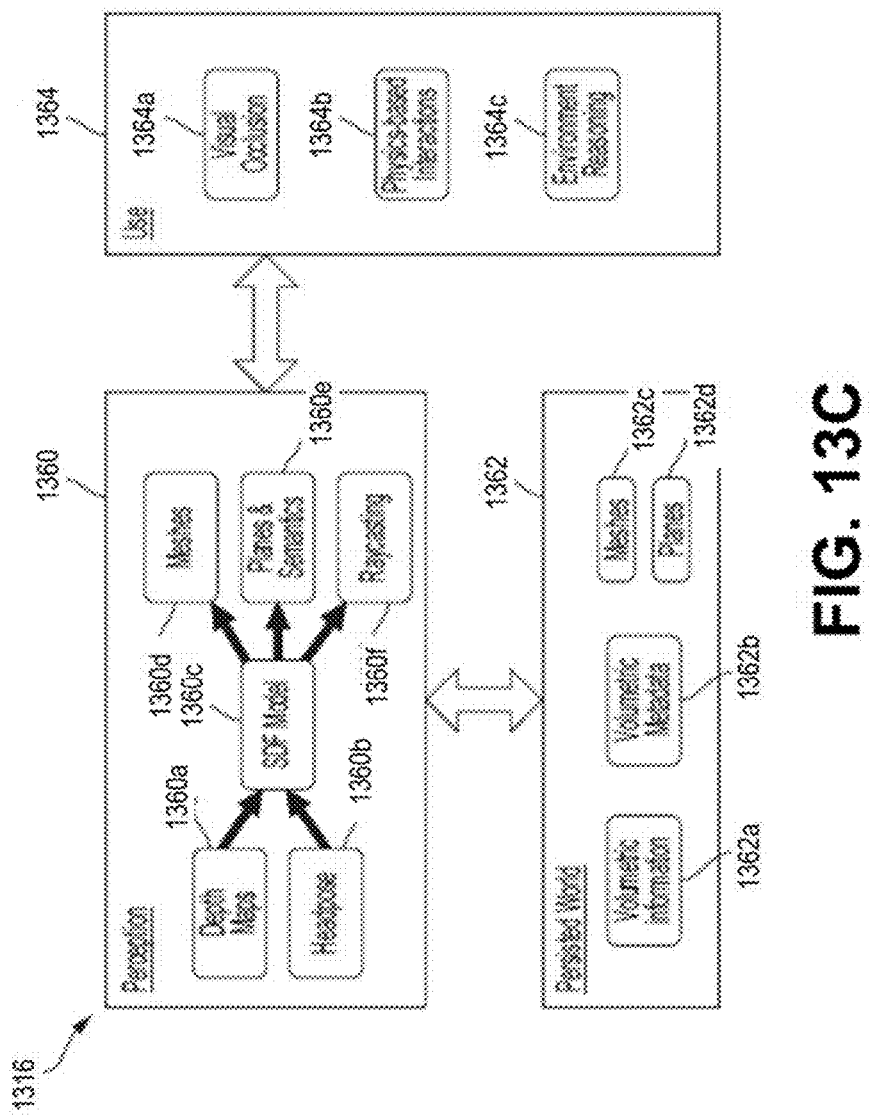
FIG. 13C is a schematic diagram illustrating an AR system using a world reconstruction system, according to some embodiments.

FIG. 13B is a schematic illustration of a viewing optics assembly 1348 and attendant components. In some embodiments, two eye tracking cameras 1350, directed toward user eyes 1349, detect metrics of the user eyes 1349, such as eye shape, eyelid occlusion, pupil direction and glint on the user eyes 1349.

In some embodiments, one of the sensors may be a depth sensor 1351, such as a time of flight sensor, emitting signals to the world and detecting reflections of those signals from nearby objects to determine distance to given objects. A depth sensor, for example, may quickly determine whether objects have entered the field of view of the user, either as a result of motion of those objects or a change of pose of the user. However, information about the position of objects in the field of view of the user may alternatively or additionally be collected with other sensors. Depth information, for example, may be obtained from stereoscopic visual image sensors or plenoptic sensors.

In some embodiments, world cameras 1352 record a greater-than-peripheral view to map and/or otherwise create a model of the environment 1333 and detect inputs that may affect AR content. In some embodiments, the world camera 1352 and/or camera 1353 may be grayscale and/or color image sensors, which may output grayscale and/or color image frames at fixed time intervals. Camera 1353 may further capture physical world images within a field of view of the user at a specific time. Pixels of a frame-based image sensor may be sampled repetitively even if their values are unchanged. Each of the world cameras 1352, the camera 1353 and the depth sensor 1351 have respective fields of view of 1354, 1355, and 1356 to collect data from and record a physical world scene.

Inertial measurement units 1357 may determine movement and orientation of the viewing optics assembly 1348. In some embodiments, each component is operatively coupled to at least one other component. For example, the depth sensor 1351 is operatively coupled to the eye tracking cameras 1350 as a confirmation of measured accommodation against actual distance the user eyes 1349 are looking at.

In some embodiments, for example, a viewing optics assembly 1348 may include two world camera 1352 instead of four. Alternatively or additionally, cameras 1352 and 1353 need not capture a visible light image of their full field of view. A viewing optics assembly 1348 may include other types of components. In some embodiments, a viewing optics assembly 1348 may include one or more dynamic vision sensor (DVS), whose pixels may respond asynchronously to relative changes in light intensity exceeding a threshold.

In some embodiments, a viewing optics assembly 1348 may not include the depth sensor 1351 based on time of flight information. In some embodiments, for example, a viewing optics assembly 1348 may include one or more plenoptic cameras, whose pixels may capture light intensity and an angle of the incoming light, from which depth information can be determined. For example, a plenoptic camera may include an image sensor overlaid with a transmissive diffraction mask (TDM). Alternatively or additionally, a plenoptic camera may include an image sensor containing angle-sensitive pixels and/or phase-detection auto-focus pixels (PDAF) and/or micro-lens array (MLA). Such a sensor may serve as a source of depth information instead of or in addition to depth sensor 1351.

It also should be appreciated that the configuration of the components in FIG. 13B is provided as an example. A viewing optics assembly 1348 may include components with any suitable configuration, which may be set to provide the user with the largest field of view practical for a particular set of components. For example, if a viewing optics assembly 1348 has one world camera 1352, the world camera may be placed in a center region of the viewing optics assembly instead of at a side.

Information from the sensors in viewing optics assembly 1348 may be coupled to one or more of processors in the system. The processors may generate data that may be rendered so as to cause the user to perceive virtual content interacting with objects in the physical world. That rendering may be implemented in any suitable way, including generating image data that depicts both physical and virtual objects. In other embodiments, physical and virtual content may be depicted in one scene by modulating the opacity of a display device that a user looks through at the physical world. The opacity may be controlled so as to create the appearance of the virtual object and also to block the user from seeing objects in the physical world that are occluded by the virtual objects. In some embodiments, the image data may only include virtual content that may be modified such that the virtual content is perceived by a user as realistically interacting with the physical world (e.g. clip content to account for occlusions), when viewed through the user interface.

The location on the viewing optics assembly 1348 at which content is displayed to create the impression of an object at a particular location may depend on the physics of the viewing optics assembly. Additionally, the pose of the user's head with respect to the physical world and the direction in which the user's eyes are looking may impact where in the physical world content displayed at a particular location on the viewing optics assembly content will appear. Sensors as described above may collect this information, and or supply information from which this information may be calculated, such that a processor receiving sensor inputs may compute where objects should be rendered on the viewing optics assembly 1348 to create a desired appearance for the user.

Regardless of how content is presented to a user, a model of the physical world may be used so that characteristics of the virtual objects, which can be impacted by physical objects, including the shape, position, motion, and visibility of the virtual object, can be correctly computed. In some embodiments, the model may include the reconstruction of a physical world, for example, the reconstruction 1318.

That model may be created from data collected from sensors on a wearable device of the user. Though, in some embodiments, the model may be created from data collected by multiple users, which may be aggregated in a computing device remote from all of the users (and which may be "in the cloud").

The model may be created, at least in part, by a world reconstruction system such as, for example, the world reconstruction depicted in FIG. 6A. The world reconstruction component 516 may include a perception module 1360 that may generate, update, and store representations for a portion of the physical world. In some embodiments, the perception module 1360 may represent the portion of the physical world within a reconstruction range of the sensors as multiple voxels. Each voxel may correspond to a 3D cube of a predetermined volume in the physical world, and include surface information, indicating whether there is a surface in the volume represented by the voxel. Voxels may be assigned values indicating whether their corresponding volumes have been determined to include surfaces of physical objects, determined to be empty or have not yet been measured with a sensor and so their value is unknown. It should be appreciated that values indicating that voxels that are determined to be empty or unknown need not be explicitly stored, as the values of voxels may be stored in computer memory in any suitable way, including storing no information for voxels that are determined to be empty or unknown.

In addition to generating information for a persisted world representation, the perception module 1360 may identify and output indications of changes in a region around a user of an AR system. Indications of such changes may trigger updates to volumetric data stored as part of the persisted world, or trigger other functions, such as triggering components 604 that generate AR content to update the AR content.

In some embodiments, the perception module 1360 may identify changes based on a signed distance function (SDF) model. The perception module 1360 may be configured to receive sensor data such as, for example, depth maps 1360a and headposes 1360b, and then fuse the sensor data into a SDF model 1360c. Depth maps 1360a may provide SDF information directly, and images may be processed to arrive at SDF information. The SDF information represents distance from the sensors used to capture that information. As those sensors may be part of a wearable unit, the SDF information may represent the physical world from the perspective of the wearable unit and therefore the perspective of the user. The headposes 1360b may enable the SDF information to be related to a voxel in the physical world.

In some embodiments, the perception module 1360 may generate, update, and store representations for the portion of the physical world that is within a perception range. The perception range may be determined based, at least in part, on a sensor's reconstruction range, which may be determined based, at least in part, on the limits of a sensor's observation range. As a specific example, an active depth sensor that operates using active IR pulses may operate reliably over a range of distances, creating the observation range of the sensor, which may be from a few centimeters or tens of centimeters to a few meters.

The world reconstruction component 516 may include additional modules that may interact with the perception module 1360. In some embodiments, a persisted world module 1362 may receive representations for the physical world based on data acquired by the perception module 1360. The persisted world module 1362 also may include various formats of representations of the physical world. For example, volumetric metadata 1362b such as voxels may be stored as well as meshes 1362c and planes 1362d. In some embodiments, other information, such as depth maps could be saved.

In some embodiments, representations of the physical world, such as those illustrated in FIG. 6A may provide relatively dense information about the physical world in comparison to sparse maps, such as a tracking map based on feature points as described above.

In some embodiments, the perception module 1360 may include modules that generate representations for the physical world in various formats including, for example, meshes 1360d, planes and semantics 1360e. The representations for the physical world may be stored across local and remote storage mediums. The representations for the physical world may be described in different coordinate frames depending on, for example, the location of the storage medium. For example, a representation for the physical world stored in the device may be described in a coordinate frame local to the device. The representation for the physical world may have a counterpart stored in a cloud. The counterpart in the cloud may be described in a coordinate frame shared by all devices in an XR system.

In some embodiments, these modules may generate representations based on data within the perception range of one or more sensors at the time the representation is generated as well as data captured at prior times and information in the persisted world module 1362. In some embodiments, these components may operate on depth information captured with a depth sensor. However, the AR system may include vision sensors and may generate such representations by analyzing monocular or binocular vision information.

In some embodiments, these modules may operate on regions of the physical world. Those modules may be triggered to update a subregion of the physical world, when the perception module 1360 detects a change in the physical world in that subregion. Such a change, for example, may be detected by detecting a new surface in the SDF model 1360c or other criteria, such as changing the value of a sufficient number of voxels representing the subregion.

The world reconstruction component 516 may include components 1364 that may receive representations of the physical world from the perception module 1360. Information about the physical world may be pulled by these components according to, for example, a use request from an application. In some embodiments, information may be pushed to the use components, such as via an indication of a change in a pre-identified region or a change of the physical world representation within the perception range. The components 1364, may include, for example, game programs and other components that perform processing for visual occlusion, physics-based interactions, and environment reasoning.

Responding to the queries from the components 1364, the perception module 1360 may send representations for the physical world in one or more formats. For example, when the component 1364 indicates that the use is for visual occlusion or physics-based interactions, the perception module 1360 may send a representation of surfaces. When the component 1364 indicates that the use is for environmental reasoning, the perception module 1360 may send meshes, planes and semantics of the physical world.

In some embodiments, the perception module 1360 may include components that format information to provide the component 1364. An example of such a component may be raycasting component 1360f. A use component (e.g., component 1364), for example, may query for information about the physical world from a particular point of view. Raycasting component 1360f may select from one or more representations of the physical world data within a field of view from that point of view.

As should be appreciated from the foregoing description, the perception module 1360, or another component of an AR system, may process data to create 3D representations of portions of the physical world. Data to be processed may be reduced by culling parts of a 3D reconstruction volume based at last in part on a camera frustum and/or depth image, extracting and persisting plane data, capturing, persisting, and updating 3D reconstruction data in blocks that allow local update while maintaining neighbor consistency, providing occlusion data to applications generating such scenes, where the occlusion data is derived from a combination of one or more depth data sources, and/or performing a multi-stage mesh simplification. The reconstruction may contain data of different levels of sophistication including, for example, raw data such as live depth data, fused volumetric data such as voxels, and computed data such as meshes.

In some embodiments, components of a passable world model may be distributed, with some portions executing locally on an XR device and some portions executing remotely, such as on a network connected server, or otherwise in the cloud. The allocation of the processing and storage of information between the local XR device and the cloud may impact functionality and user experience of an XR system. For example, reducing processing on a local device by allocating processing to the cloud may enable longer battery life and reduce heat generated on the local device. But, allocating too much processing to the cloud may create undesirable latency that causes an unacceptable user experience.

Figure 13D:
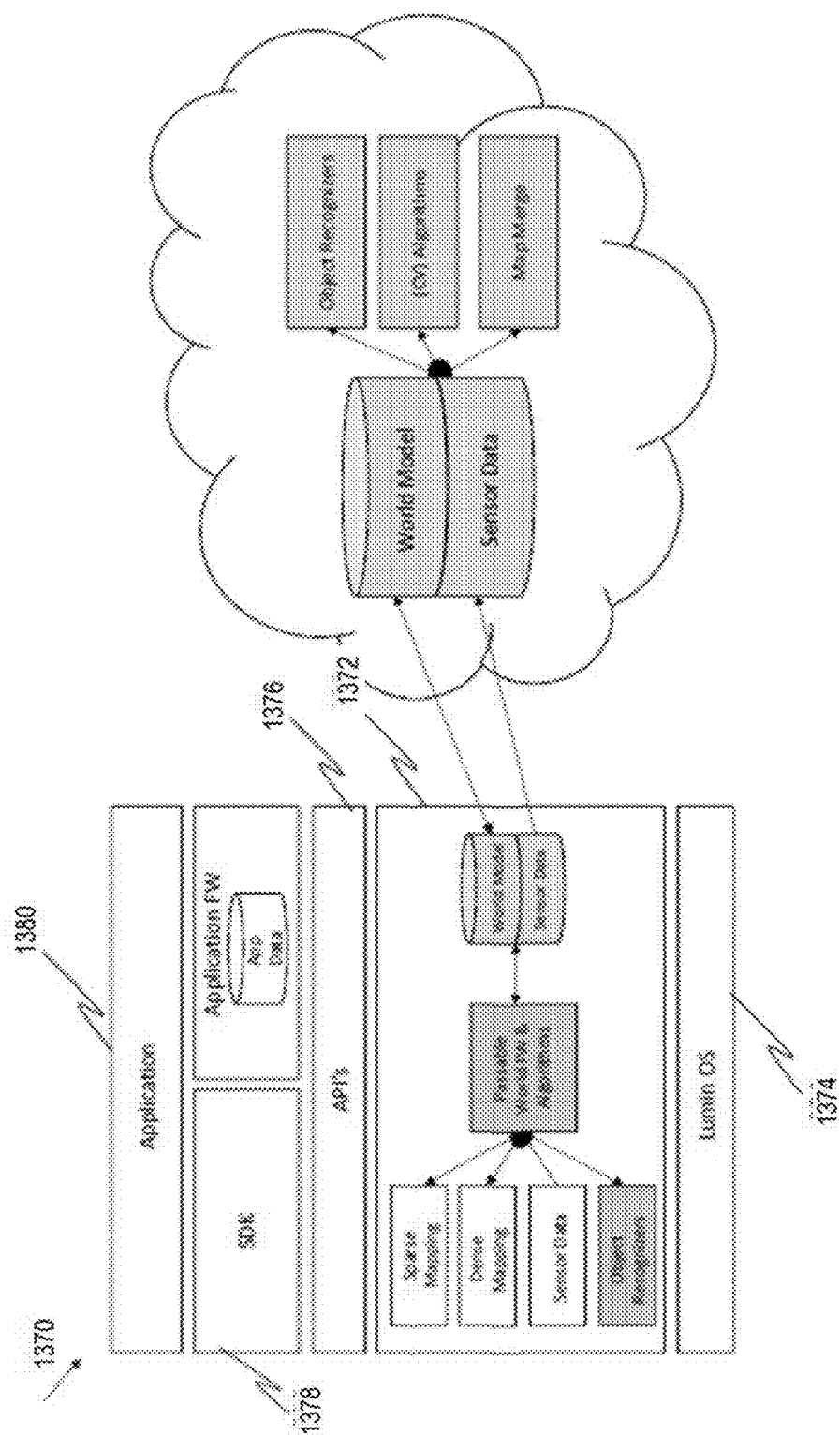
FIG. 13D is a schematic diagram illustrating components of an AR system that maintain a model of a passable world, according to some embodiments.

FIG. 13D depicts a distributed component architecture 1370 configured for spatial computing, according to some embodiments. The distributed component architecture 1370 may include a passable world component 1372 (e.g., PW 538 in FIG. 5A), a Lumin OS 1374, API's 1376, SDK 1378, and Application 1380. The Lumin OS 1374 may include a Linux-based kernel with custom drivers compatible with an XR device. The API's 1376 may include application programming interfaces that grant XR applications (e.g., Applications 1380) access to the spatial computing features of an XR device. The SDK 1378 may include a software development kit that allows the creation of XR applications.

One or more components in the architecture 1370 may create and maintain a model of a passable world. In this example sensor data is collected on a local device. Processing of that sensor data may be performed in part locally on the XR device and partially in the cloud. PW 538 may include environment maps created based, at least in part, on data captured by AR devices worn by multiple users. During sessions of an AR experience, individual AR devices (such as wearable devices described above in connection with FIG. 4 may create tracking maps, which is one type of map.

In some embodiments, the device may include components that construct both sparse maps and dense maps. A tracking map may serve as a sparse map and may include headposes of the AR device scanning an environment as well as information about objects detected within that environment at each headpose. Those headposes may be maintained locally for each device. For example, the headpose on each device may be relative to an initial headpose when the device was turned on for its session. As a result, each tracking map may be local to the device creating it. The dense map may include surface information, which may be represented by a mesh or depth information. Alternatively or additionally, a dense map may include higher level information derived from surface or depth information, such as the location and/or characteristics of planes and/or other objects.

Creation of the dense maps may be independent of the creation of sparse maps, in some embodiments. The creation of dense maps and sparse maps, for example, may be performed in separate processing pipelines within an AR system. Separating processing, for example, may enable generation or processing of different types of maps to be performed at different rates. Sparse maps, for example, may be refreshed at a faster rate than dense maps. In some embodiments, however, the processing of dense and sparse maps may be related, even if performed in different pipelines. Changes in the physical world revealed in a sparse map, for example, may trigger updates of a dense map, or vice versa. Further, even if independently created, the maps might be used together. For example, a coordinate system derived from a sparse map may be used to define position and/or orientation of objects in a dense map.

The sparse map and/or dense map may be persisted for re-use by the same device and/or sharing with other devices. Such persistence may be achieved by storing information in the cloud. The AR device may send the tracking map to a cloud to, for example, merge with environment maps selected from persisted maps previously stored in the cloud. In some embodiments, the selected persisted maps may be sent from the cloud to the AR device for merging. In some embodiments, the persisted maps may be oriented with respect to one or more persistent coordinate frames. Such maps may serve as canonical maps, as they can be used by any of multiple devices. In some embodiments, a model of a passable world may comprise or be created from one or more canonical maps. Devices, even though they perform some operations based on a coordinate frame local to the device, may nonetheless use the canonical map by determining a transformation between their coordinate frame local to the device and the canonical map.

A canonical map may originate as a tracking map (TM) (e.g., TM 1102 in FIG. 31A), which may be promoted to a canonical map. The canonical map may be persisted such that devices that access the canonical map may, once determining a transformation between their local coordinate system and a coordinate system of the canonical map, use the information in the canonical map to determine locations of objects represented in the canonical map in the physical world around the device. In some embodiments, a TM may be a headpose sparse map created by an XR device. In some embodiments, the canonical map may be created when an XR device sends one or more TMs to a cloud server for merging with additional TMs captured by the XR device at a different time or by other XR devices.

The canonical maps, or other maps, may provide information about the portions of the physical world represented by the data processed to create respective maps. For example, a tracking map may provide a floor plan of physical objects in a corresponding physical world, represented by points. In some embodiments, a map point may represent a feature of a physical object that may include multiple features. For example, each corner of a table may be a feature that is represented by a point on a map. The features may be derived from processing images, such as may be acquired with the sensors of a wearable device in an augmented reality system. The features, for example, may be derived by processing an image frame output by a sensor to identify features based on large gradients in the image or other suitable criteria. Further processing may limit the number of features in each frame. For example, processing may select features that likely represent persistent objects. One or more heuristics may be applied for this selection.

The tracking map may include data on points collected by a device. For each image frame with data points included in a tracking map, a pose may be stored. The pose may represent the orientation from which the image frame was captured, such that the feature points within each image frame may be spatially correlated. The pose may be determined by positioning information, such as may be derived from the sensors, such as an IMU sensor, on the wearable device. Alternatively or additionally, the pose may be determined from matching image frames to other image frames that depict overlapping portions of the physical world. By finding such positional correlation, which may be accomplished by matching subsets of features points in two frames, the relative pose between the two frames may be computed. A relative pose may be adequate for a tracking map, as the map may be relative to a coordinate system local to a device established based on the initial pose of the device when construction of the tracking map was initiated.

Not all of the feature points and image frames collected by a device may be retained as part of the tracking map, as much of the information collected with the sensors is likely to be redundant. Rather, only certain frames may be added to the map. Those frames may be selected based on one or more criteria, such as degree of overlap with image frames already in the map, the number of new features they contain, or a quality metric for the features in the frame. Image frames not added to the tracking map may be discarded or may be used to revise the location of features. As a further alternative, all or most of the image frames, represented as a set of features may be retained, but a subset of those frames may be designated as key frames, which are used for further processing.

The key frames may be processed to produce keyrigs. The key frames may be processed to produce three dimensional sets of feature points and saved as keyrigs. Such processing may entail, for example, comparing image frames derived simultaneously from two cameras to stereoscopically determine the 3D position of feature points. Metadata may be associated with these keyframes and/or keyrigs, such as poses.

The environment maps may have any of multiple formats depending on, for example, the storage locations of an environment map including, for example, local storage of AR devices and remote storage. For example, a map in remote storage may have higher resolution than a map in local storage on a wearable device where memory is limited. To send a higher resolution map from remote storage to local storage, the map may be down sampled or otherwise converted to an appropriate format, such as by reducing the number of poses per area of the physical world stored in the map and/or the number of feature points stored for each pose. In some embodiments, a slice or portion of a high resolution map from remote storage may be sent to local storage, where the slice or portion is not down sampled.

A database of environment maps may be updated as new tracking maps are created. To determine which of a potentially very large number of environment maps in a database is to be updated, updating may include efficiently selecting one or more environment maps stored in the database relevant to the new tracking map. The selected one or more environment maps may be ranked by relevance and one or more of the highest ranking maps may be selected for processing to merge higher ranked selected environment maps with the new tracking map to create one or more updated environment maps. When a new tracking map represents a portion of the physical world for which there is no preexisting environment map to update, that tracking map may be stored in the database as a new environment map.

H. Persistent Coordinate Frames

The inventors have recognized and appreciated that spatial persistence may be provided through persistent coordinate frames (PCFs). A PCF may be defined based on one or more points, representing features recognized in the physical world (e.g., corners, edges). The features may be selected such that they are likely to be the same from a user instance to another user instance of an XR system.

Further, drift during tracking, which causes the computed tracking path (e.g., camera trajectory) to deviate from the actual tracking path, can cause the location of virtual content, when rendered with respect to a local map that is based solely on a tracking map to appear out of place. A tracking map for the space may be refined to correct the drifts as an XR device collects more information of the scene overtime. However, if virtual content is placed on a real object before a map refinement and saved with respect to the world coordinate frame of the device derived from the tracking map, the virtual content may appear displaced, as if the real object has been moved during the map refinement. PCFs may be updated according to map refinement because the PCFs are defined based on the features and are updated as the features move during map refinements.

A PCF may comprise six degrees of freedom with translations and rotations relative to a map coordinate system. A PCF may be stored in a local and/or remote storage medium. The translations and rotations of a PCF may be computed relative to a map coordinate system depending on, for example, the storage location. For example, a PCF used locally by a device may have translations and rotations relative to a world coordinate frame of the device. A PCF in the cloud may have translations and rotations relative to a canonical coordinate frame of a canonical map.

PCFs may provide a sparse representation of the physical world, providing less than all of the available information about the physical world, such that they may be efficiently processed and transferred. Techniques for processing persistent spatial information may include creating dynamic maps based on one or more coordinate systems in real space across one or more sessions, generating persistent coordinate frames (PCF) over the sparse maps, which may be exposed to XR applications via, for example, an application programming interface (API).

Figure 14:
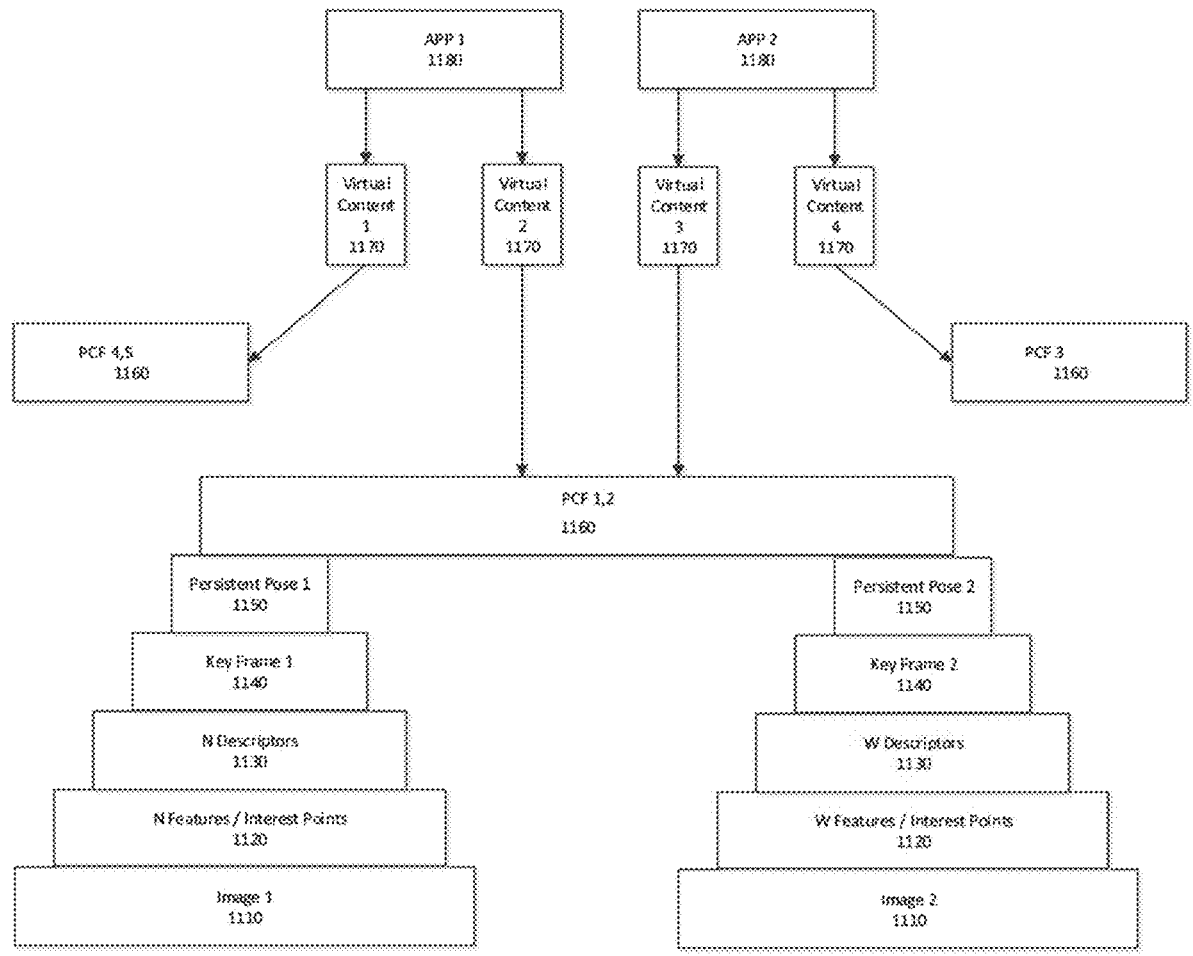
FIG. 14 is a block diagram illustrating the creation of a persistent coordinate frame (PCF) and the attachment of XR content to the PCF, according to some embodiments.

FIG. 14 is a block diagram illustrating the creation of a persistent coordinate frame (PCF) and the attachment of XR content to the PCF, according to some embodiments. Each block may represent digital information stored in a computer memory. In the case of applications 1180, the data may represent computer-executable instructions. In the case of virtual content 1170, the digital information may define a virtual object, as specified by the application 1180, for example. In the case of the other boxes, the digital information may characterize some aspect of the physical world.

In the illustrated embodiment, one or more PCFs are created from images captured with sensors on a wearable device. In the embodiment of FIG. 14, the sensors are visual image cameras. These cameras may be the same cameras used for forming a tracking map. Accordingly, some of the processing suggested by FIG. 14 may be performed as part of updating a tracking map. However, FIG. 14 illustrates that information that provides persistence is generated in addition to the tracking map.

In order to derive a 3D PCF, two images 1110 from two cameras mounted to a wearable device in a configuration that enables stereoscopic image analysis are processed together. FIG. 14 illustrates an Image 1 and an Image 2, each derived from one of the cameras. A single image from each camera is illustrated for simplicity. However, each camera may output a stream of image frames and the processing illustrated in FIG. 14 may be performed for multiple image frames in the stream.

Accordingly, Image 1 and Image 2 may each be one frame in a sequence of image frames. Processing as depicted in FIG. 14 may be repeated on successive image frames in the sequence until image frames containing feature points providing a suitable image from which to form persistent spatial information is processed. Alternatively or additionally, the processing of FIG. 14 might be repeated as a user moves such that the user is no longer close enough to a previously identified PCF to reliably use that PCF for determining positions with respect to the physical world. For example, an XR system may maintain a current PCF for a user. When that distance exceeds a threshold, the system may switch to a new current PCF, closer to the user, which may be generated according to the process of FIG. 14, using image frames acquired in the user's current location.

Even when generating a single PCF, a stream of image frames may be processed to identify image frames depicting content in the physical world that is likely stable and can be readily identified by a device in the vicinity of the region of the physical world depicted in the image frame. In the embodiment of FIG. 14, this processing begins with the identification of features 1120 in the image. Features may be identified, for example, by finding locations of gradients in the image above a threshold or other characteristics, which may correspond to a corner of an object, for example. In the embodiment illustrated, the features are points, but other recognizable features, such as edges, may alternatively or additionally be used.

In the embodiment illustrated, a fixed number, N, of features 1120 are selected for further processing. Those feature points may be selected based on one or more criteria, such as magnitude of the gradient, or proximity to other feature points. Alternatively or additionally, the feature points may be selected heuristically, such as based on characteristics that suggest the feature points are persistent. For example, heuristics may be defined based on the characteristics of feature points that likely correspond to a corner of a window or a door or a large piece of furniture. Such heuristics may take into account the feature point itself and what surrounds it. As a specific example, the number of feature points per image may be between 100 and 500 or between 150 and 250, such as 200.

Regardless of the number of feature points selected, descriptors 1130 may be computed for the feature points. In this example, a descriptor is computed for each selected feature point, but a descriptor may be computed for groups of feature points or for a subset of the feature points or for all features within an image. The descriptor characterizes a feature point such that feature points representing the same object in the physical world are assigned similar descriptors. The descriptors may facilitate alignment of two frames, such as may occur when one map is localized with respect to another. Rather than searching for a relative orientation of the frames that minimizes the distance between feature points of the two images, an initial alignment of the two frames may be made by identifying feature points with similar descriptors. Alignment of the image frames may be based on aligning points with similar descriptors, which may entail less processing than computing an alignment of all the feature points in the images.

The descriptors may be computed as a mapping of the feature points or, in some embodiments a mapping of a patch of an image around a feature point, to a descriptor. The descriptor may be a numeric quantity. U.S. patent application Ser. No. 16/190,948 describes computing descriptors for feature points and is hereby incorporated herein by reference in its entirety.

In the example of FIG. 14, a descriptor 1130 is computed for each feature point in each image frame. Based on the descriptors and/or the feature points and/or the image itself, the image frame may be identified as a key frame 1140. In the embodiment illustrated, a key frame is an image frame meeting certain criteria that is then selected for further processing. In making a tracking map, for example, image frames that add meaningful information to the map may be selected as key frames that are integrated into the map. On the other hand, image frames that substantially overlap a region for which an image frame has already been integrated into the map may be discarded such that they do not become key frames. Alternatively or additionally, key frames may be selected based on the number and/or type of feature points in the image frame. In the embodiment of FIG. 14, key frames 1150 selected for inclusion in a tracking map may also be treated as key frames for determining a PCF, but different or additional criteria for selecting key frames for generation of a PCF may be used.

Though FIG. 14 shows that a key frame is used for further processing, information acquired from an image may be processed in other forms. For example, the feature points, such as in a key rig, may alternatively or additionally be processed. Moreover, though a key frame is described as being derived from a single image frame, it is not necessary that there be a one to one relationship between a key frame and an acquired image frame. A key frame, for example, may be acquired from multiple image frames, such as by stitching together or aggregating the image frames such that only features appearing in multiple images are retained in the key frame.

A key frame may include image information and/or metadata associated with the image information. In some embodiments, images captured by the cameras 44, 46 (FIG. 9) may be computed into one or more key frames (e.g., key frames 1, 2). In some embodiments, a key frame may include a camera pose. In some embodiments, a key frame may include one or more camera images captured at the camera pose. In some embodiments, an XR system may determine a portion of the camera images captured at the camera pose as not useful and thus not include the portion in a key frame. Therefore, using key frames to align new images with earlier knowledge of a scene reduces the use of computational resource of the XR system. In some embodiments, a key frame may include an image, and/or image data, at a location with a direction/angle. In some embodiments, a key frame may include a location and a direction from which one or more map points may be observed. In some embodiments, a key frame may include a coordinate frame with an ID. U.S. patent application Ser. No. 15/877,359 describes key frames and is hereby incorporated herein by reference in its entirety.

Some or all of the key frames 1140 may be selected for further processing, such as the generation of a persistent pose 1150 for the key frame. The selection may be based on the characteristics of all, or a subset of, the feature points in the image frame. Those characteristics may be determined from processing the descriptors, features, and/or image frame, itself. As a specific example, the selection may be based on a cluster of feature points identified as likely to relate to a persistent object.

Each key frame is associated with a pose of the camera at which that key frame was acquired. For key frames selected for processing into a persistent pose, that pose information may be saved along with other metadata about the key frame, such as a WiFi fingerprint and/or GPS coordinates at the time of acquisition and/or at the location of acquisition.

The persistent poses are a source of information that a device may use to orient itself relative to previously acquired information about the physical world. For example, if the key frame from which a persistent pose was created is incorporated into a map of the physical world, a device may orient itself relative to that persistent pose using a sufficient number of feature points in the key frame that are associated with the persistent pose. The device may align a current image that it takes of its surroundings to the persistent pose. This alignment may be based on matching the current image to the image 1110, the features 1120, and/or the descriptors 1130 that gave rise to the persistent pose, or any subset of that image or those features or descriptors. In some embodiments, the current image frame that is matched to the persistent pose may be another key frame that has been incorporated into the device's tracking map.

Information about a persistent pose may be stored in a format that facilitates sharing among multiple applications, which may be executing on the same or different devices. In the example of FIG. 14, some or all of the persistent poses may be reflected as a persistent coordinate frames (PCF) 1160. Like a persistent pose, a PCF may be associated with a map and may comprise a set of features, or other information, that a device can use to determine its orientation with respect to that PCF. The PCF may include a transformation that defines its transformation with respect to the origin of its map, such that, by correlating its position to a PCF, the device can determine its position with respect to any objects in the physical world reflected in the map.

As the PCF provides a mechanism for determining locations with respect to the physical objects, an application, such as applications 1180, may define positions of virtual objects with respect to one or more PCFs, which serve as anchors for the virtual content 1170. FIG. 14 illustrates, for example, that App 1 has associated its virtual content 2 with PCF 1,2. Likewise, App 2 has associated its virtual content 3 with PCF 1,2. App 1 is also shown associating its virtual content 1 to PCF 4,5, and App 2 is shown associating its virtual content 4 with PCF 3. In some embodiments, PCF 3 may be based on Image 3 (not shown), and PCF 4,5 may be based on Image 4 and Image 5 (not shown), analogously to how PCF 1,2 is based on Image 1 and Image 2. When rendering this virtual content, a device may apply one or more transformations to compute information, such as the location of the virtual content with respect to the display of the device and/or the location of physical objects with respect to the desired location of the virtual content. Using the PCF's as reference may simplify such computations.

In some embodiments, a persistent pose may be a coordinate location and/or direction that has one or more associated key frames. In some embodiments, a persistent pose may be automatically created after the user has traveled a certain distance, e.g., three meters. In some embodiments, the persistent poses may act as reference points during localization. In some embodiments, the persistent poses may be stored in a passable world (e.g., the passable world module 538).

In some embodiments, a new PCF may be determined based on a pre-defined distance allowed between adjacent PCFs. In some embodiments, one or more persistent poses may be computed into a PCF when a user travels a pre-determined distance, e.g., five meters. In some embodiments, PCFs may be associated with one or more world coordinate frames and/or canonical coordinate frames, e.g., in the passable world. In some embodiments, PCFs may be stored in a local and/or remote database depending on, for example, security settings.

Figure 15:
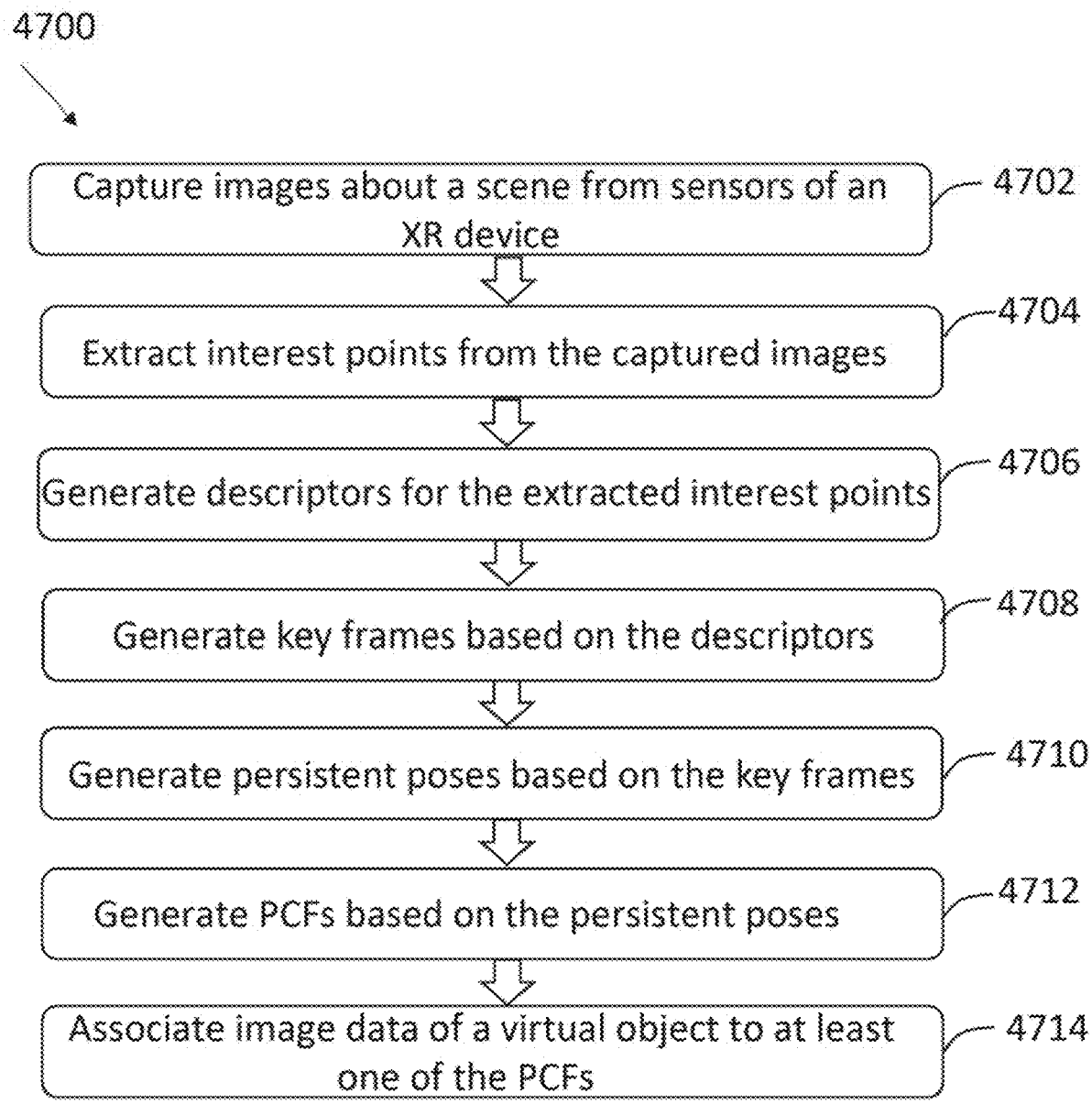
FIG. 15 is a flow chart illustrating a method of establishing and using a PCF, according to some embodiments.

FIG. 15 illustrates a method 4700 of establishing and using a persistence coordinate frame, according to some embodiments. The method 4700 may start from capturing (Act 4702) images (e.g., Image 1 and Image 2 in FIG. 14) about a scene using one or more sensors of an XR device. Multiple cameras may be used and one camera may generate multiple images, for example, in a stream.

The method 4700 may include extracting (4704) interest points (e.g., map points, features 1120 in FIG. 14) from the captured images, generating (Act 4706) descriptors (e.g., descriptors 1130 in FIG. 14) for the extracted interest points, and generating (Act 4708) key frames (e.g., key frames 1140) based on the descriptors. In some embodiments, the method may compare interest points in the key frames, and form pairs of key frames that share a predetermined amount of interest points. The method may reconstruct parts of the physical world using individual pairs of key frames. Mapped parts of the physical world may be saved as 3D features (e.g., a keyrig). In some embodiments, a selected portion of the pairs of key frames may be used to build 3D features. In some embodiments, results of the mapping may be selectively saved. Key frames not used for building 3D features may be associated with the 3D features through poses, for example, representing distances between key frames with a covariance matrix between poses of keyframes. In some embodiments, pairs of key frames may be selected to build the 3D features such that distances between each of the build 3D features are within a predetermined distance, which may be determined to balance the amount of computation needed and the level of accuracy of a resulting model. Such approaches enable providing a model of the physical world with the amount of data that is suitable for efficient and accurate computation with an XR system. In some embodiments, a covariance matrix of two images may include covariances between poses of the two images (e.g., six degree of freedom).

The method 4700 may include generating (Act 4710) persistent poses based on the key frames. In some embodiments, the method may include generating the persistent poses based on the 3D features reconstructed from pairs of key frames. In some embodiments, a persistent pose may be attached to a 3D feature. In some embodiments, the persistent pose may include a pose of a key frame used to construct the 3D feature. In some embodiments, the persistent pose may include an average pose of key frames used to construct the 3D feature. In some embodiments, persistent poses may be generated such that distances between neighboring persistent poses are within a predetermined value, for example, in the range of one meter to five meters, any value in between, or any other suitable value. In some embodiments, the distances between neighboring persistent poses may be represented by a covariance matrix of the neighboring persistent poses.

The method 4700 may include generating (Act 4712) PCFs based on the persistent poses. In some embodiments, a PCF may be attached to a 3D feature. In some embodiments, a PCF may be associated with one or more persistent poses. In some embodiments, a PCF may include a pose of one of the associated persistent poses. In some embodiments, a PCF may include an average pose of the poses of the associated persistent poses. In some embodiments, PCFs may be generated such that distances between neighboring PCFs are within a predetermined value, for example, in the range of three meters to ten meters, any value in between, or any other suitable value. In some embodiments, the distances between neighboring PCFs may be represented by a covariance matrix of the neighboring PCFs. In some embodiments, PCFs may be exposed to XR applications via, for example, an application programming interface (API) such that the XR applications can access a model of the physical world through the PCFs without accessing the model itself.

The method 4700 may include associating (Act 4714) image data of a virtual object to be displayed by the XR device to at least one of the PCFs. In some embodiments, the method may include computing translations and orientations of the virtual object with respect to the associated PCF. It should be appreciated that it is not necessary to associate a virtual object to a PCF generated by the device placing the virtual object. For example, a device may retrieve saved PCFs in a canonical map in a cloud and associate a virtual object to a retrieved PCF. It should be appreciated that the virtual object may move with the associated PCF as the PCF is adjusted overtime.

Figure 16:
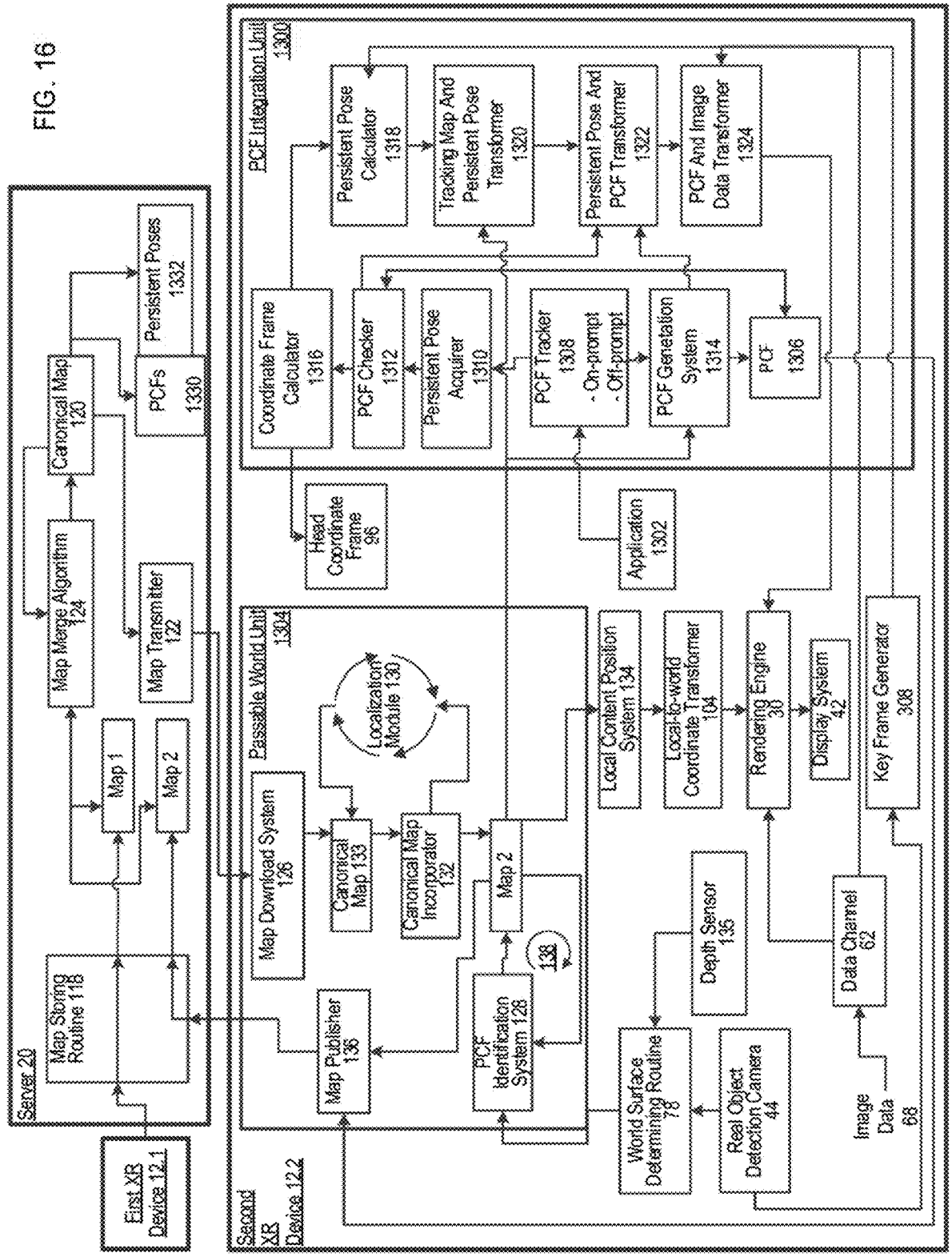
FIG. 16 is a block diagram of the XR system of FIG. 8, including a second XR device, according to some embodiments.

FIG. 16 illustrates the first XR device 12.1 and vision data and algorithms of a second XR device 12.2 and the server 20, according to some embodiments. The components illustrated in FIG. 16 may operate to perform some or all of the operations associated with generating, updating, and/or using spatial information, such as persistent poses, persistent coordinate frames, tracking maps, or canonical maps, as described herein. Although not illustrated, the first XR device 12.1 may be configured the same as the second XR device 12.2. The server 20 may have a map storing routine 118, a canonical map 120, a map transmitter 122, and a map merge algorithm 124.

The second XR device 12.2, which may be in the same scene as the first XR device 12.1, may include a persistent coordinate frame (PCF) integration unit 1300, an application 1302 that generates the image data 68 that may be used to render a virtual object, and a frame embedding generator 308. In some embodiments, a map download system 126, PCF identification system 128, Map 2, localization module 130, canonical map incorporator 132, canonical map 133, and map publisher 136 may be grouped into a passable world unit 1304. The PCF integration unit 1300 may be connected to the passable world unit 1304 and other components of the second XR device 12.2 to allow for the retrieval, generation, use, upload, and download of PCFs.

A map, comprising PCFs, may enable more persistence in a changing world. In some embodiments, localizing a tracking map including, for example, matching features for images, may include selecting features that represent persistent content from the map constituted by PCFs, which enables fast matching and/or localizing. For example, a world where people move into and out of the scene and objects such as doors move relative to the scene, requires less storage space and transmission rates, and enables the use of individual PCFs and their relationships relative to one another (e.g., integrated constellation of PCFs) to map a scene.

In some embodiments, the PCF integration unit 1300 may include PCFs 1306 that were previously stored in a data store on a storage unit of the second XR device 12.2, a PCF tracker 1308, a persistent pose acquirer 1310, a PCF checker 1312, a PCF generation system 1314, a coordinate frame calculator 1316, a persistent pose calculator 1318, and three transformers, including a tracking map and persistent pose transformer 1320, a persistent pose and PCF transformer 1322, and a PCF and image data transformer 1324.

In some embodiments, the PCF tracker 1308 may have an on-prompt and an off-prompt that are selectable by the application 1302. The application 1302 may be executable by a processor of the second XR device 12.2 to, for example, display a virtual content. The application 1302 may have a call that switches the PCF tracker 1308 on via the on-prompt. The PCF tracker 1308 may generate PCFs when the PCF tracker 1308 is switched on. The application 1302 may have a subsequent call that can switch the PCF tracker 1308 off via the off-prompt. The PCF tracker 1308 terminates PCF generation when the PCF tracker 1308 is switched off.

In some embodiments, the server 20 may include a plurality of persistent poses 1332 and a plurality of PCFs 1330 that have previously been saved in association with a canonical map 120. The map transmitter 122 may transmit the canonical map 120 together with the persistent poses 1332 and/or the PCFs 1330 to the second XR device 12.2. The persistent poses 1332 and PCFs 1330 may be stored in association with the canonical map 133 on the second XR device 12.2. When Map 2 localizes to the canonical map 133, the persistent poses 1332 and the PCFs 1330 may be stored in association with Map 2.

In some embodiments, the persistent pose acquirer 1310 may acquire the persistent poses for Map 2. The PCF checker 1312 may be connected to the persistent pose acquirer 1310. The PCF checker 1312 may retrieve PCFs from the PCFs 1306 based on the persistent poses retrieved by the persistent pose acquirer 1310. The PCFs retrieved by the PCF checker 1312 may form an initial group of PCFs that are used for image display based on PCFs.

In some embodiments, the application 1302 may require additional PCFs to be generated. For example, if a user moves to an area that has not previously been mapped, the application 1302 may switch the PCF tracker 1308 on. The PCF generation system 1314 may be connected to the PCF tracker 1308 and begin to generate PCFs based on Map 2 as Map 2 begins to expand. The PCFs generated by the PCF generation system 1314 may form a second group of PCFs that may be used for PCF-based image display.

The coordinate frame calculator 1316 may be connected to the PCF checker 1312. After the PCF checker 1312 retrieved PCFs, the coordinate frame calculator 1316 may invoke the head coordinate frame 96 to determine a head pose of the second XR device 12.2. The coordinate frame calculator 1316 may also invoke the persistent pose calculator 1318. The persistent pose calculator 1318 may be directly or indirectly connected to the frame embedding generator 308. In some embodiments, an image/frame may be designated a key frame after a threshold distance from the previous key frame, e.g., 3 meters, is traveled. The persistent pose calculator 1318 may generate a persistent pose based on a plurality, for example three, key frames. In some embodiments, the persistent pose may be essentially an average of the coordinate frames of the plurality of key frames.

The tracking map and persistent pose transformer 1320 may be connected to Map 2 and the persistent pose calculator 1318. The tracking map and persistent pose transformer 1320 may transform Map 2 to the persistent pose to determine the persistent pose at an origin relative to Map 2.

The persistent pose and PCF transformer 1322 may be connected to the tracking map and persistent pose transformer 1320 and further to the PCF checker 1312 and the PCF generation system 1314. The persistent pose and PCF transformer 1322 may transform the persistent pose (to which the tracking map has been transformed) to the PCFs from the PCF checker 1312 and the PCF generation system 1314 to determine the PCF's relative to the persistent pose.

The PCF and image data transformer 1324 may be connected to the persistent pose and PCF transformer 1322 and to the data channel 62. The PCF and image data transformer 1324 transforms the PCF's to the image data 68. The rendering engine 30 may be connected to the PCF and image data transformer 1324 to display the image data 68 to the user relative to the PCFs.

The PCF integration unit 1300 may store the additional PCFs that are generated with the PCF generation system 1314 within the PCFs 1306. The PCFs 1306 may be stored relative to persistent poses. The map publisher 136 may retrieve the PCFs 1306 and the persistent poses associated with the PCFs 1306 when the map publisher 136 transmits Map 2 to the server 20, the map publisher 136 also transmits the PCF's and persistent poses associated with Map 2 to the server 20. When the map storing routine 118 of the server 20 stores Map 2, the map storing routine 118 may also store the persistent poses and PCFs generated by the second viewing device 12.2. The map merge algorithm 124 may create the canonical map 120 with the persistent poses and PCFs of Map 2 associated with the canonical map 120 and stored within the persistent poses 1332 and PCFs 1330, respectively.

The first XR device 12.1 may include a PCF integration unit similar to the PCF integration unit 1300 of the second XR device 12.2. When the map transmitter 122 transmits the canonical map 120 to the first XR device 12.1, the map transmitter 122 may transmit the persistent poses 1332 and PCF's 1330 associated with the canonical map 120 and originating from the second XR device 12.2. The first XR device 12.1 may store the PCFs and the persistent poses within a data store on a storage device of the first XR device 12.1. The first XR device 12.1 may then make use of the persistent poses and the PCFs originating from the second XR device 12.2 for image display relative to the PCFs. Additionally or alternatively, the first XR device 12.1 may retrieve, generate, make use, upload, and download PCFs and persistent poses in a manner similar to the second XR device 12.2 as described above.

In the illustrated example, the first XR device 12.1 generates a local tracking map (referred to hereinafter as "Map 1") and the map storing routine 118 receives Map 1 from the first XR device 12.1. The map storing routine 118 then stores Map 1 on a storage device of the server 20 as the canonical map 120.

The second XR device 12.2 includes a map download system 126, an anchor identification system 128, a localization module 130, a canonical map incorporator 132, a local content position system 134, and a map publisher 136.

In use, the map transmitter 122 sends the canonical map 120 to the second XR device 12.2 and the map download system 126 downloads and stores the canonical map 120 as a canonical map 133 from the server 20.

The anchor identification system 128 is connected to the world surface determining routine 78. The anchor identification system 128 identifies anchors based on objects detected by the world surface determining routine 78. The anchor identification system 128 generates a second map (Map 2) using the anchors. As indicated by the cycle 138, the anchor identification system 128 continues to identify anchors and continues to update Map 2. The locations of the anchors are recorded as three-dimensional data based on data provided by the world surface determining routing 78. The world surface determining routine 78 receives images from the real object detection camera 44 and depth data from depth sensors 135 to determine the locations of surfaces and their relative distance from the depth sensors 135.

The localization module 130 is connected to the canonical map 133 and Map 2. The localization module 130 repeatedly attempts to localize Map 2 to the canonical map 133. The canonical map incorporator 132 is connected to the canonical map 133 and Map 2. When the localization module 130 localizes Map 2 to the canonical map 133, the canonical map incorporator 132 incorporates the canonical map 133 into anchors of Map 2. Map 2 is then updated with missing data that is included in the canonical map.

The local content position system 134 is connected to Map 2. The local content position system 134 may, for example, be a system wherein a user can locate local content in a particular location within a world coordinate frame. The local content then attaches itself to one anchor of Map 2. The local-to-world coordinate transformer 104 transforms the local coordinate frame to the world coordinate frame based on the settings of the local content position system 134. The functioning of the rendering engine 30, display system 42, and data channel 62 have been described with reference to FIG. 2.

The map publisher 136 uploads Map 2 to the server 20. The map storing routine 118 of the server 20 then stores Map 2 within a storage medium of the server 20.

The map merge algorithm 124 merges Map 2 with the canonical map 120. When more than two maps, for example, three or four maps relating to the same or adjacent regions of the physical world, have been stored, the map merge algorithm 124 merges all the maps into the canonical map 120 to render a new canonical map 120. The map transmitter 122 then transmits the new canonical map 120 to any and all devices 12.1 and 12.2 that are in an area represented by the new canonical map 120. When the devices 12.1 and 12.2 localize their respective maps to the canonical map 120, the canonical map 120 becomes the promoted map.

Figure 17:
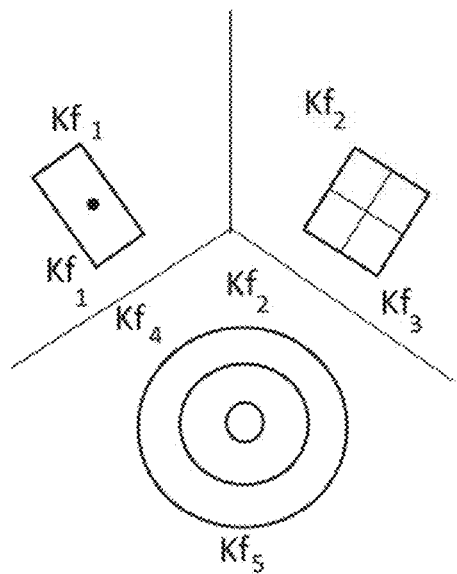
FIG. 17 is a schematic diagram illustrating a room and key frames that are established for various areas in the room, according to some embodiments.

FIG. 17 illustrates an example of generating key frames for a map of a scene, according to some embodiments. In the illustrated example, a first key frame, KF1, is generated for a door on a left wall of the room. A second key frame, KF2, is generated for an area in a corner where a floor, the left wall, and a right wall of the room meet. A third key frame, KF3, is generated for an area of a window on the right wall of the room. A fourth key frame, KF4, is generated for an area at a far end of a rug on a floor of the wall. A fifth key frame, KF5, is generated for an area of the rug closest to the user.

Figure 18:
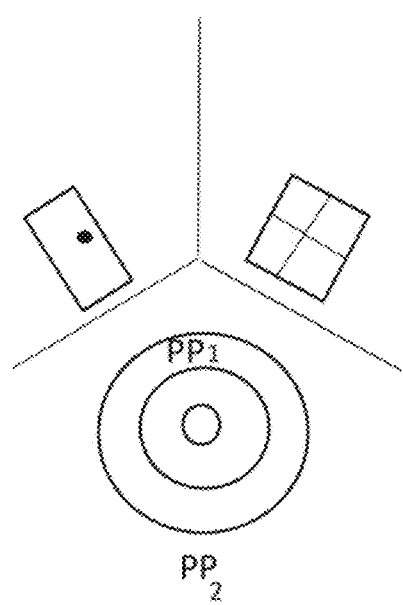
FIG. 18 is a schematic diagram illustrating the establishment of persistent poses based on the key frames, according to some embodiments.

FIG. 18 illustrates an example of generating persistent poses for the map of FIG. 17, according to some embodiments. In some embodiments, a new persistent pose is created when the device measures a threshold distance traveled, and/or when an application requests a new persistent pose (PP). In some embodiments, the threshold distance may be 3 meters, 5 meters, 20 meters, or any other suitable distance. Selecting a smaller threshold distance (e.g., 1 m) may result in an increase in compute load since a larger number of PPs may be created and managed compared to larger threshold distances. Selecting a larger threshold distance (e.g., 40 m) may result in increased virtual content placement error since a smaller number of PPs would be created, which would result in fewer PCFs being created, which means the virtual content attached to the PCF could be a relatively large distance (e.g. 30 m) away from the PCF, and error increases with increasing distance from a PCF to the virtual content.

In some embodiments, a PP may be created at the start of a new session. This initial PP may be thought of as zero, and can be visualized as the center of a circle that has a radius equal to the threshold distance. When the device reaches the perimeter of the circle, and, in some embodiments, an application requests a new PP, a new PP may be placed at the current location of the device (at the threshold distance). In some embodiments, a new PP will not be created at the threshold distance if the device is able to find an existing PP within the threshold distance from the device's new position. In some embodiments, when a new PP (e.g., PP1150 in FIG. 14) is created, the device attaches one or more of the closest key frames to the PP. In some embodiments, the location of the PP relative to the key frames may be based on the location of the device at the time a PP is created. In some embodiments, a PP will not be created when the device travels a threshold distance unless an application requests a PP.

In some embodiments, an application may request a PCF from the device when the application has virtual content to display to the user. The PCF request from the application may trigger a PP request, and a new PP would be created after the device travels the threshold distance. FIG. 18 illustrates a first persistent pose PP1 which may have the closest key frames, (e.g., KF1, KF2, and KF3) attached by, for example, computing relative poses between the key frames to the persistent pose. FIG. 18 also illustrates a second persistent pose PP2 which may have the closest key frames (e.g., KF4 and KF5) attached.

Figure 19:
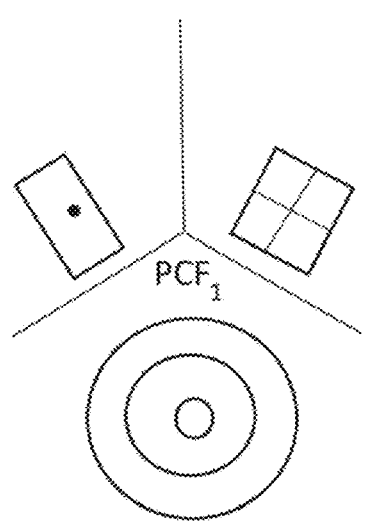
FIG. 19 is a schematic diagram illustrating the establishment of a persistent coordinate frame (PCF) based on the persistent poses, according to some embodiments.

FIG. 19 illustrates an example of generating a PCF for the map of FIG. 17, according to some embodiments. In the illustrated example, PCF 1 may include PP1 and PP2. As described above, the PCF may be used for displaying image data relative to the PCF. In some embodiments, each PCF may have coordinates in another coordinate frame (e.g., a world coordinate frame) and a PCF descriptor, for example, uniquely identifying the PCF. In some embodiments, the PCF descriptor may be computed based on feature descriptors of features in frames associated with the PCF. In some embodiments, various constellations of PCFs may be combined to represent the real world in a persistent manner that requires less data and less transmission of data.

FIGS. 20A to 20C are schematic diagrams illustrating an example of establishing and using a persistent coordinate frame. FIG. 20A shows two users 4802A, 4802B with respective local tracking maps 4804A, 4804B that have not localized to a canonical map. The origins 4806A, 4806B for individual users are depicted by the coordinate system (e.g., a world coordinate system) in their respective areas. These origins of each tracking map may be local to each user, as the origins are dependent on the orientation of their respective devices when tracking was initiated.

As the sensors of the user device scan the environment, the device may capture images that, as described above in connection with FIG. 14, may contain features representing persistent objects such that those images may be classified as key frames, from which a persistent pose may be created. In this example, the tracking map 4804A includes a persistent pose (PP) 4808A; the tracking map 4804B includes a PP 4808B.

Also as described above in connection with FIG. 14, some of the PP's may be classified as PCF's which are used to determine the orientation of virtual content for rendering it to the user. FIG. 20B shows that XR devices worn by respective users 4802A, 4802B may create local PCFs 4810A, 4810B based on the PP 4808A, 4808B. FIG. 20C shows that persistent content 4812A, 4812B (e.g., a virtual content) may be attached to the PCFs 4810A, 4810B by respective XR devices.

In this example, virtual content may have a virtual content coordinate frame, that may be used by an application generating virtual content, regardless of how the virtual content should be displayed. The virtual content, for example, may be specified as surfaces, such as triangles of a mesh, at particular locations and angles with respect to the virtual content coordinate frame. To render that virtual content to a user, the locations of those surfaces may be determined with respect to the user that is to perceive the virtual content.

Attaching virtual content to the PCFs may simplify the computation involved in determining locations of the virtual content with respect to the user. The location of the virtual content with respect to a user may be determined by applying a series of transformations. Some of those transformations may change, and may be updated frequently. Others of those transformations may be stable and may be updated infrequently or not at all. Regardless, the transformations may be applied with relatively low computational burden such that the location of the virtual content can be updated with respect to the user frequently, providing a realistic appearance to the rendered virtual content.

In the example of FIGS. 20A-20C, user 1's device has a coordinate system that can be related to the coordinate system that defines the origin of the map by the transformation rig1_T_w1. User 2's device has a similar transformation rig2_T_w2. These transformations may be expressed as 6 degree of transformation, specifying translation and rotation to align the device coordinate systems with the map coordinate systems. In some embodiments, the transformation may be expressed as two separate transformations, one specifying translation and the other specifying rotation. Accordingly, it should be appreciated that the transformations may be expressed in a form that simplifies computation or otherwise provides an advantage.

Transformations between the origins of the tracking maps and the PCF's identified by the respective user devices are expressed as pcf1_T_w1 and pcf2_T_w2. In this example the PCF and the PP are identical, such that the same transformation also characterizes the PP's.

The location of the user device with respect to the PCF can therefore be computed by the serial application of these transformations, such as rig1_T_pcf1=(rig1_T_w1)*(pcf1_T_w1).

As shown in FIG. 20C, the virtual content is located with respect to the PCF's, with a transformation of obj1_T_pcf1. This transformation may be set by an application generating the virtual content that may receive information from a world reconstruction system describing physical objects with respect to the PCF. To render the virtual content to the user, a transformation to the coordinate system of the user's device is computed, which may be computed by relating the virtual content coordinate frame to the origin of the tracking map through the transformation obj1_t_w1=(obj1_T_pcf1)*(pcf1_T_w1). That transformation may then be related to the user's device through further transformation rig1_T_w1.

The location of the virtual content may change, based on output from an application generating the virtual content. When that changes, the end-to-end transformation, from a source coordinate system to a destination coordinate system, may be recomputed. Additionally, the location and/or head pose of the user may change as the user moves. As a result, the transformation rig1_T_w1 may change, as would any end-to-end transformation that depends on the location or head pose of the user.

The transformation rig1_T_w1 may be updated with motion of the user based on tracking the position of the user with respect to stationary objects in the physical world. Such tracking may be performed by a headphone tacking component processing a sequence of images, as described above, or other component of the system. Such updates may be made by determining pose of the user with respect to a stationary frame of reference, such as a PP.

In some embodiments, the location and orientation of a user device may be determined relative to the nearest persistent pose, or, in this example, a PCF, as the PP is used as a PCF. Such a determination may be made by identifying in current images captured with sensors on the device feature points that characterize the PP. Using image processing techniques, such as stereoscopic image analysis, the location of the device with respect to those feature points may be determined. From this data, the system could calculate the change in transformation associated with the user's motions based on the relationship rig1_T_pcf1=(rig1_T_w1)*(pcf1_T_w1).

A system may determine and apply transformations in an order that is computationally efficient. For example, the need to compute rig1_T_w1 from a measurement yielding rig1_T_pcf1 might be avoided by tracking both user pose and defining the location of virtual content relative to the PP or a PCF built on a persistent pose. In this way the transformation from a source coordinate system of the virtual content to the destination coordinate system of the user's device may be based on the measured transformation according to the expression (rig1_T_pcf1)*(obj1_t_pcf1), with the first transformation being measured by the system and the latter transformation being supplied by an application specifying virtual content for rendering. In embodiments in which the virtual content is positioned with respect to the origin of the map, the end-to-end transformation may relate the virtual object coordinate system to the PCF coordinate system based on a further transformation between the map coordinates and the PCF coordinates. In embodiments in which the virtual content is positioned with respect to a different PP or PCF than the one against which user position is being tracked, a transformation between the two may be applied. Such a transformation may be fixed and may be determined, for example, from a map in which both appear.

A transform-based approach may be implemented, for example, in a device with components that process sensor data to build a tracking map. As part of that process, those components may identify feature points that may be used as persistent poses, which in turn may be turned into PCF's. Those components may limit the number of persistent poses generated for the map, to provide a suitable spacing between persistent poses, while allowing the user, regardless of location in the physical environment, to be close enough to a persistent pose location to accurately compute the user's pose, as described above in connection with FIGS. 17-19. As the closest persistent pose to a user is updated, as a result of user movement, refinements to the tracking map or other causes, any of the transformations that are used to compute the location of virtual content relative to the user that depend on the location of the PP (or PCF if being used) may be updated and stored for use, at least until the user moves away from that persistent pose. Nonetheless, by computing and storing transformations, the computational burden each time the location of virtual content is updated may be relatively low, such that it may be performed with relatively low latency.

FIGS. 20A-20C illustrate positioning with respect to a tracking map, and each device had its own tracking map. However, transformations may be generated with respect to any map coordinate system. Persistence of content across user sessions of an XR system may be achieved by using a persistent map. Shared experiences of users may also be facilitated by using a map to which multiple user devices may be oriented.

In some embodiments, described in greater detail below, the location of virtual content may be specified in relation to coordinates in a canonical map, formatted such that any of multiple devices may use the map. Each device might maintain a tracking map and may determine the change of pose of the user with respect to the tracking map. In this example, a transformation between the tracking map and the canonical map may be determined through a process of "localization"—which may be performed by matching structures in the tracking map (such as one or more persistent poses) to one or more structures of the canonical map (such as one or more PCFs).

Described in greater below are techniques for creating and using canonical maps in this way.

I. Map Creation Process

Figure 21:
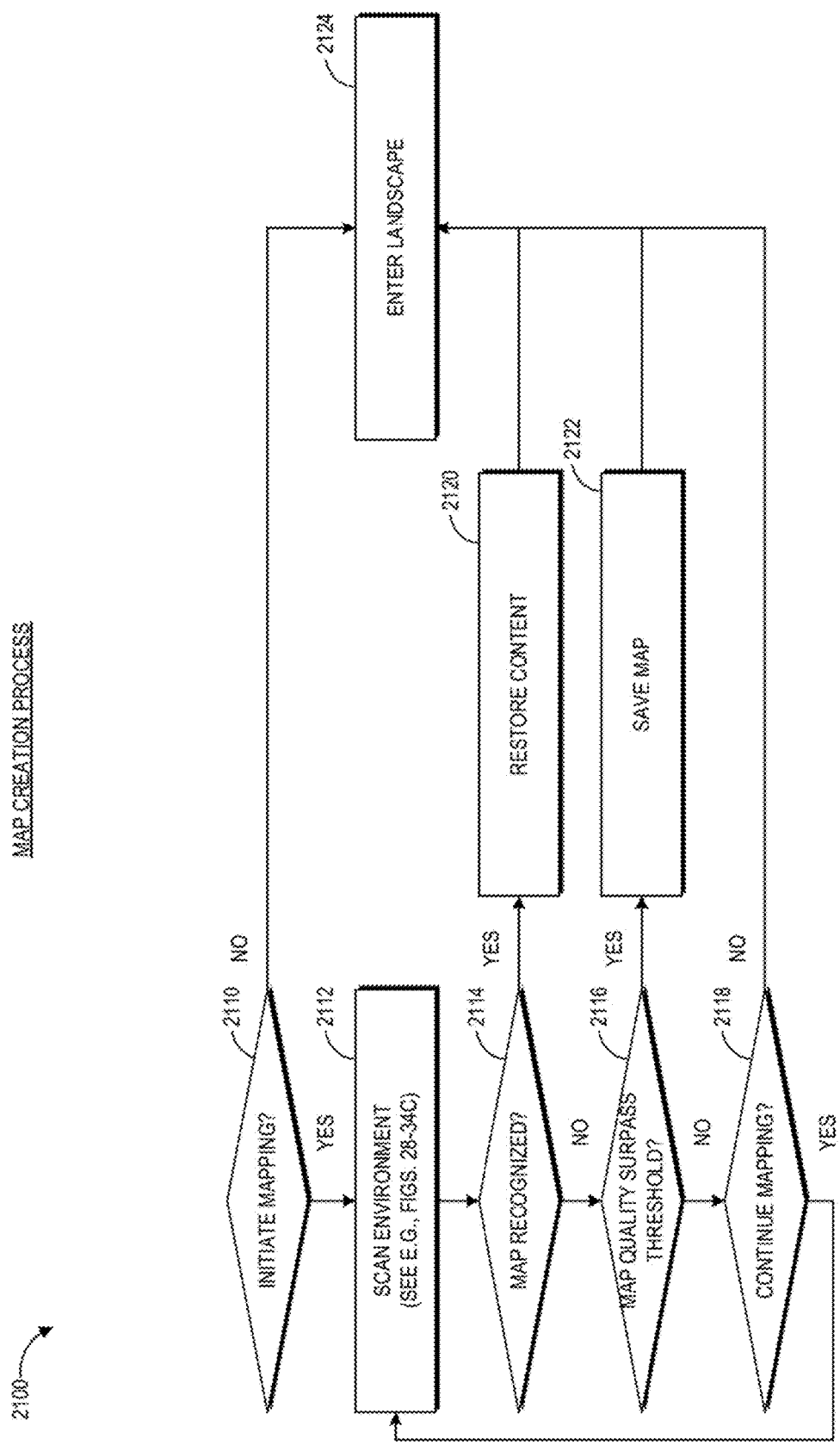
FIG. 21 illustrates an example block diagram of a map creation process.
Figure 22A:
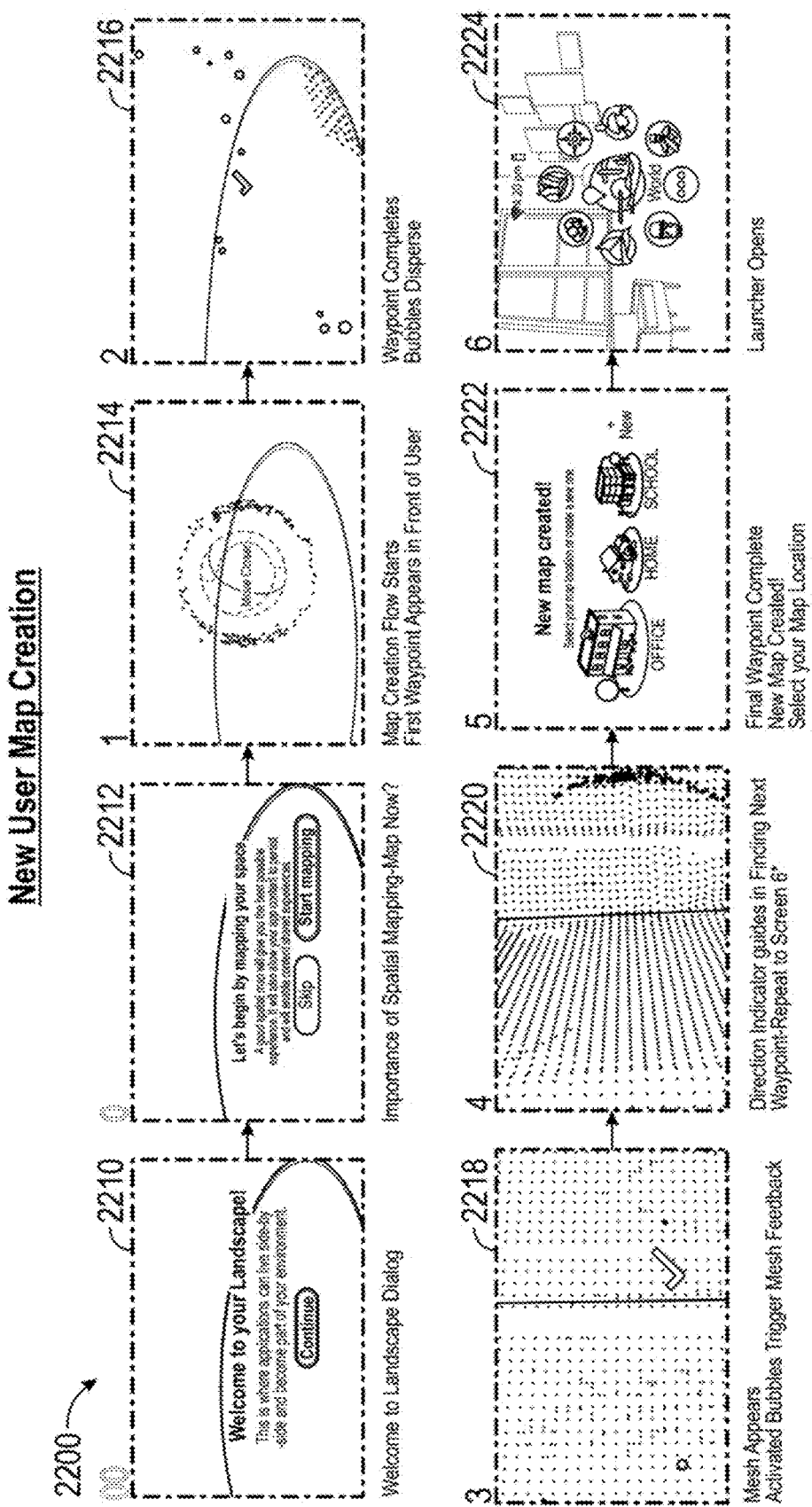
FIG. 22A illustrates an example map creation flow for a new user.
Figure 22B:
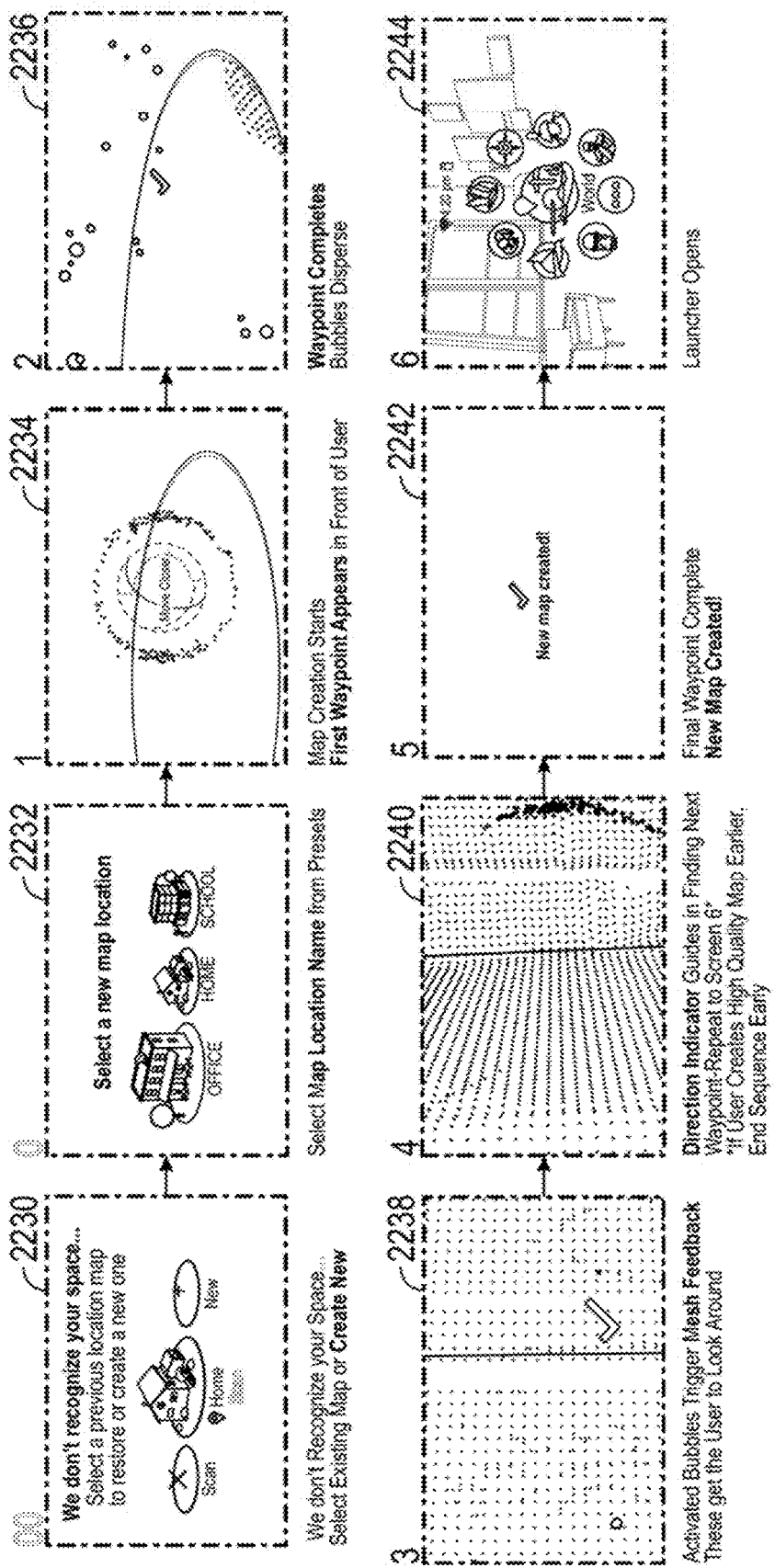
FIG. 22B illustrates an example map creation flow for an existing user.

A user may create a map of their environment if the user has not previously interacted with or visited their current environment, not previously scanned their current environment, or the AR system fails to recognize the user's environment. FIG. 21 illustrates an example flowchart of a map creation process 2100. Examples of the map creation process 2100 can include a new user map creation flow 2200, such as illustrated in FIG. 22A or an existing user map creation flow 2201, such as illustrated in FIG. 22B. The map creation process 2100 can include, but is not limited to, an initiation block 2110, a scan block 2112, a map recognition block 2114, a map quality block 2116, a decision block 2118, a restore content block 2120, a save map block 2122, and an enter landscape block 2124.

At the mapping initiation block 2110, the AR system can determine whether to initiate scanning or mapping of the environment of the user. For example, the AR system can determine whether an initiation condition is met to begin scanning the environment. In some examples, the initiation condition can include the system detecting movement of the user into a new and/or unfamiliar location, inputs from one or more sensors, and/or a user input. The user input can include an affirmative or negative response to one or more prompts. The one or more prompts may differ based on any number of AR system conditions, such as whether the user is a new user or an existing user, whether or not the user has previously scanned their environment to create a map, or the type of program used to initiate the prompt.

For example, as illustrated in FIG. 22A, a mapping initiation prompt for a new user can include one or more user interfaces (as shown in blocks 2210, 2212) specific to a new user. For example, a user interface can include a welcome interface. The welcome interface can include a dialog prompting a user to scan or continue to scan the user's environment. In some examples, the welcome interface can receive a user input. The AR system can initiate or not initiate scanning based on that user input. Additionally or alternatively, the AR system may present another prompt to the user based on the user input. Additionally or alternatively, the mapping initiation prompt can include a start mapping prompt at block 2212. The start mapping prompt can include information associated with the process of scanning or mapping the user's environment. Additionally or alternatively, the start mapping prompt can include a prompt to begin mapping or scanning the user's environment or skip mapping or scanning the user's environment. The AR system can receive a user input responding to the prompt. The AR system may initiate or may not initiate mapping based on that input.

In another example, as illustrated in FIG. 22B, a mapping initiation prompt for an existing user can include one or more user interfaces (such as shown in blocks 2230, 2232) associated with an existing user. For example, a user interface 2230 can include a recognition interface. The recognition interface can include a dialog prompting a user to select a previous map to restore content to the user's environment. Additionally or alternatively, the interface 2230 can include prompts for skipping selection of a map or generating a new map. Accordingly, the interface can initiate or not initiate mapping, enter a saved map, or move the user to another prompt based on the user input. Additionally or alternatively, the mapping initiation prompt can include a start mapping prompt separate or part of the map selection prompt. The start mapping prompt can include a prompt to select a name for a map that the user will create during a scanning process. The AR system can then initiate mapping or scanning based on or using that input. For example, a user may select that a map is an office, home, school, or other location and the AR system may tag the newly created map based on the user input.

If the AR system determines that mapping will be initiated, the system may move on to block 2112 to scan or map the user's environment. If the AR system determines that active mapping will not be initiated, the system can enter an AR landscape at block 2124. As illustrated in FIGS. 22A and 22B, an AR landscape can include an application or user interface, such as shown at blocks 2224, 2244 associated with augmented reality content.

Additionally or alternatively, the AR system can passively scan or map the user's environment. For example, in instances where the AR system determines that active mapping will not be initiated (or the user exits the active mapping prior to completion), the AR system can map or scan the user's environment after entering the AR landscape. Thus, advantageously, if a map quality reaches a sufficient threshold before a session ends in the AR landscape, user content associated with the user's current environment can be retrieved in association with that environment, even if not actively mapped via a gamified flow or active scanning process. In cases where that environment is recognized in the future, the AR system may prompt the user to name or tag that location at that later time. However, if a map quality does not reach a sufficient threshold, the AR system may not save or restore the content for later use.

At the scanning block 2112, the AR system can initiate a scanning process, such as one or more processes described in further detail with reference to FIGS. 28-34C or shown in FIG. 22A at blocks 2214, 2216, 2218, 2220 or FIG. 22B at blocks 2234, 2236, 2238, 2240. Advantageously, the scanning process at scanning block 2112 may be a process having gamified elements to help direct the user to move around their environment and collect data in their space. For example, as described with reference to FIGS. 28-34C below, the AR system may generate and display one or more graphics (also referred to as waypoints) around the user's environment and direct the user to interact with the graphics until an end criteria is met. As used herein, a waypoint may refer to a particular location within a map and/or to a graphic (or other indication) of the particular location within the map. In some examples, a waypoint may include a graphic that marks the particular location within the map and/or that directs the user towards the waypoint location. During the user's interaction with the one or more graphics, the AR system may collect data about the user's environment.

In some examples, the AR system may check whether a user's space is known or recognized at a map recognition block 2114. The AR system may perform this check during or after the scanning block 2112. For example, the AR system may perform a scanning process at block 2112 and the AR system may check at intervals during the scanning process whether the user's environment matches a known environment (e.g., the AR system can match one or more PCFs found in the user's current environment with one or more PCFs in a saved map of a user). If a map is recognized by the AR system, the AR system can restore AR content associated with the recognized map at block 2120 before entering the landscape at block 2124. If a map is not recognized by the AR system, the system can check a map quality at block 2116.

At the map quality block 2116, the AR system can check whether a map generated based on the data collected during scanning block 2112 (and/or combined with data stored in the virtual world map) is of a high enough quality to provide a quality user experience during the current and/or future use. The quality criteria can be any suitable criteria for assessing map quality, such as number of keyframes, PCFs, or other data associated with a mesh in the user's environment. For example, the AR system may determine whether enough PCFs have been found or generated based on the collected data to make the user's space identifiable in future scanning. The number of PCFs may be a suitable number, such as one, two, three, or five PCFs in the user's environment. However, other numbers may also be possible. For example, the number of PCFs necessary for a particular environment may be dynamically determined by the AR system, such as based on analysis of the gathered scanning data and/or map data previously associated with the environment. Once the AR system has determined that the map passes the quality threshold, the AR system may save the map using the collected data at block 2122.

At the save block 2122, the AR system may save the map to a remote or local memory for retrieval by the user or a third party. Additionally or alternatively, the system may prompt the user to input other information associated with the map to be stored as metadata with the map, such as a name or geophysical location. As illustrated in FIG. 22A, the system may display an interface at block 2222 to prompt the user to select or input a map location. Additionally or alternatively, as illustrated in FIG. 22B, the AR system may display an acknowledgement interface or message at block 2242 that signals to the user that a new map has been created or saved.

If the map quality fails to pass a map quality threshold or is not otherwise sufficient to provide a quality user experience, the AR system can determine if the user would like to continue scanning or mapping the user's environment at the decision block 2118. For example, the AR system can prompt the user to continue scanning or stop the scanning process. The AR system may receive user input as a response to the prompt and continue scanning the environment at block 2112 or enter the landscape at block 2124.

Additionally or alternatively, the AR system can stop the map creation process 2100 at any point and enter the landscape at block 2124. For example, the user can input an exit or skip command during the scan process at block 2112. The AR system can then abort the scanning process at block 2112 or enter the landscape at block 2124.

J. Relocalization Process

Figure 23A:
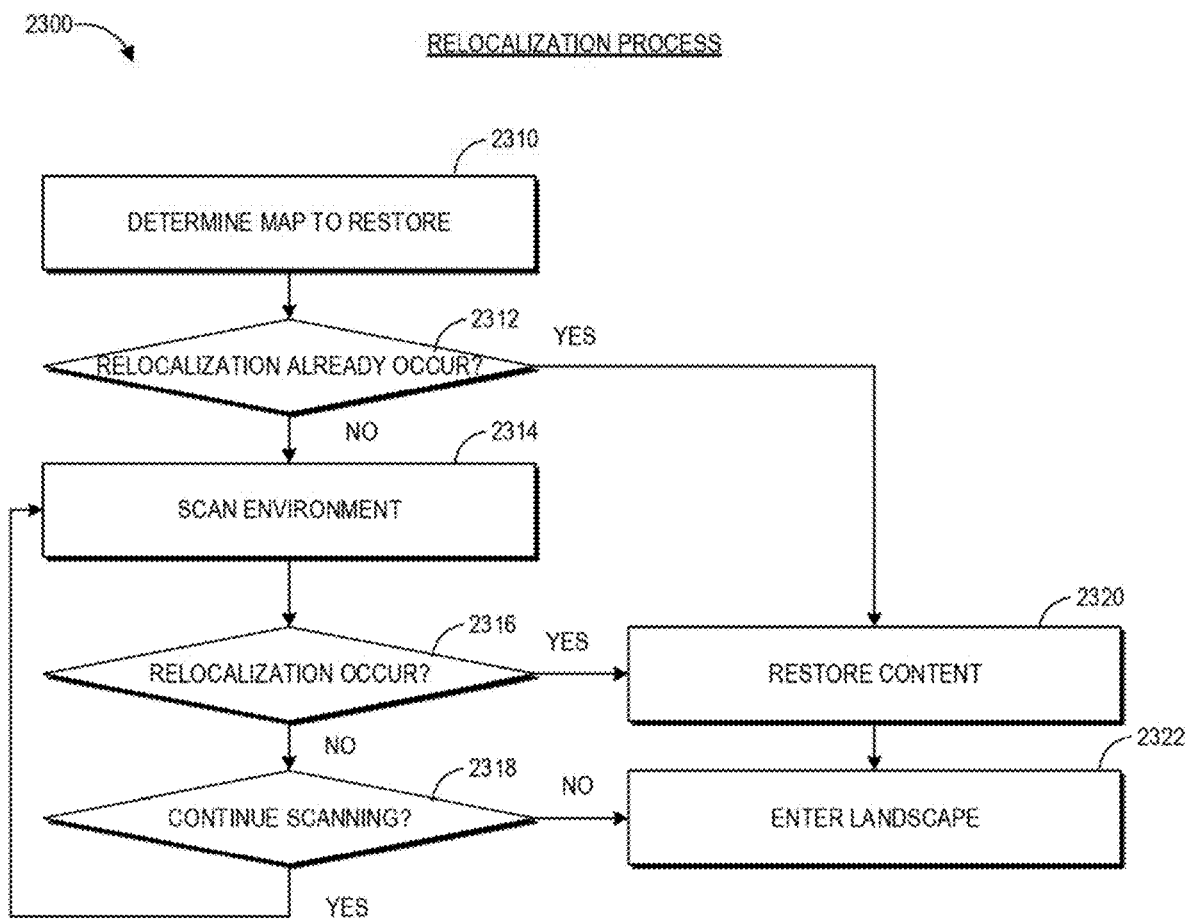
FIG. 23A illustrates an example flowchart of an example relocalization process.

An AR system may attempt to relocalize or place a user into a saved or otherwise recognized space in order to restore augmented reality content (e.g., from a saved world map) in the user's environment. FIG. 23A illustrates an example relocalization process 2300 that will be explained with reference to example AR images shown in FIG. 23B. The relocalization process 2300 can include a map determination step 2310, a relocalization check 2312, a scanning block 2314, a relocalization check 2316, a decision block 2318, a content restore block 2310, and an enter landscape block 2322. Depending on the embodiment, the method of FIG. 23 may include fewer or additional blocks and/or the blocks may be performed in an order that is different than illustrated.

Figure 23B:
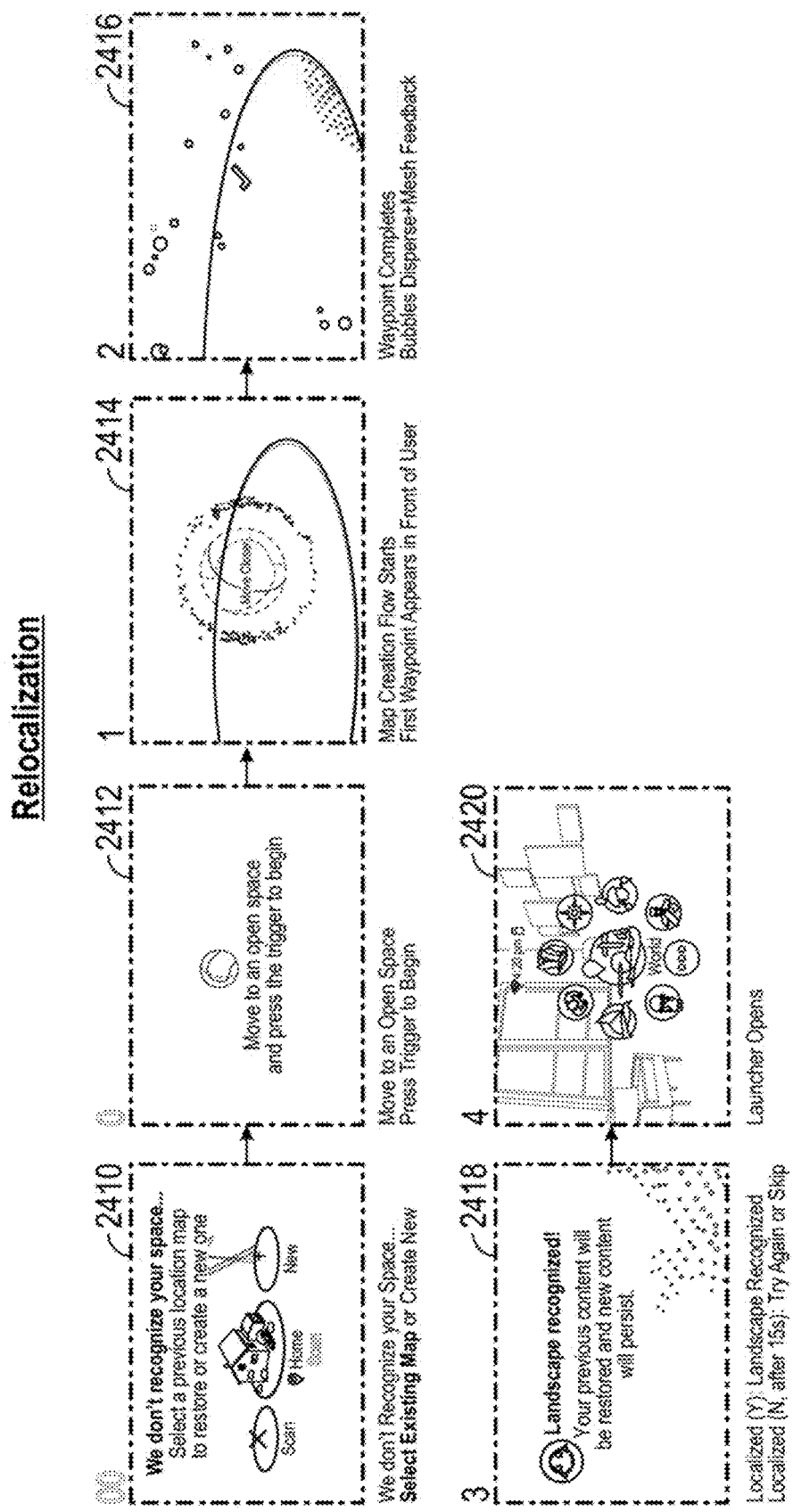
FIG. 23B illustrates an example relocalization flow.

At a map determination block 2310, the AR system can determine a map to restore for the user. For example, the AR system may automatically determine a map associated with a detected geographic location of the user. In another example, as illustrated in FIG. 23B at block 2410, the AR system can display a prompt for the user to select an existing map (and/or to confirm a map automatically selected by the AR system). Additionally or alternatively, the AR system can display a prompt for the user to create a new map or skip the scanning or mapping process. If the user selects an existing map, the AR system may attempt to relocalize the user into a known environment that may include the selected map and move to block 2312. If the user selects to create a new map, the AR system may move to a map creation process, such as described with references to FIGS. 21-22B. If the user selects to skip the mapping or scanning process, the AR system may enter the landscape at block 2322. Additionally or alternatively, if the user selects to skip the mapping or scanning process, the AR system may passively collect data on the user's environment and relocalize with the passively collected data. As illustrated in FIG. 23B, an AR landscape can include an application or user interface associated with augmented reality content, such as the interface shown at block 2420. After receiving a user input to skip the scanning process, the AR system may start an application associated with the AR landscape.

At a relocalization check 2312, the AR system can determine whether relocalization has already occurred in the map determined at block 2310. The AR system may determine that relocalization has occurred by, for example, determining if at least one PCF (or some other minimum quantity of PCFs in some implementations) stored in a known environment is found in the environment of the user. For example, a known environment may have one or more PCFs. During the course of using the AR system, the AR system may passively or actively collect data about the user's environment. The collected data can include PCFs in the user's current environment. At block 2312, the AR system may determine whether any PCFs in the user's current environment match those in the known environment. If the PCFs match, the AR system may determine that relocalization has occurred. If the PCFs do not match, the AR system may determine that relocalization has not occurred. If the AR system determines that relocalization has occurred, the AR system may restore content associated with the recognized map at block 2320 before entering the landscape at block 2322. If a map is not recognized by the AR system, the AR system may move to scanning or mapping the environment at block 2314.

At the scanning block 2314, the AR system can initiate a scanning process, such as one or more processes described with reference to FIGS. 28-34C or shown in FIG. 24 at blocks 2412, 2414, 2416. Advantageously, as described above with reference to map creation, the scanning process at scanning block 2314 may be a process having gamified elements to help direct the user to move around their environment and collect data in their space. For example, as described with reference to FIGS. 28-34C below, the AR system may generate and display one or more graphics around the user's environment and direct the user to interact with the waypoints until an end criteria is met. During the user's interaction with the one or more graphics, the AR system may collect data about the user's environment for building a map of the user's environment.

At a relocalization check 2316, the AR system can check whether a user's space is known or recognized. The AR system may perform this check during or after the scanning block 2314. For example, the AR system may perform a scanning process at block 2314 and the AR system may check at intervals during the scanning process whether the user's environment matches a known environment, the AR system can match one or more PCFs found in the user's current environment with one or more PCFs in the selected map or another saved map of a user. However, other methods of relocalization are possible. If a map is recognized by the AR system, the AR system can restore AR content associated with the recognized map at block 2320 before entering the landscape at block 2322. If a map is not recognized by the AR system, can move on to block 2318.

At a decision block 2318, the AR system can determine whether to continue scanning. For example, if relocalization has not occurred, then the AR system may need more data to generate a new map or find one or more PCFs in the user's environment. However, the AR system may utilize a timeout, user input, or other end criteria for stopping the scanning process (for example, during block 2314). The AR system may then prompt the user for input regarding continuing to scan the user's environment (by, for example, the scanning process 2314). If the AR system determines that scanning should continue due to, for example, a user input or other criteria, the AR system may continue scanning at block 2314. If the AR system determines that scanning should not continue, then the AR system may enter the landscape at block 2322.

Additionally or alternatively, the AR system can stop one or more aspects of the map creation process 2300 at any point and enter the landscape at block 2322. In some examples, the AR system may stop one or more aspects of the map creation process 2300 in response to a user input. For example, the user can input an exit or skip command during the scan process at block 2314. The AR system can then abort the scanning process at block 2314 or enter the landscape at block 2322.

Additionally or alternatively, the AR system can passively scan or map the user's environment. For example, in instances where the AR system does not successfully relocalize the user into a known map, the AR system can map or scan the user's environment after entering the AR landscape. Thus, advantageously, if a user does not find a known environment and a map quality of the user's current environment reaches a sufficient threshold before a session ends in the AR landscape, the AR system may prompt the user to save the environment as a new map.

K. Map Permissions and Storage

Figure 24A:
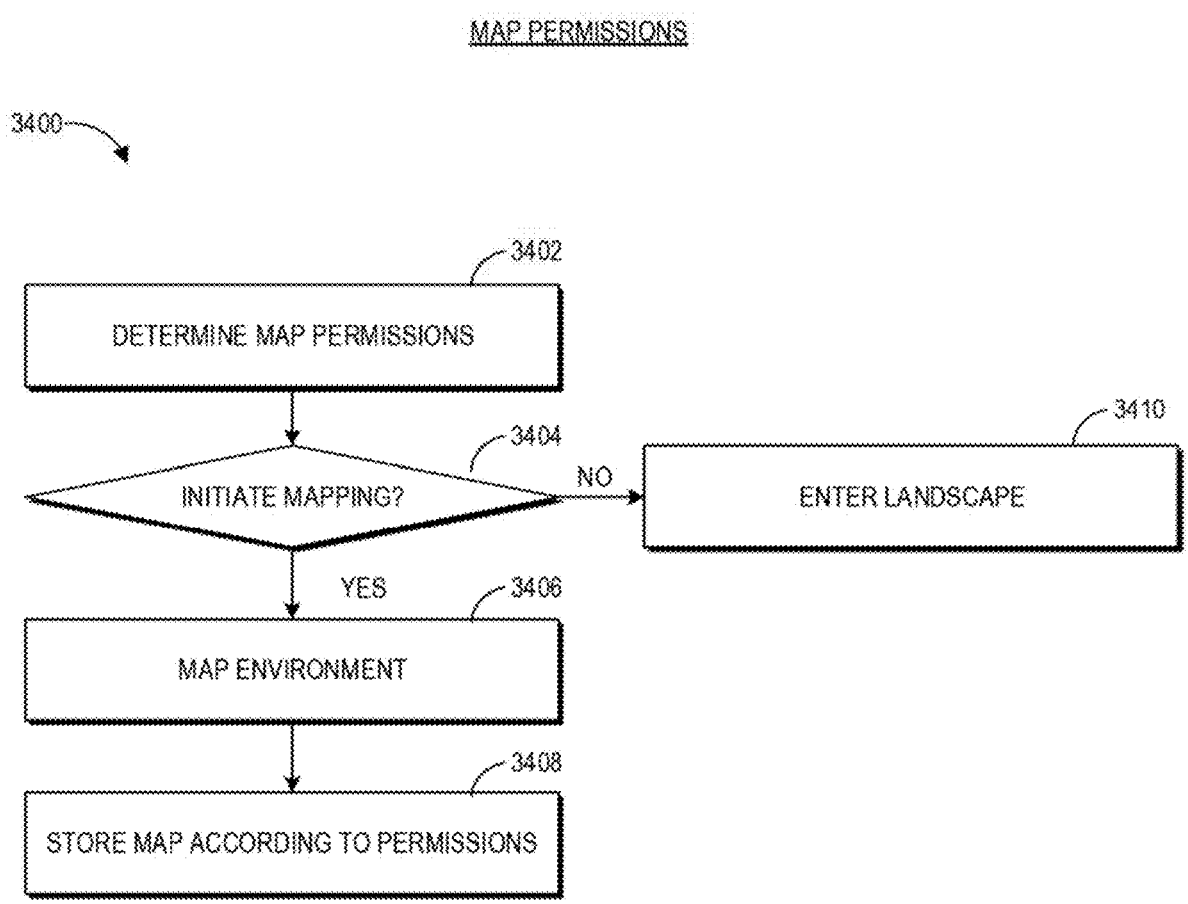
FIG. 24A illustrates an example map permissions and/or storage flow.

A map generated by a user may be stored in multiple ways for accessibility by one or more users. For example, a user may store a map on their device or on external memory (e.g., "cloud" storage on a remote server). A user may set permissions for access to the map when stored either on their device or on cloud storage such that only authorized users with access to the cloud storage can access and interact with the map content. In some examples, a map may be stored on a user device and be accessible only to the user who generated the map. In some examples, a map may be stored on a user device and be accessible to all users of that user device. In some examples, a map may be stored in external memory (e.g., a locally networked device or in cloud storage). In some examples, the stored map may be only accessible to the user who generated that map. In some examples, a map may be stored in external memory (e.g., a locally networked device or in cloud storage). In some examples, the stored map may be accessible to users with permission to access that external memory. FIG. 24A illustrates an example process 3400 for setting storage settings and access permissions for a user generated map.

At a block 3402, an AR system may determine map permissions. Map permissions can include one or more map-specific user settings associated with accessing and storing a current, about to be generated, or newly generated map. In some examples, map-specific user settings can include a desired location for storing map data. Desired locations can include device only storage, personal world storage, shared world storage, some combination thereof or other storage for map data. Device only storage can include internal or on-device storage of the map. Device only storage may limit access to the map data to users of the device storing the generated map. Personal world storage can include external or cloud-based storage of map data. Personal world storage may limit access to the map data to a specific user, such as the user who generated the map. Shared world storage can include external or cloud-based storage of map data. Shared world storage may allow access to the map data to multiple users.

Access to and/or visibility of shared world data may be determined based on authorizations set by the AR system, user, or third party. Map data, such as may be stored in accordance with user settings, can include any amount of information associated with the map, such as map point data, PCFs, environment mesh data, acoustic data, lighting data, other model information, recognized objects, the like, or some combination thereof. In some examples, map permissions can include some combination of visibility and/or interactibility of at least a portion of map data. For example, map permissions can include that map data is visible, invisible, selectable, not selectable, interactable, non-interactable, the like, or some combination thereof to a user.

Additionally or alternatively, the AR system may allow the user to choose a different map storage location for different types of map data. Advantageously, this may allow a user to personalize their map sharing based on perceived privacy and/or other needs. For example, users may opt to store world features (such as PCFs, and/or one or more sparse maps) in a shared world storage, but may store world models (such as dense mesh, lighting, plane detection, or acoustic data) on device only. World understanding (such as object recognition, and/or scene understanding) may be another option for users to select a storage location or settings. In some examples, world understanding may be stored by default in the same location as world features. In other examples, a user may select where world understanding is stored.

In some examples, the AR system may determine map permissions based on one or more prompts to the user. For example, the AR system may display one or more prompts within a user interface to receive user input regarding one or more permissions features of the map. With reference to FIGS. 24B-1, 24B-2, and 24B-3, an AR system may present one or more options regarding storage and/or map permissions to determine storage and/or map permissions associated with map data. In some examples, a user may view and/or select one or more options based on a map categorization. For example, a user may be presented with an option to store world features and/or world models on device, in a personal world, or in a shared world. Additionally or alternatively, a user may be presented with an option to store world understanding. In some examples, world understanding may by default be stored in the same location as a world model. In such cases, the user may be presented with an option to either save or not save world understanding. In some examples, world understanding may be stored in a different location than the world model. In presenting options to the user, the AR system may make an option visible and selectable, visible but not selectable, visible and selected, or in another manner. In cases where an option is selected, the AR system may indicate the selection. The AR system may indicate the selection by, for example, showing a check mark next to the option or through other highlighting of the option.

Figures 1, 24B:
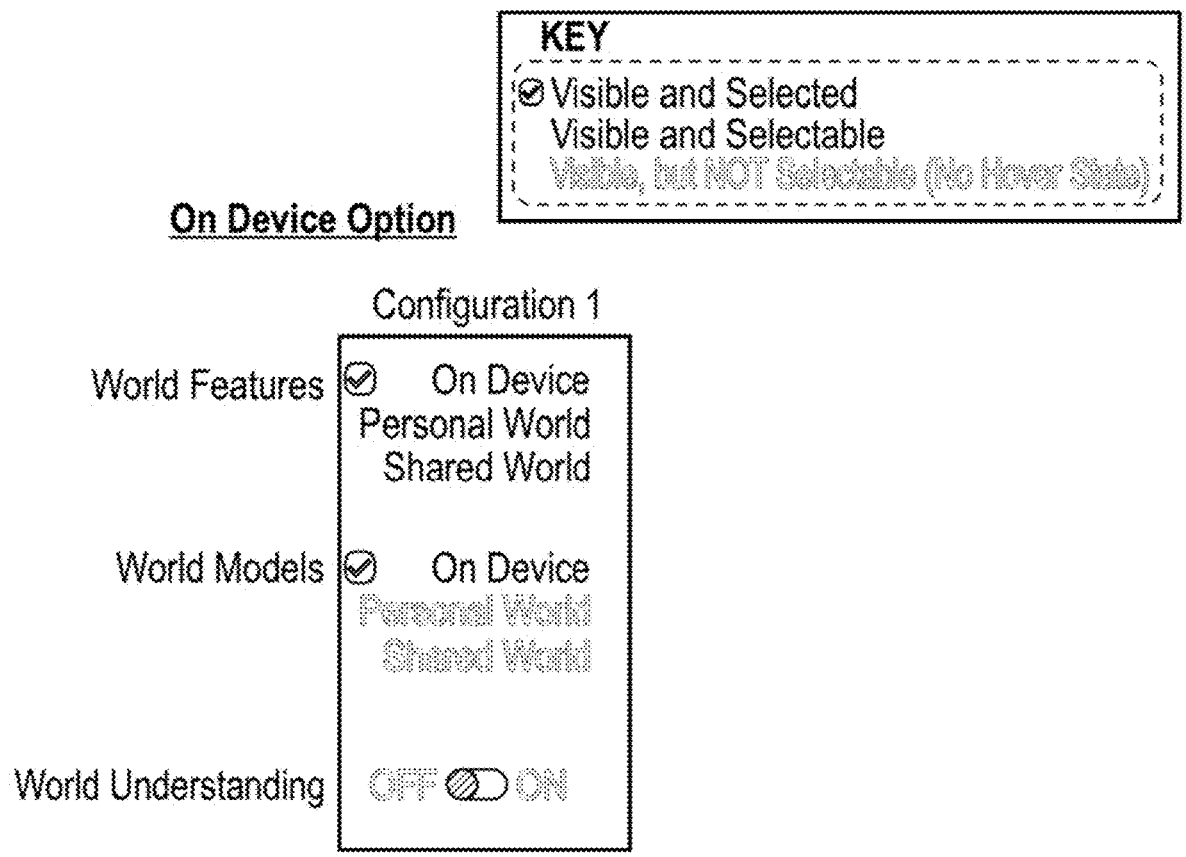

As illustrated in FIG. 24B-1, if an AR system has determined that a user would like to store world features on device, the AR system may allow the user to store world models only on device and/or may not allow the user to store world understanding. A user may then select some combination of those options. For example, with reference to FIG. 24B-1, in a first options configuration, world features may be stored on device, world models may be stored on device, and world understanding may not be stored.

As illustrated in FIG. 24B-2, if an AR system has determined that a user would like to store world features in a personal world, the AR system may allow the user to store world models on device or in a personal world and/or may not allow the user to store world understanding based on the selection of storage options for world models. A user may then select some combination of those options. For example, with reference to FIG. 24B-2, in a second options configuration, world features may be stored in a personal world, world models may be stored on device, and world understanding may not be stored. In a third configuration, world features may be stored in a personal world, world models may be stored in a personal world, and world understanding may not be stored. In a fourth configuration, world features may be stored in a personal world, world models may be stored on device, and world understanding may be stored on a personal world. In a fifth configuration, world features may be stored in a personal world, world models may be stored in a personal world, and world understanding may be stored in a personal world.

As illustrated in FIG. 24B-3, if an AR system has determined that a user would like to store world features in a shared world, the AR system may allow the user to store world models on device or in a shared world and/or may not allow the user to store world understanding based on the selection of storage options for world models. A user may then select some combination of those options. For example, with reference to FIG. 24B-3, in a sixth options configuration, world features may be stored in a shared world, world models may be stored on device, and world understanding may not be stored. In a seventh configuration, world features may be stored in a shared world, world models may be stored in a shared world, and world understanding may not be stored. In an eighth configuration, world features may be stored in a shared world, world models may be stored on device, and world understanding may be stored on the shared world. In a ninth configuration, world features may be stored in a shared world, world models may be stored in a shared world, and world understanding may be stored on the shared world.

While certain combinations of map data and storage and/or permissions are described herein, any combination of storage and/or permissions of map data is possible. For example, map data may be categorized as world features, world models, or world understanding.

With continued reference to FIG. 24A, at a block 3404, the AR system can determine whether to initiate scanning or mapping of the environment of the user. For example, the AR system can determine whether an initiation condition is met to begin scanning the environment. In some examples, the initiation condition can include the system detecting movement of the user into a new and/or unfamiliar location, inputs from one or more sensors, and/or a user input indicating that additional mapping should be performed. The user input can include an affirmative or negative response to one or more prompts. The one or more prompts may differ based on any number of AR system conditions, such as whether the user is a new user or an existing user, whether the user has previously scanned their environment to create a map or not, or the type of program used to initiate the prompt.

At a block 3406, an AR system may map and/or scan the user's environment. The mapping or scanning process can include a scanning process, such as described with reference to FIG. 28-34C. The mapping or scanning process at block 3406 can include steps to recognize a map by, for example, matching one or more PCFs found in the user's environment with one or more PCFs in a saved map. The mapping or scanning process at block 3406 can include checking whether a map generated based on the data collected (and/or combined with data stored in the virtual world map) is of a high enough quality to provide a quality user experience during the current and/or future use. The quality criteria can be any suitable criteria for assessing map quality, such as number of keyframes, PCFs, or other data associated with a mesh in the user's environment. For example, the AR system may determine whether enough PCFs have been found or generated based on the collected data to make the user's space identifiable in future scanning.

At a block 3408, an AR system may store the map according to map permissions. For example, the AR system may save the map to a remote or local memory according to the permissions determined in block 3402. Additionally or alternatively, the system may prompt the user to input other information associated with the map to be stored as metadata with the map, such as a name or geophysical location. The system may display an interface at block 2222 (e.g., FIG. 22A) to prompt the user to select or input a map location. Additionally or alternatively, the AR system may display an acknowledgement interface or message at block 2242 (e.g., FIG. 22B) that signals to the user that a new map has been created or saved.

At a block 3410, an AR system may enter the landscape. For example, the AR system may allow the user to access content associated with the shared map. The application may allow the user to experience augmented reality content in coordination with other users.

L. Example Map Interactions

1. Local Map Interactions

In some examples, a user may interact with maps saved privately or locally. For example, a user may save a private home or office map for future use by the user. FIGS. 25A-25H illustrate example user interactions with a local map, including local relocalizations and map creations.

Figure 25A:
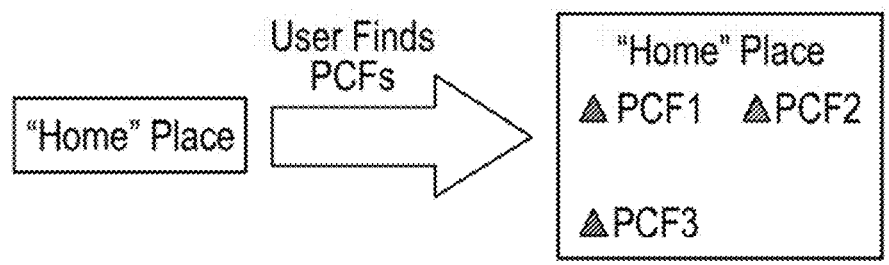
FIGS. 25A-25H illustrate example user interactions with a local map, including local relocalization and map creations.

FIG. 25A illustrates an example relocalization into a selected map. For example, a user may select or name a map, such as "home," with the intention to allow localization and/or future relocalizations into the map. This process may occur, for example, during block 2310 of FIG. 23. The AR system may actively or passively find PCFs by active or passive collection of data in the user's environment. The AR system may then match those found PCFs to the selected map to relocalize the user into the selected map.

Figure 25B:
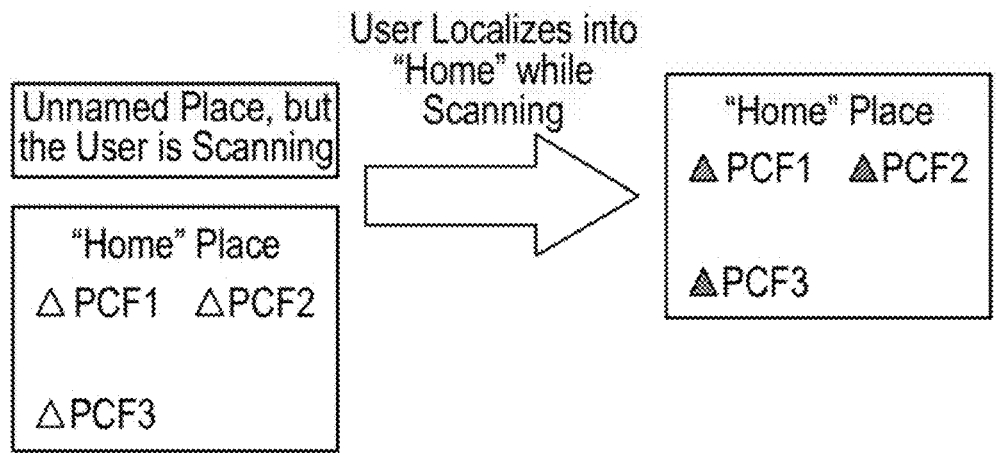

FIG. 25B illustrates an example relocalization with an unselected map into a saved map. For example, the AR system may automatically scan for PCFs as a user moves into a new environment, such as the user enters another room in the user's home. The user may decline or otherwise not select a map to localize into. The AR system may actively or passively find PCFs by active or passive collection of data in the user's environment. The AR system may then match those found PCFs to PCF's in a saved or otherwise known map to relocalize the user into the saved or otherwise known map.

Figure 25C:
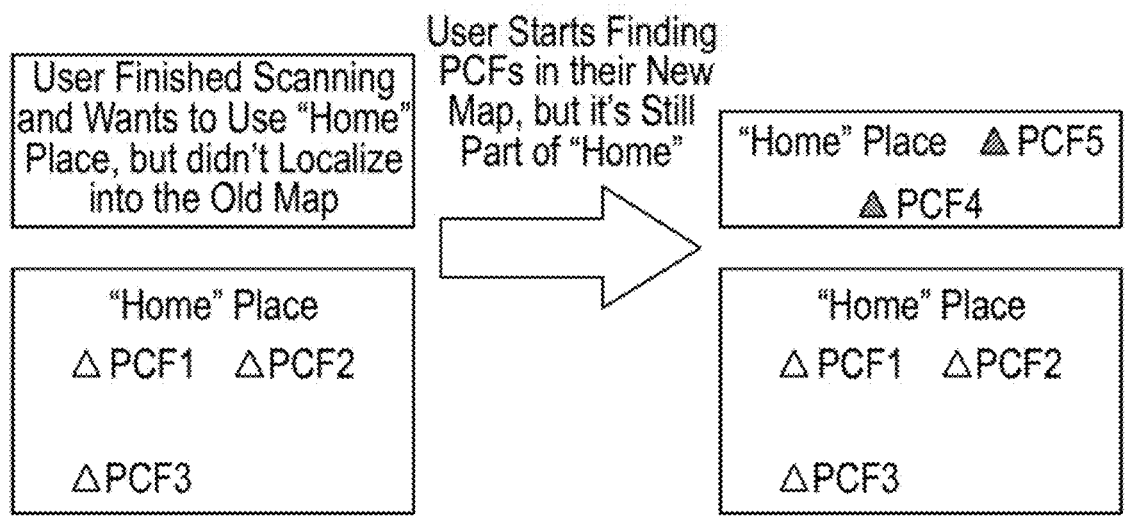

FIG. 25C illustrates an example relocalization with a selected map and a failed relocalization into the selected map. For example, a user may select or name a map, such as "home," with the intention to localize into the selected map. The AR system may actively or passively find PCFs by active or passive collection of data in the user's environment. The AR system may not find a match with the collected PCFs with the PCFs in the saved or selected map. The AR system may then save the PCFs as a second map with the same or different name or save the PCFs as an unconnected portion of the selected or saved map. In some examples, further data collection by the AR system may result in a subsequent successful relocalization into the selected map, such as is illustrated in FIG. 25D.

In some implementations, the AR system may attempt to relocalize the user into multiple maps at the same time. Thus, even if the user selects a map (e.g., "home") at the relocalization stage (or if the user does not select a map), the AR system may instead identify content associated with a different room (e.g., "office") due to attempt relocalization of multiple rooms that may be associated with the user's current location. The AR system may then notify the user of that they are being relocalized into that other room (e.g., "Welcome to your office").

Figure 25D:
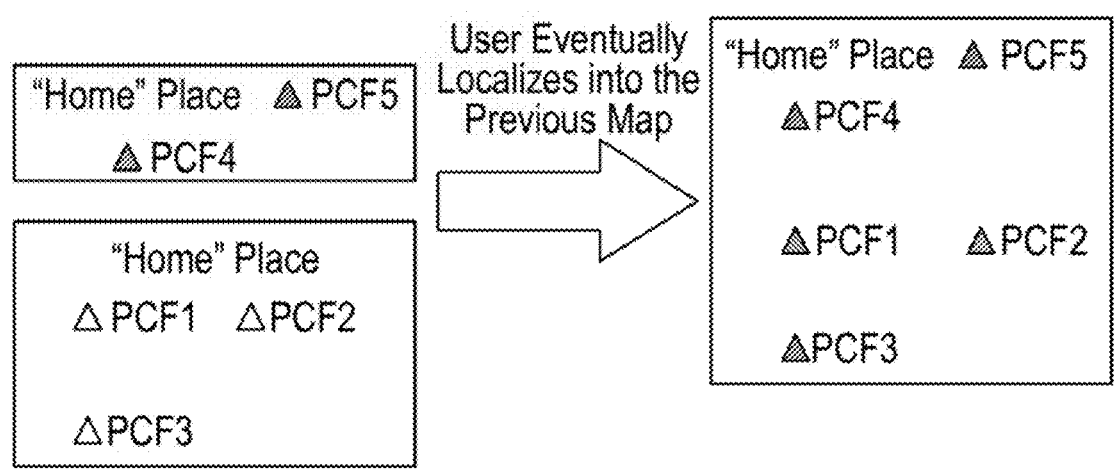

FIG. 25D illustrates an example successful relocalization into a selected map after a failed relocalization. For example, an AR system may save, generate, or otherwise interact with a map in approximately the same location of a different map. The AR system may connect the two maps in some examples, effectively expanding a map to encompass data from both maps. The AR system may connect the maps as a result of localizing into a first map and then determining the presence of PCFs from the second map in the user's environment. The AR system may look for PCFs in a localized map in order to merge two maps where, for example, the AR system could not initially localize into a selected map. In such an instance, the AR system may then save a created map as a version of the selected map for later localization or for expansion of the selected map. For example, as illustrated in FIG. 25C, a user may select a "home" map. The AR system may be unable to relocalize the user into the previously saved "home" map. As a result, the AR system may save a newly created map as a version of "home." The AR system may subsequently connect the original version of "home" with the newly created version of "home" after more of the user's environment has been scanned or PCFs from the original version of "home" are found in the user's environment.

Advantageously, merging maps can allow an AR system to localize into a large map or environment. For example, the AR system may not find PCFs from the named map to relocalize into the named map, but still tag found PCFs with the named map so that the system may build on to the named map without generating a new place.

Figure 25E:
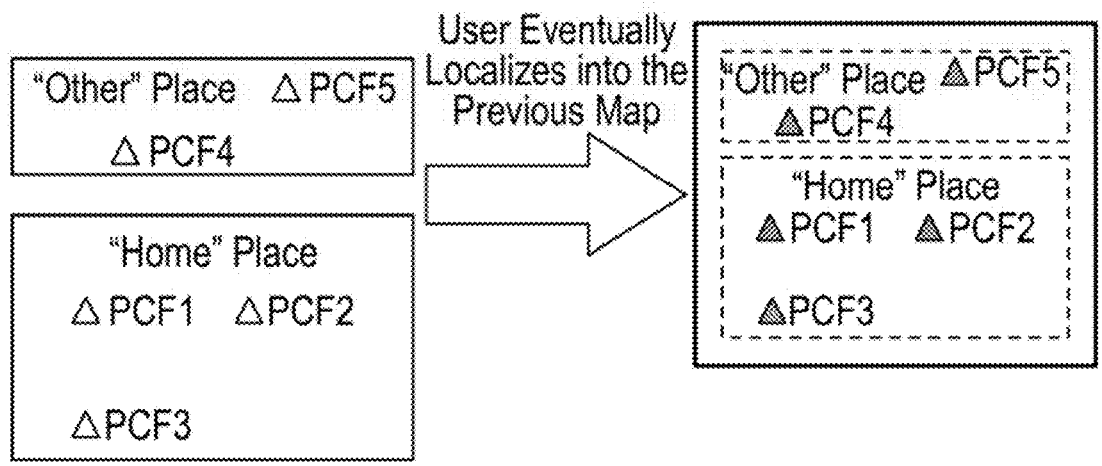

FIG. 25E illustrates another example successful relocalization. For example, a user may select a map for relocalization. In scanning the user's environment during relocalization, the AR system may find PCFs for a second map. The AR system may then connect the maps. The AR system may look for PCFs in a localized map in order to connect two maps where, for example, the AR system could not initially localize into a selected map (as illustrated in FIG. 25D) or the AR system finds PCFs associated with a second map while scanning for a different selected map.

Figure 25F:
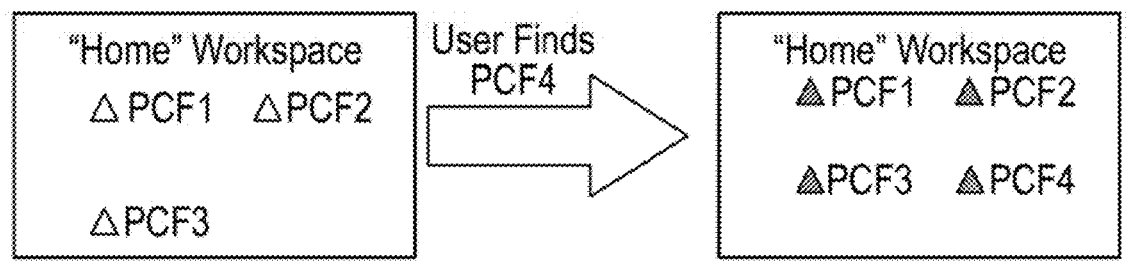

FIG. 25F illustrates an example relocalization with a selected map and added PCFs. For example, during a relocalization process, such as described in FIGS. 23 and 24, the AR system may identify one or more PCFs not previously saved in the selected map. In some examples, the AR system may add or save the one or more identified PCFs into the selected map.

Figure 25G:
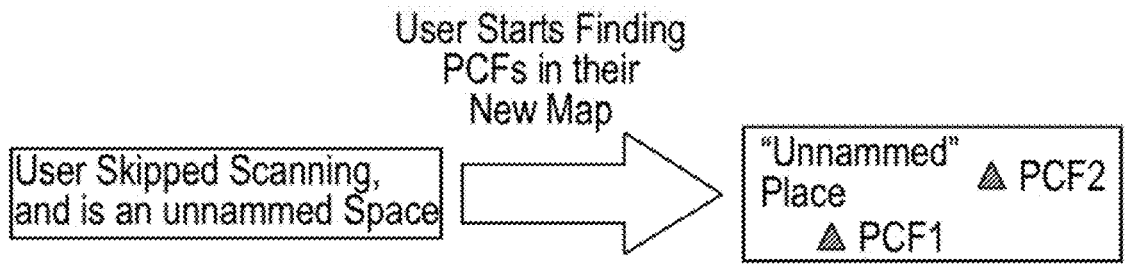
Figure 25H:
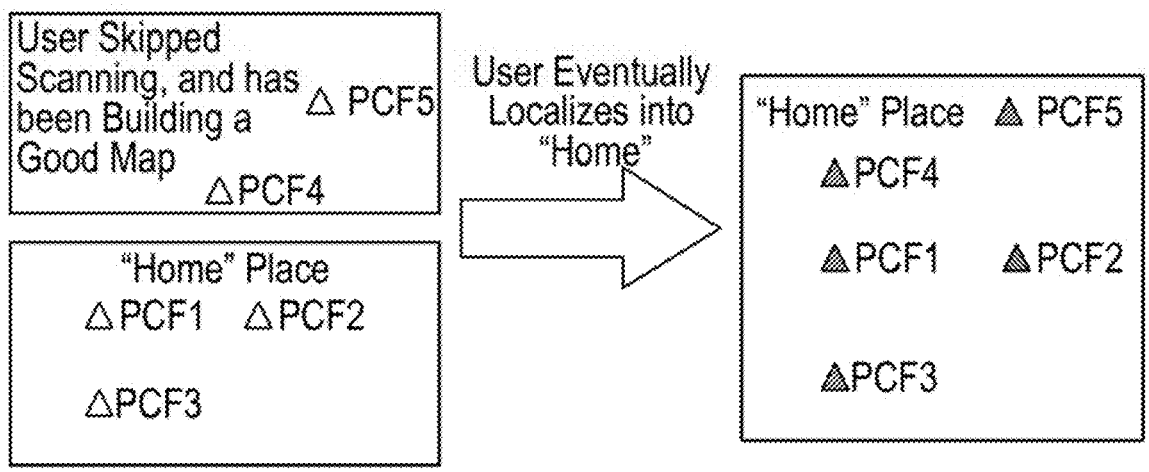

FIG. 25G illustrates an example map creation with new PCFs. For example, where a user decides to skip the scanning or does not select a map for relocalization, the AR system may passively determine PCFs in the user's environment. In some examples, the AR system may save the found PCFs into an unnamed or untagged map. As illustrated in FIG. 25H, the unnamed or untagged map may be merged or connected with a named map during subsequent scanning of the user's environment.

2. Externally Stored Map interactions

Figure 26A:
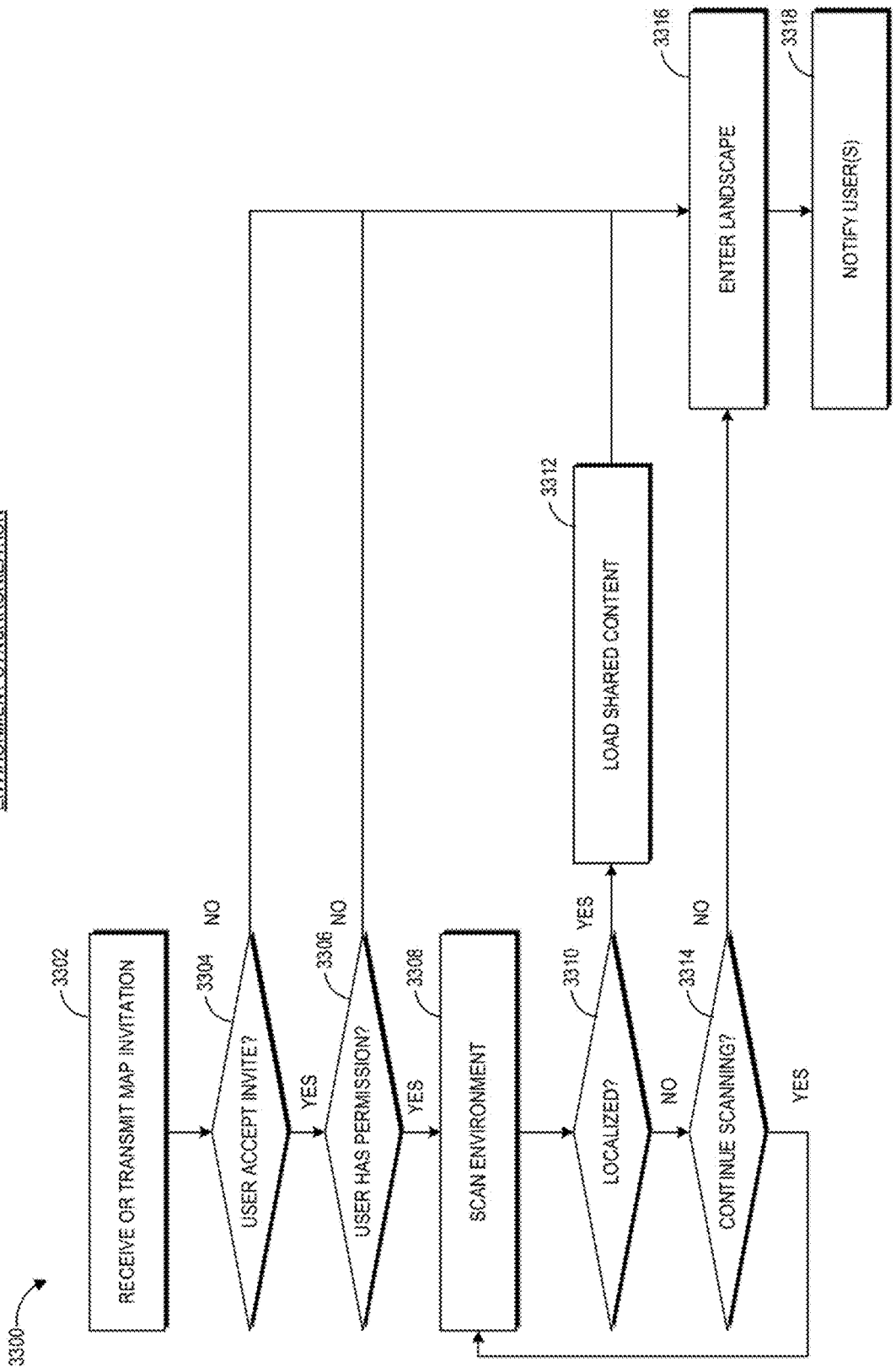
FIG. 26A illustrates an example environment synchronization flow.
Figure 26B:
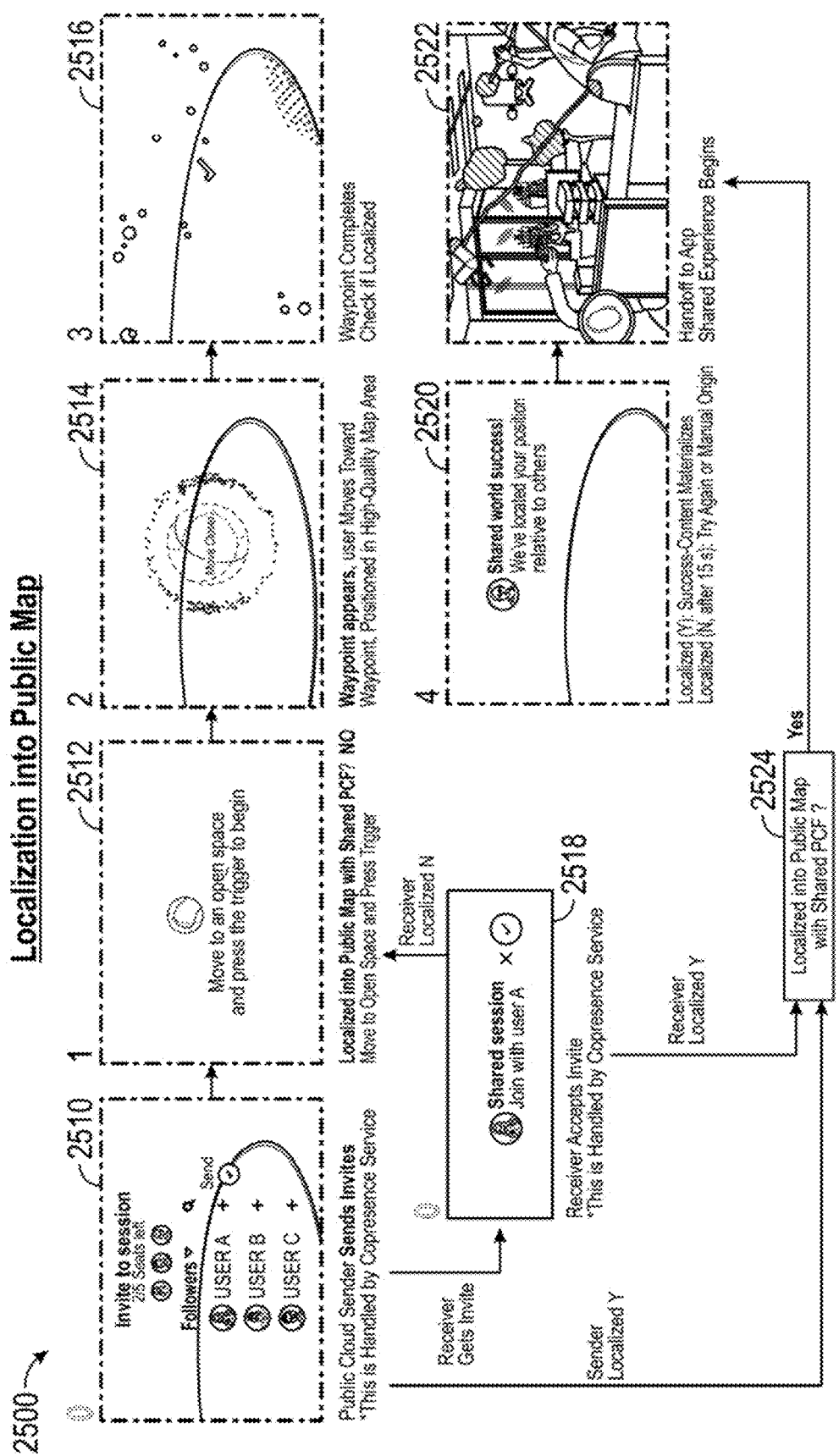
FIGS. 26B and 26C illustrate an example process of localization into shared maps.
Figure 26C:
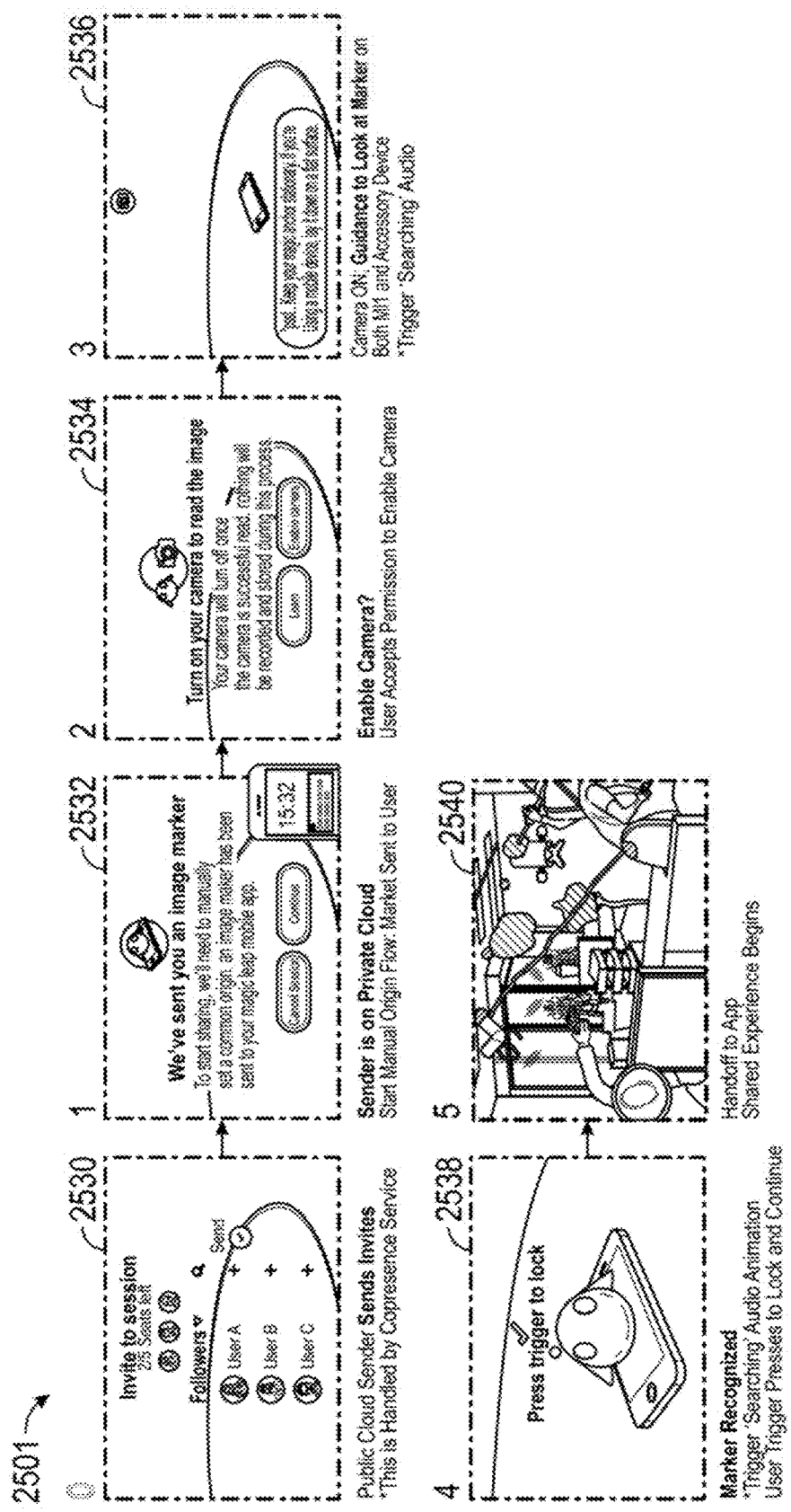

In some examples, a user may wish to interact with maps that the user did not create. For example, a user may be invited or ask to join an externally stored map created by a third party or other user of an AR system. In another example, a user may wish to interact with a publicly available map, such as a map in a public or semi-public environment. In some examples, one or more users may localize into an externally stored map. When one or more users localize into an externally stored map, users may be able to interact with virtual elements of the map. For example, a change to a virtual object by one user may be perceivable by another user localized into the map. For example, two users may be able to move virtual chess pieces in a shared virtual chess game. In another example, two users in a chat session may be able to show or share virtual content in one user's environment that are viewable by other user's in the shared environment. FIG. 26A shows a flowchart of an example localization process 3300 into a shared map. FIGS. 26B and 26C illustrate example graphical user interfaces for user localizations into shared maps. Advantageously, the processes described below can allow a user to access shared maps or AR content associated with spaces that the user has not mapped or created.

With reference to FIG. 26A, at a block 3302, an AR system may receive, identify, transmit, or generate an invitation to join a sharing session or localize into an externally stored map. For example, a user may be invited by a second user to join a sharing session. The sharing session can include a situation in which a plurality of users interact with virtual content that may be shared or otherwise associated with two or more of the plurality of users. In some examples, a user or multiple users may be prompted or otherwise decide to localize into a map. Advantageously, localizing into the shared map may allow users to access information associated with the map or better interact within the sharing session through content that may be associated with the map. The map may be a map stored in an external storage system or the cloud. The invitation can include a prompt to join or localize into a map. For example, one or more users may utilize a single real world space. A first user may invite a second user to access a map of the real world space both users currently occupy such that the users may access virtual content associated with the map. In another example, a user may receive an invitation by the AR system to localize into a map recognized by the AR system. For example, a user may enter into a public space, such as a theater or museum. The AR system may recognize the public space as matching a map in cloud storage. The AR system may then invite or prompt the user to localize, join, or synchronize into the map. In some examples, the AR system may receive or transmit more than one map invitation. For example, if more than one user has mapped the space and invited the user to localize into the map, the AR system may transmit more than one invitation or choice of map to localize into.

At a block 3304, an AR system may determine whether the user has accepted the invitation to join the map from block 3302. For example, a user may provide input to the AR system associated with the map invitation. The input can include an acceptance, denial, or other response to the map invitation. If a user provides an acceptance, the AR system may proceed to determine a user authorization at block 3306 or scan the environment at block 3308. If a user provides a denial, the AR system may proceed to block 3316 to enter the landscape.

Additionally or alternatively to blocks 3302 or 3304, a user may enter a block 3306 to scan the environment based on a user input or a recognized condition by the AR system. For example, the user may provide input to the AR system to access a map. The user input can include an indication to improve a map, such as a personal world map or other map, by, for example, scanning the user's environment to add information to the indicated map. In another example, the user input can include an indication to localize into a map. Additionally or alternatively, the AR system may begin scanning a user's environment for localization into a map without direct user input. For example, the AR system may identify that a user is in a geographic location containing a map. The AR system may initiate mapping or scanning of the user's environment to try to localize into that map without waiting for a user input.

At a block 3306, an AR system may determine whether a user has authorization to access the map. For example, as discussed above with reference to FIG. 24, a map may be stored with a set of permissions. The permissions may help dictate whether a user can access the map. In the case of a map, the permissions may include whether the user is an authorized user for accessing and/or updating the map. An authorization state of the user can include whether a currently authorized user or other authorization source has authorized the user for accessing or editing the map. In some examples, a map may be a map stored externally to a user device but that is personal to a user such that only a user who generated that map may access that map. In another example a map may be public such that all users with access to the cloud storage that a map is stored in can access the map. In some examples, there may be tiers or different types of map permissions such that certain users may have access permission and certain users may have editing permission. If a user is determined to be authorized to access or edit the map, the AR system may move on to block 3308 to scan the user's environment. If a user is determined to not have the required authorization to access or edit the map, the AR system may move on to block 3316 to enter the landscape without loading or accessing the map. In some examples, a user may have access to the map, but no permission to edit the map. In such a case, the AR system may allow the user to scan the environment but prevent the user from storing any changes to the map.

At a block 3308, an AR system may map and/or scan the user's environment. The mapping or scanning process can include a scanning process, such as described with reference to FIG. 28-34C. For example, the AR system can guide the user through their environment to find one or more PCFs in the user's environment. The AR system may guide the user through their environment differently based on a user's identified purpose in scanning the space. For example, if the user indicates that they are updating a map, the AR system may more preferentially guide the user (by for example the scanning processing described with reference to FIGS. 28-34C) to areas of the user's environment with less information to help add information not already within the map to the map. In another example, if the user indicates that they are localizing into a map or synchronized into a map then the AR system may preferentially guide the user to areas of the environment with more information to help localize the user. The mapping or scanning process at block 3308 can include steps to recognize a map by, for example, matching one or more PCFs found in the user's environment with one or more PCFs in an externally stored or saved map.

At a block 3310, an AR system may determine whether a user has localized into the map. For example, the AR system may determine whether enough PCFs have been found or generated based on the collected data to identify the user's space or map data associated with the user's space. In some examples, localization may be defined by a user finding one or more PCFs associated with the externally stored map (also referred to as shared PCFs). However, other types of localization may also be possible. In some examples, a user may find a single shared PCF to localize successfully into a shared map. In another example, a user may find multiple PCFs in order to localize successfully into a map. The success of localization may be determined by the user, the AR system, or specific application associated with the map data. For example, an application may require more precise environment synchronization of physical world data and virtual data. The AR system may thus increase the number of PCFs needed for a user to find in order to help ensure better or more accurate localization. If the AR system determines that localization has occurred, the AR system may load map data associated with the localized map at block 3312. If the AR system determines that localization has not occurred, the AR system may determine whether to continue scanning at block 3314.

Additionally or alternatively, if the AR system determines that localization has not occurred by one or more of the users that may be attempting to localize into the same map, the AR system may load map data associated with the map. However, the map data may not align across users due to the failed localization. In some examples, a rough alignment of map data for multiple users may be accomplished through a user manual or semi-manual alignment of a common reference frame through the manipulation of content associated with the map. For example, a shared session can include a handle or other content for users to manipulate in order to help achieve an alignment of content. The rough alignment mechanism can be applicable to users who failed to localize in a shared real world space and/or for users in remote real world spaces. In some examples, the rough alignment mechanism can be used to correct errors or perceived errors in localization when the AR system determines that a localization has occurred.

At a block 3314, an AR system may determine whether to continue scanning. For example, if localization has not occurred, then the AR system may need more data to generate a new map or find one or more PCFs in the user's environment. However, the AR system may utilize a timeout, user input, or other end criteria for stopping the scanning process. The AR system may then prompt the user for input regarding continuing to scan the user's environment (by, for example, the scanning process at block 3308). If the AR system determines that scanning should continue due to, for example, a user input or other criteria, the AR system may continue scanning at block 3308. If the AR system determines that scanning should not continue, then the AR system may enter the landscape at block 3308.

Additionally or alternatively, the AR system can stop the process 3300 at any point and enter the landscape at block 3316. For example, the user can input an exit or skip command during the scan process at block 3308. The AR system can then abort the scanning process or enter the landscape.

At a block 3318, an AR system may notify the user of the status of the localization. For example, if a user has successfully localized, then the AR system may notify the user who localized into the map or other users (such as those currently localized or attempting to localize into the same map) of the successful localization. In another example, if a user has not successfully localized, then the AR system may notify the user who attempted to localized into the map or other users (such as those currently localized or attempting to localize into the same map) of the failed localization.

FIG. 26B illustrates an example graphical user interface during localization 2500 into a public or world map. For example, at an invitation block 2510, an AR system can receive or send an invitation for a user to join a shared map. The shared map may be a map accessible to other users. If a user accepts the invitation at block 2518, the AR system may then determine if the AR system is localized into the shared map. If the AR system is not localized into the shared map, the AR system may prompt the user to begin a scanning process of their environment at block 2512. If the AR system is localized into the shared map, the AR system may prompt the user at block 2512 to begin scanning the user's environment. The AR system may then scan the user's environment at block 2514 by, for example, guiding the user through a gamified scanning process. The AR system may then check if localization is successful at block 2516. If the localization is successful, the AR system may restore content at block 2520. If the localization is not successful, the AR system may prompt the user to continue scanning their environment or generate a new map. Once the AR system determines that localization is complete or other end criteria has been met, the AR system may enter an AR landscape at block 2522. For example, the AR system may handoff to an application that may allow the user to access content associated with the shared map. The application may allow the user to experience augmented reality content in coordination with other users.

FIG. 26C illustrates an example graphical user interface during localization 2501 into a shared private map. For example, at an invitation block 2530, a user may send or receive an invitation for a user to join a shared map. The shared map may be a map accessible to other users. If a user accepts the invitation, the AR system may receive a marker associated with the shared map at block 2532. The marker can include one or more PCFs associated with the shared map. The AR system may prompt the user to enable permissions to scan the user's environment at block 2534. Upon receiving user permission, the AR system may scan the user's environment at block 2536. Once the AR system recognizes the marker in the user's environment, the AR system may indicate successful completion of the localization at block 2538 by, for example, visual, audible, or haptic feedback. Once the AR system determines that localization is complete or other end criteria has been met, the AR system may enter an AR landscape at block 2540. For example, the AR system may handoff to an application that may allow the user to access content associated with the shared map. The application may allow the user to experience augmented reality content in coordination with other users.

3. Map Curation

In some examples, an AR system may utilize a scanning process, such as described with reference to FIGS. 28-34C, to improve a map quality. For example, an already generated map may lack complete information, such as mesh data or PCF data. The AR system may guide a user using a scanning process to areas of that map that lack quality data in order to improve the map quality by mapping those areas. Improving a map quality can be referred to as map curation. Such map curation may be done by users have previously built or generated that or another map. For example, software developers and/or users may enter a map curation mode in order to improve map quality. In other examples, multiple users may curate a map and data may be merged in order to improve map quality. Related U.S. Patent Application No. 62/966,267, titled "Augmented Reality Map Curation," filed on Jan. 27, 2020, provides further details regarding map curation processes that may be implemented into the embodiments discussed herein, and is hereby incorporated by reference in its entirety for all purposes.

At a block 3502, an AR system may determine a map to curate. For example, the AR system may automatically determine a map associated with a detected geographic location of the user. In another example, the AR system can display a prompt for the user to select an existing map to curate (and/or to confirm a map automatically selected by the AR system). If the user selects a map, the AR system determine whether the map needs further curation at a block 3504. In some examples, if the user selects a map, the AR system may go to block 3506 to scan the environment without determining if the selected map meets a map quality threshold at block 3504.

At a block 3504, an AR system may determine whether a selected map meets a map quality threshold. For example, the AR system can determine whether a map quality is sufficient such that the map needs improvement or does not need improvement. If the map quality does not meet the threshold quality, then the AR system may move to block 3506 to scan the user's environment. In some examples, a map quality threshold can include a threshold percentage of the available map data for the environment, a number of saved PCFs in the environment, the like, or some combination thereof.

Additionally or alternatively to block 3504, an AR system may let the user curate a map regardless of quality. For example, a user may want to expand the size of a map into new regions. In some examples, the map may be of high quality, but not as large or complete as a user desires. An AR system may thus continue scanning the environment to curate the map until the user desires to end the curation process.

At a block 3506, an AR system may map and/or scan the user's environment. The mapping or scanning process can include a scanning process, such as described with reference to FIG. 28-34C. For example, the AR system can guide the user through their environment to find one or more PCFs in the user's environment. For example, if the user indicates that they are updating a map, the AR system may more preferentially guide the user (by for example the scanning processing described with reference to FIGS. 28-34C) to areas of the user's environment with less information to help add information not already within the shared map to the shared map. In another example, the AR system may guide the user throughout the user's space according to one or more criteria, such as described with reference to FIGS. 28-34C. The mapping or scanning process at block 3308 can include steps to recognize a map by, for example, matching one or more PCFs found in the user's environment with one or more PCFs in a shared or saved map.

In some examples, during the scanning process at block 3506, an AR system may guide the user based on an identified map quality. For example, areas of the map may have a higher map quality than other areas of the map. The AR system may guide the user to areas of the map with lesser quality in order to gather data in those areas and improve the map quality there. The map quality may be defined by any number of criteria, including, but not limited to, an amount of data collected at that area of the map. In some examples, as a user moves around their space, the AR system may notify the user of the current map quality in order to inform the user of how much map curation is needed or completed. The notification can involve a graphical, haptic, audible or other feedback to the user of the current map quality, such as are described in further detail in the related application noted above. In one example, the notification can include a progress bar associated with a normalized map quality index or value. In another example, the notification can include a color coding of the map.

At a block 3508, an AR system may determine whether to continue scanning. For example, the AR system may identify whether a map quality is sufficient to stop scanning or if scanning should continue. If map quality is still low, then the AR system may need more data and guide the user to help find one or more PCFs in the user's environment. However, the AR system may utilize a timeout, user input, or other end criteria for stopping the scanning process. The AR system may then prompt the user for input regarding continuing to scan the user's environment (by, for example, the scanning process at block 3506). If the AR system determines that scanning should continue due to, for example, a user input or other criteria, the AR system may continue scanning at block 3506. If the AR system determines that scanning should not continue, then the AR system may exit the curation at block 3512. In some examples, the only exit criteria may be a user input such that a user can continue mapping or scanning their space until they decide to exit. Advantageously, this allows a user to get as much detail as they desire in the map they are curating without the AR system determining an exit criteria for the mapping or scanning process.

M. Environment Scanning Process

As referenced above, in relocalizing or localizing a user into a map or in creating a map, an AR system may need to scan the user's environment to recognize PCFs or other markers within the user's environment. In some examples, the AR system may passively collect data to scan the user's environment as the user naturally moves around their environment. However, in some examples, the AR system may actively scan the environment by encouraging the user to walk around and observe their environment. The AR system may encourage the user to perform this scanning using waypoints or displayed graphics throughout the user's environment. Additionally, the AR system may display animations associated with successful data collection. FIG. 26 illustrates an example scanning process 2600 that may be implemented by an AR system to scan the user's environment. For example, a scanning process can include a waypoint determination block 2610, a user direction block 2612, a data collection block 2614, and an end criteria determination block 2616.

At the waypoint determination block 2610, the AR system can determine a location to place one or more graphics (e.g., visualizations) in the user's environment. For example, the AR system can determine a location of a graphic according to a process such as described with reference to FIG. 29. In some examples, the AR system can determine locations for one or more graphics dispersed within the user's environment. The AR system may select the locations based on any number of criteria, including but not limited to, the existence or non-existence of collected data or mesh within an area of the user's environment. Additionally or alternatively, the AR system may select the locations based on distance from the user or other selected waypoint locations. Advantageously, the AR system may select locations further away from the user or other waypoint locations in order to encourage the user to explore more of their environment.

The AR system may determine waypoint locations by any suitable means for analyzing collected data about the user's environment. For example, the AR system may collect data about the user's environment using one or more outward facing cameras or sensors. The AR system may analyze the data according to one or more criteria to determine potential waypoint locations. For example, the AR system may determine 32 potential waypoint locations based on data from the outward facing camera. The AR system may order the 32 potential locations based on distance from the user and other potential or determined waypoint locations. The AR system may then select a subset of the ordered locations to display to the user.

At the user direction block 2612, the AR system can direct the user to explore their environment using the one or more graphics at the waypoint locations determined at block 2610. For example, the AR system may display the one or more graphics at the one or more locations determined at block 2610. The AR system may display the graphics sequentially, at once, display a portion of the graphics sequentially or at once, or some combination thereof. The AR system may guide the user to one or more of the waypoint locations by, for example, displaying a guiding animation (see for example, the guiding animation process described with reference to FIG. 30 below). The AR system may use the guiding animation to guide the user to a plurality of waypoint locations within the user's environment. For example, if there are six waypoint locations, the AR system can guide the user to each of the six waypoint locations sequentially. In another example, the AR system can determine a single waypoint location at a time and guide the user to each of the selected waypoint locations. The AR system may then determine a subsequent waypoint location based on the already completed waypoint locations and guide the user to the subsequent waypoint location.

At the data collection block 2614, the AR system can collect data associated with the user's environment. For example, the AR system can collect data using one or more sensors associated with the AR system, such as one or more outward facing cameras on the head mounted display of the AR system. The AR system may collect data before, during, or after any of the steps of the scanning process 2600. For example, the AR system may collect data during the waypoint location determination block 2610 or the user direction block 2612. Additionally or alternatively, the AR system may collect data during an interaction with the graphic at the waypoint location determined at block 2610. For example, when a user interacts with a graphic by, for example, coming within a threshold distance of the waypoint location, the AR system may collect data about the user's environment near that waypoint location. Advantageously, the AR system can collect data while guiding the user to the waypoint location at block 2612 and collect a greater amount of detailed data at block 2614 while interacting with a graphic at a waypoint location determined at block 2610. Accordingly, an AR system may collect more detailed data at areas of the user's environment that may be identified as places where data needs to be collected.

At the end criteria determination block 2616, the AR system can determine whether more data needs to be collected or whether to end the scanning process 2600. The AR system can determine to end the scanning process by analyzing whether one or more end scanning criteria have been met. For example, the AR system can collect data at block 2614 at a waypoint location. The AR system can determine whether the user has collected data at a threshold number of waypoint locations, identified a minimum quantity of PCFs, and/or met other criteria for determining an adequate amount of mesh in the user's environment. In some embodiments, the end criteria may match a criteria for a localization process to occur. If the AR system determines that the user has collected data at the threshold number of waypoint locations, the AR system may end the scanning process. If the AR system determines that the user has not collected data at the threshold number of waypoint locations, the AR system may continue or restart the scanning process 2600 at block 2610. In another example, the AR system can receive input from the user to stop or skip the scanning process at any point during the process 2600. If the user has stopped the scanning process 2600, the AR system may end the scanning process. If the AR system has not stopped the scanning process 2600, the AR system may continue the scanning process. In another example, the AR system can determine whether a threshold amount of data is collected within a threshold time frame. If the AR system determines that not enough data is collected within the threshold time frame, the AR system may end the process 2600. If the AR system determines that the threshold time frame has not been passed and more data should be collected, the AR system may continue the scanning process.

N. Example Waypoint Generation

Figure 27:
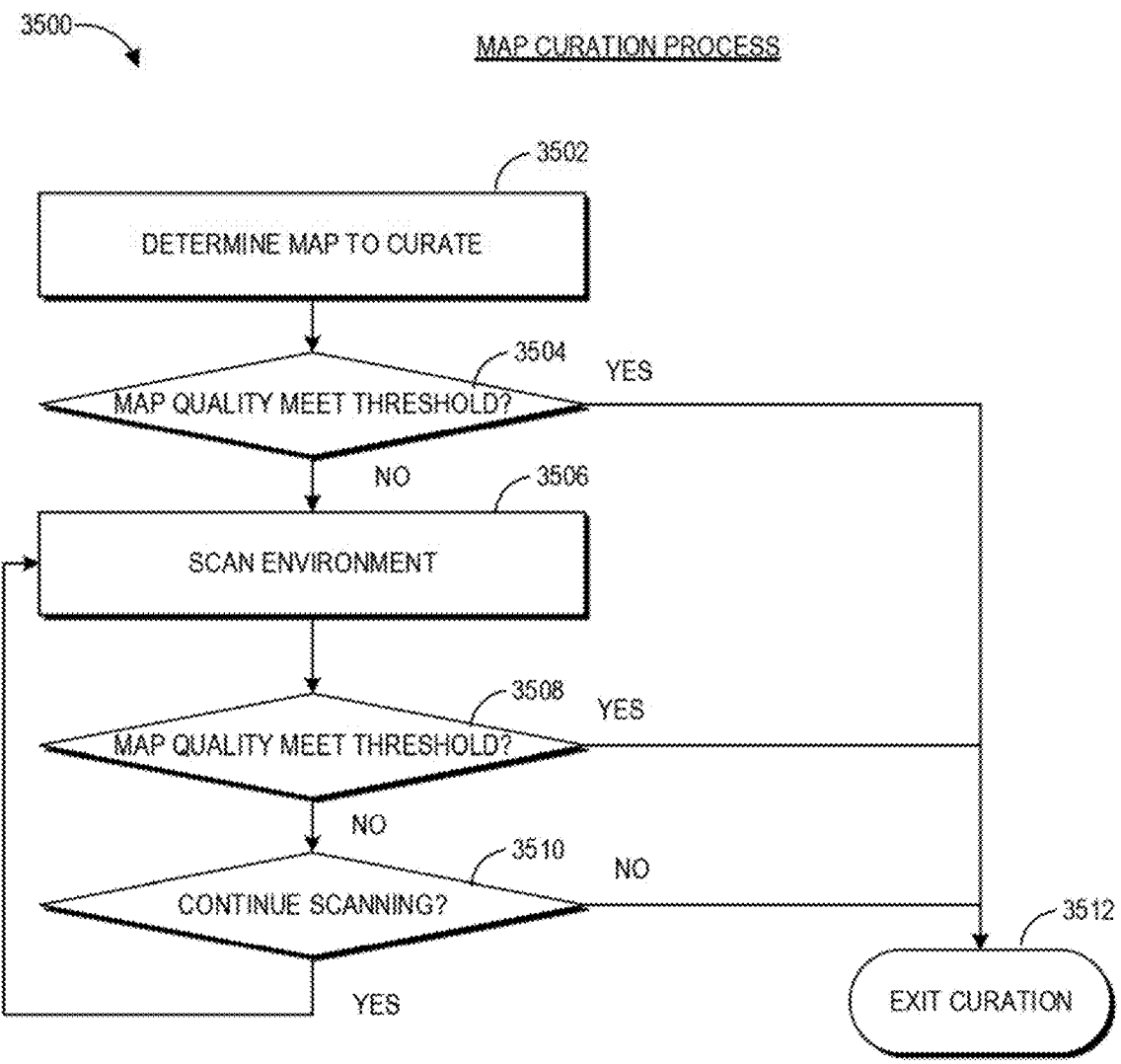
FIG. 27 illustrates an example map curation flow.
Figure 28:
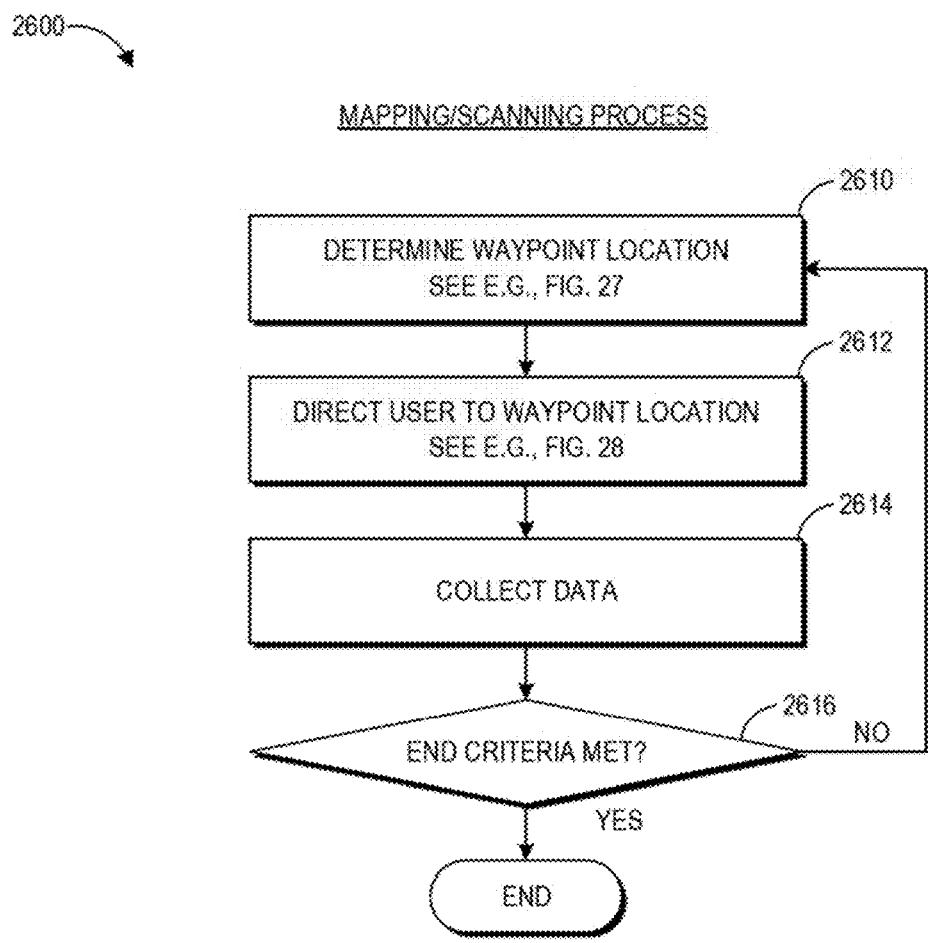
FIG. 28 illustrates an example scanning process that may be implemented by an AR system.

As discussed above, an aspect of a scanning process, such as described with reference to FIG. 28, can include determination of waypoint or graphic locations within the user's environment. FIG. 27 illustrates an example graphic spawning process 2700. For example, the graphic spawning process 2700 can include a raycast block 2712, a raycast type block 2714, an order determination block 2716, a selection block 2718, a display block 2720, and an end criteria block 2722.

At a raycast block 2712, the AR system can send raycasts around the user. In various embodiments, the ray casting techniques may include casting thin digital rays with substantially little transverse width or casting rays with substantial transverse width (e.g., cones or frustums) in a digital version of the user's environment. For example, the ray may be digital lines that extend away from the user and may intersect with one or more real or virtual objects within the digital copy of the real world. In some embodiments, the real object may be represented by mesh in the digital copy of the real world. In some embodiments, the virtual object may be represented by a renderable 3D asset (e.g., a 3D model, for example with mesh and corresponding mesh renderer data). The raycasts may be used to quickly obtain limited data collection in a particular direction into the user's environment. For example, the limited data collection can include the existence of a surface or content in the direction of the mesh, whether a mesh exists in the direction of the raycast, a distance to any found content or mesh, the like, or some combination thereof. The raycasts may be horizontally, vertically, and/or radially extend from a point of origin associated with the user. For example, the raycasts may horizontally extend from the head of the user such that one or more raycasts are perpendicular to a head mounted display worn by the user. The AR system may send out any number of raycasts. For example, the AR system can send out 32 raycasts centered at the head of the user. However, other numbers of raycasts are possible. For example, the number of raycasts necessary for a particular environment may be dynamically determined by the AR system, such as based on analysis of the gathered scanning data and/or map data previously associated with the environment.

At a raycast type block 2714, the AR system can assign, determine, or categorize a type for the one or more raycasts from block 2712. For example, a raycast may include information associated with the user's environment, the mesh, or other AR content. The AR system may categorize one or more of the raycasts according to the information obtained from the respective raycasts. For example, the AR system may categorize each of the raycasts as a hit, a no-hit, or an unobserved type raycast. In some embodiments, the AR system may divide the environment into a series of cells by dividing space by a grid. A hit raycast can include a raycast that intersects with content or intersects with a cell that contains content, such as a mesh or PCF, within a threshold distance from the origin of the raycast. A no-hit raycast can include a raycast that intersects with a cell that contains no content or a raycast that intersects with content, such as a mesh or PCF, within a threshold distance from the origin of the raycast. An unobserved raycast can include a raycast where it is unknown whether there is content within a threshold distance or within a cell within a threshold distance from the origin of the raycast. An unobserved raycast can indicate that the user has likely not been in the location associated with the raycast to collect data. The AR system may then select the unobserved raycast type and/or other raycast type for further analysis in determining location(s) for displaying graphics to encourage user movements that will allow acquisition of further mesh data.

At an order determination block 2616, the AR system can arrange the raycasts according to one or more criteria associated with the raycast. For example, the AR system can order unobserved raycasts according to distance from furthest away from the point of origin of the raycast to closest. Advantageously, arranging raycasts according to distance can allow the AR system to determine or preferentially select locations for displaying graphics further away from the user. Displaying graphics further away from the user can allow the AR system to guide the user to explore more of their environment than if the locations were closer to the user. In some examples, other ordering criteria may be used.

At a selection block 2718, the AR system can determine a location or display a graphic at a location within the user's environment. The AR system may select a location to display the graphic that is approximately central or at another location within the user's FOV based on the raycasts. In another example, the AR system may display the graphic that is at a location outside of the user's FOV. In some examples, the AR system may analyze data from the raycasts to determine a location within the user's environment that could use more data collection. For example, the AR system may determine that a location has not been meshed. The AR system may preferentially select the unmeshed location. Additionally or alternatively, the AR system may select a location within or outside of a threshold distance of the user. For example, the AR system may determine that the initial waypoint location is at a threshold distance from the user. In some examples, the threshold distance can be one meter, two meters, five meters, or other distance. In some examples, the AR system may use more than one criteria to determine a spawn location for a waypoint graphic. For example, the AR system may determine a location greater than a threshold distance (for example, 2 meters) from the user and greater than a threshold distance (for example, 2 meters) from another selected location (e.g. the previous waypoint), or meshed area. Advantageously, placing the initial waypoint location at a threshold distance from the user can encourage the user to move about their environment to interact with the graphic.

In some examples, the AR system may select a waypoint location according to how many graphics have been displayed to the user. For example, if the AR system has not displayed any graphics to the user, the scanning process is beginning for the first time, or the scanning process has restarted, the AR system may display a graphic within the user's FOV. Additionally or alternatively, the AR system may display a graphic at the best location according to the order determined at order determination block 2716. The AR system may display the graphic at the best location if the AR system has already displayed a graphic to the user.

At a display graphic block 2720, the AR system may display one or more graphics at one or more of the determined waypoint locations. For example, the AR system may display a graphic at a single waypoint location. Once data has been collected at the waypoint location, the AR system may determine a second waypoint location and repeat the process 2700 from block 2712. Additionally or alternatively, the AR system may display a graphic at more than one location.

At the end criteria block 2722, the AR system can determine whether more graphics need to be displayed or whether to end the graphic display process 2700. The AR system can determine to end the process 2700 by analyzing whether one or more end criteria have been met. For example, the AR system can determine a waypoint location and collect data at a waypoint location. The AR system can determine whether the user has collected data at a threshold number of waypoint locations. If the AR system determines that the user has collected data at the threshold number of waypoint locations, the AR system may end the scanning process. If the AR system determines that the user has not collected data at the threshold number of waypoint locations, the AR system may continue or restart the process 2700 to display more graphics. In another example, the AR system can receive input from the user to stop or skip the scanning process at any point during the process 2700. If the user has stopped a scanning process, the AR system may end the process 2700.

O. Example Waypoint Guidance

Figure 30:
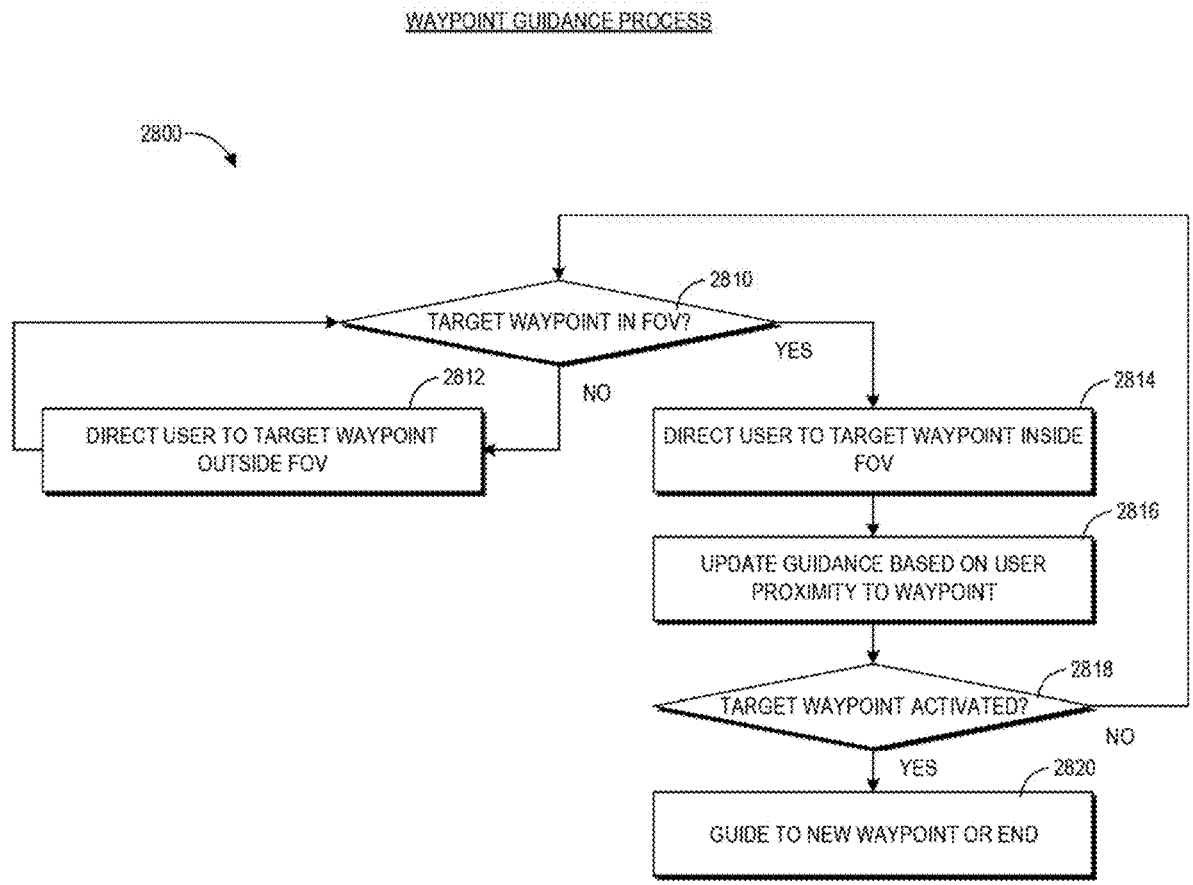
FIG. 30 illustrates an example flowchart of an example waypoint guidance process.
Figure 31A:
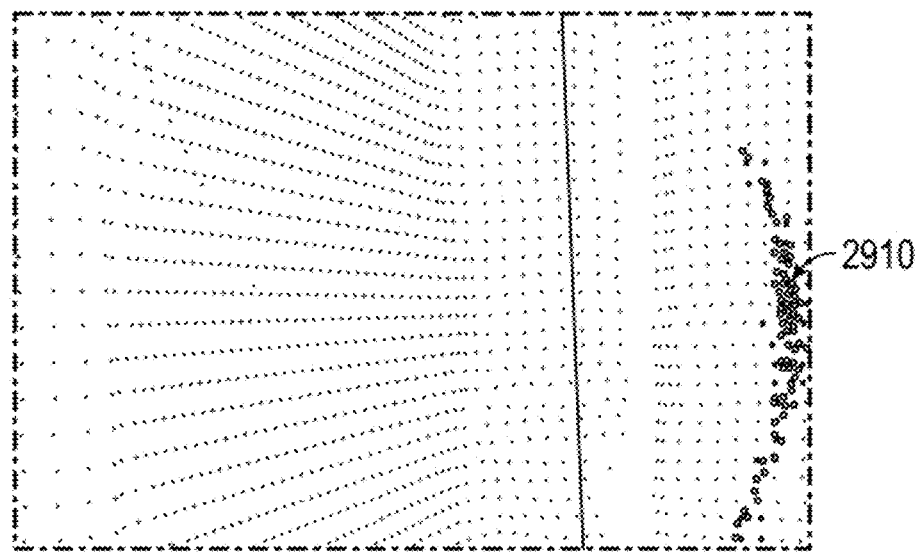
FIGS. 31A and 31B illustrate example indicator rings.
Figure 31B:
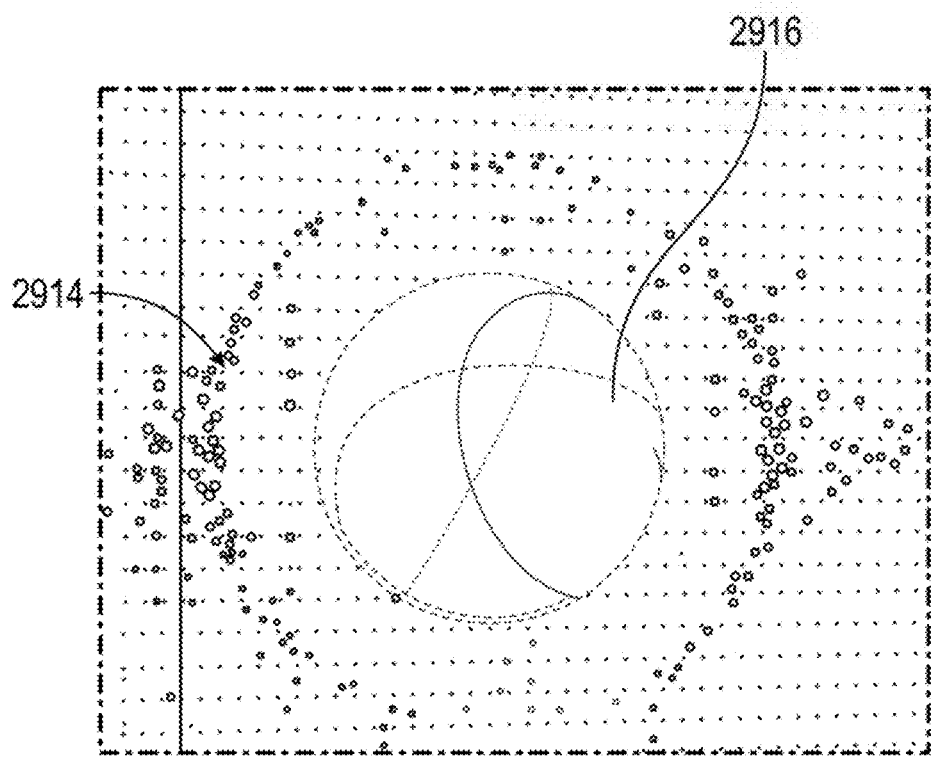

In order to encourage a user to interact with the displayed graphics or waypoints spawned or generated by the AR system, the AR system may guide a user to the spawned waypoints within the user's environment. FIG. 30 illustrates an example guidance process 2800 for guiding the user to a waypoint or waypoints within the user's environment using an indicator ring graphic. Example indicator ring stages are illustrated in FIGS. 31A and 31B. The indicator ring graphic is one example of a graphic that may be used to identify waypoints and encourage movement of the user towards the waypoints. In other implementations, any other graphics and/or audio guides may be provided to the user. For example, the process 2800 can include a Field of View determination block 2810, an outside FOV guidance block 2812, an inside FOV guidance block 2814, an update block 2816, an activation determination block 2818, and an end block 2820.

At a Field of View determination block 2810, the AR system can determine whether a waypoint is in the user's Field of View (FOV). The waypoint may be considered to be in the user's FOV if some or all of the graphic is within the user's FOV. For example, the AR system may determine that a waypoint is within the FOV of the user if a threshold portion of the waypoint is within the user's FOV. The threshold portion can include 10 percent, 25 percent, 50 percent, or another percentage. Additionally or alternatively, the AR system may determine whether the waypoint is hidden within the FOV of the user (e.g., behind an object in the user's environment). If the AR system determines that the waypoint is hidden within the FOV of the user, the AR system may treat the waypoint as being outside the user's FOV. Additionally or alternatively, the AR system may relocate the hidden waypoint to a location that is not hidden within the user's FOV and guide the user to the new location, such as with an animation that moves the waypoint to a non-occluded location. If the AR system determines that the waypoint is within the FOV of the user, the AR system may guide the user to the waypoint using a different graphic than if the AR system determines that the waypoint is outside the FOV of the user. For example, if the AR system determines that the waypoint is outside the user's FOV, the AR system may use a partial ring, such as illustrated in FIG. 29A to guide the user to the waypoint at block 2812. If the AR system determines that the waypoint is within the user's FOV, the AR system may use a full ring, such as illustrated in FIG. 29B to guide the user to the waypoint at block 2814.

At an outside FOV guidance block 2812, the AR system may guide a user to a waypoint outside of the user's FOV as determined at block 2810. For example, the AR system may visually, audibly, or otherwise indicate a direction for the user to move to find a displayed waypoint. For example, the AR system may display a partial ring graphic 2910, such as illustrated in FIG. 31A. The partial ring graphic 2910 may have a curvature. The curvature may have a peak. The peak may indicate a direction to travel, look, or scan to find a waypoint, such as up, down, left, or right. Additionally or alternatively, the partial ring graphic 2910 can include a number of bubbles or particles arranged in an arc. The arc may have an increased density of bubbles or particles at a location along the arc in order to indicate a direction to travel, look, or scan to find a waypoint.

Returning to FIG. 28, at an inside FOV guidance block 2814, the AR system may guide a user to a waypoint within the user's FOV as determined at block 2810. For example, the AR system may visually, audibly, or otherwise indicate a direction for the user to move to find a displayed waypoint. For example, the AR system may display a ring graphic 2914 around a displayed waypoint 2916, such as illustrated in FIG. 31B. The ring 2914 may have a diameter greater than or equal to a width of the waypoint graphic 2916. For example, the ring 2914 may have a diameter twice the width of the waypoint graphic 2916. In some examples, the AR system may display the ring 2914 at a size dependent on the distance of the user from the waypoint location. In some examples, the AR system may display the ring 2914 at a fixed size until the user comes within a threshold distance of the waypoint location. In some examples, the AR system may display the ring 2914 around the waypoint 2916 while the waypoint 2916 is in the FOV of the user.

Returning to FIG. 28, at an update block 2816, the AR system may update a guiding graphic, such as a ring. For example, the AR system may determine a user proximity to a waypoint location. The AR system may change the appearance of the guiding graphic based on the user proximity. For example, the AR system may change the size of a ring to close in on the waypoint or displayed graphic. Additionally or alternatively, the AR system may play audio or generate haptic feedback to indicate a closeness to the waypoint.

At an activation determination block 2818, the AR system may determine whether the target waypoint has been activated. For example, the AR system may determine that the target waypoint has been activated by the user reaching a threshold proximity to the waypoint location. When the waypoint is activated, the AR system may display or indicate an acknowledgement to the user, such as described with reference to FIG. 32-34C. For example, the AR system may display an animation, an audible acknowledgement, and/or a haptic acknowledgement such as described with reference to FIG. 31. If the waypoint is activated or the guiding process is otherwise stopped, the AR system may determine a new target waypoint and begin the process 2800 with a new target waypoint. In another example, the AR system may end the guiding process 2800. If the waypoint is not activated, the AR system may continue the guiding process 2800 with the current waypoint by, for example, beginning the process again at block 2810.

P. Example Waypoint Activation Process

Figure 29:
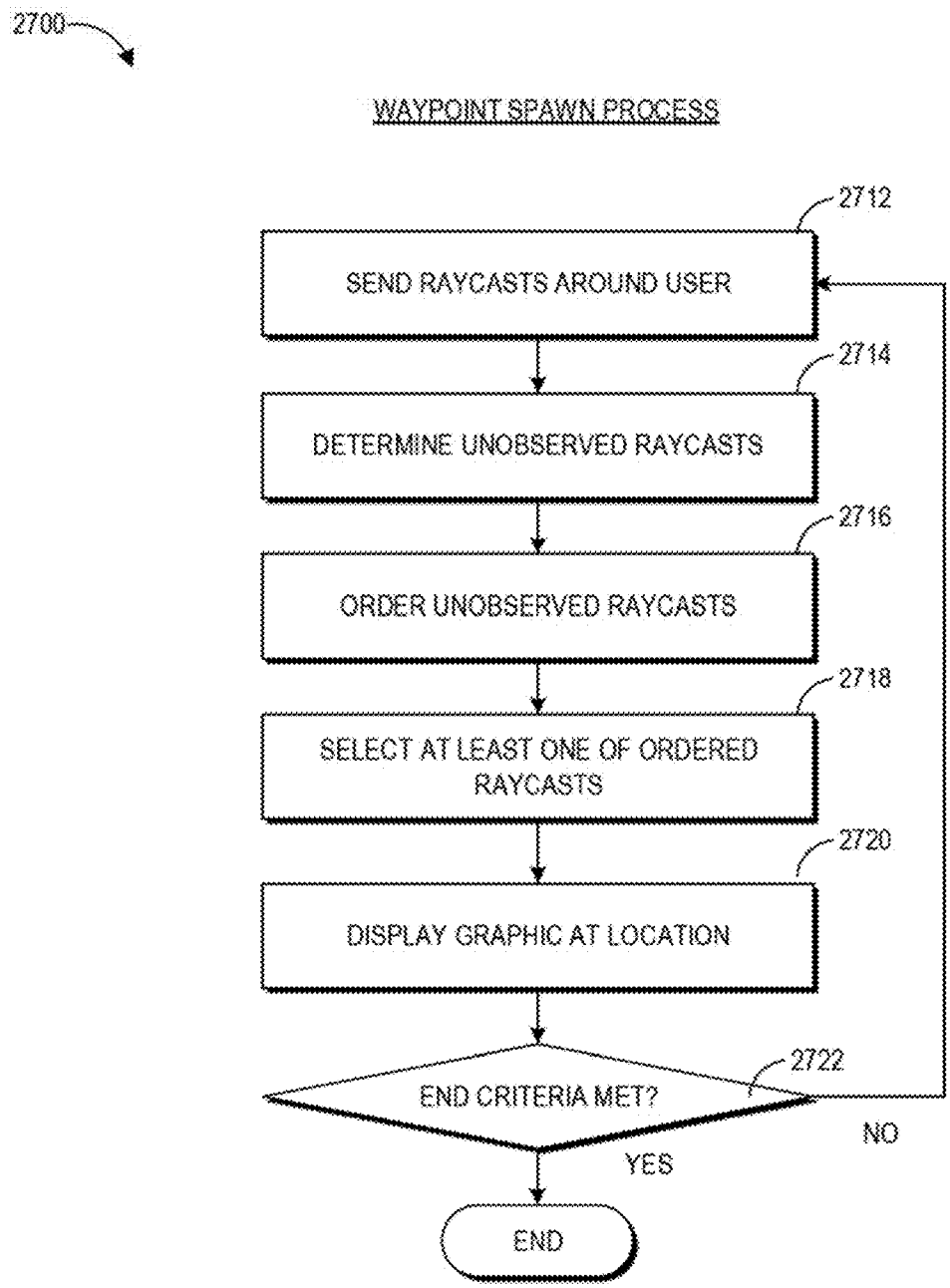
FIG. 29 illustrates an example waypoint spawning process.
Figure 32:
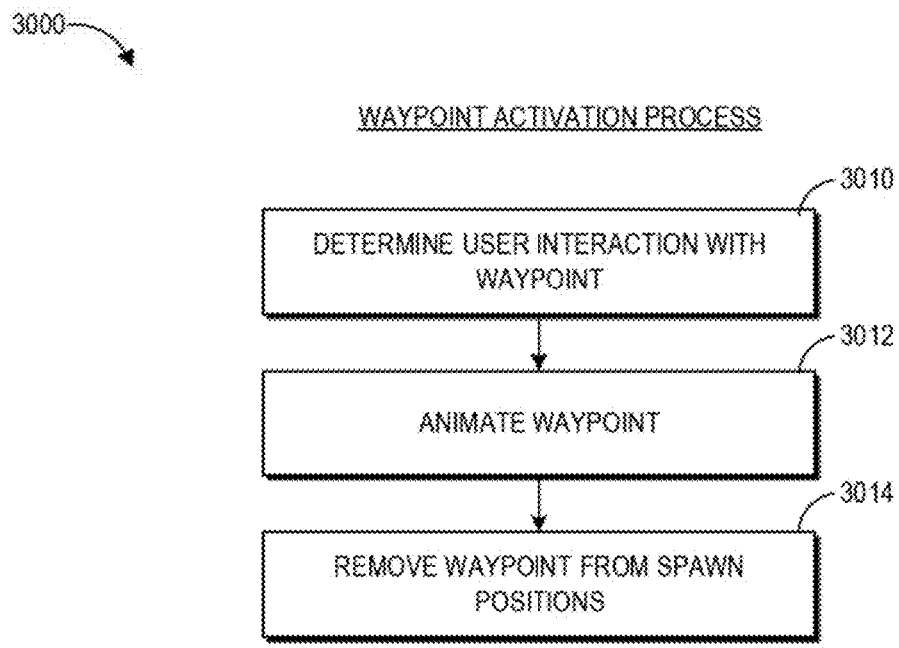
FIG. 32 illustrates an example waypoint activation process.

Once an AR system has successfully guided a user to a waypoint location (by, for example, the guidance process described with reference to FIG. 29), the AR system may trigger an activation process associated with the waypoint activation. The activation process can include storing information associated with the user's environment near the waypoint and indicating successful completion of the waypoint to the user through audiovisual or haptic feedback. FIG. 32 illustrates an example waypoint activation process 3000. The waypoint activation process 3000 can include an interaction determination block 3010, an animation block 3012, and a removal block 3014.

At an interaction determination block 3010, the AR system can determine a user interaction with a waypoint. In some examples, the interaction can include a user gaze or proximity with the waypoint. In another example, the interaction can include a selection of the waypoint by actuation of a user input device or other user input. If the interaction exceeds a threshold interaction, the AR system can animate the waypoint at block 3012.

At an animation block 3012, the AR system can display an indication of successful interaction or activation of the waypoint. For example, as discussed with reference to FIGS. 33-34C, the AR system can display an animation or series of graphics or generate audible or haptic feedback associated with the activation or interaction with the waypoint.

At a removal block 3014, the AR system can remove the waypoint from the list of waypoints to spawn or display that may have been generated as part of a waypoint spawn process, such as described with reference to FIG. 29. In examples where the AR system displays a single waypoint at a time or determines a single waypoint location at a time, there may not be a list of waypoints, and the AR system may dynamically determine a next waypoint to display to the user. Additionally or alternatively, the AR system may save the current waypoint location as a location already visited.

Figure 33:
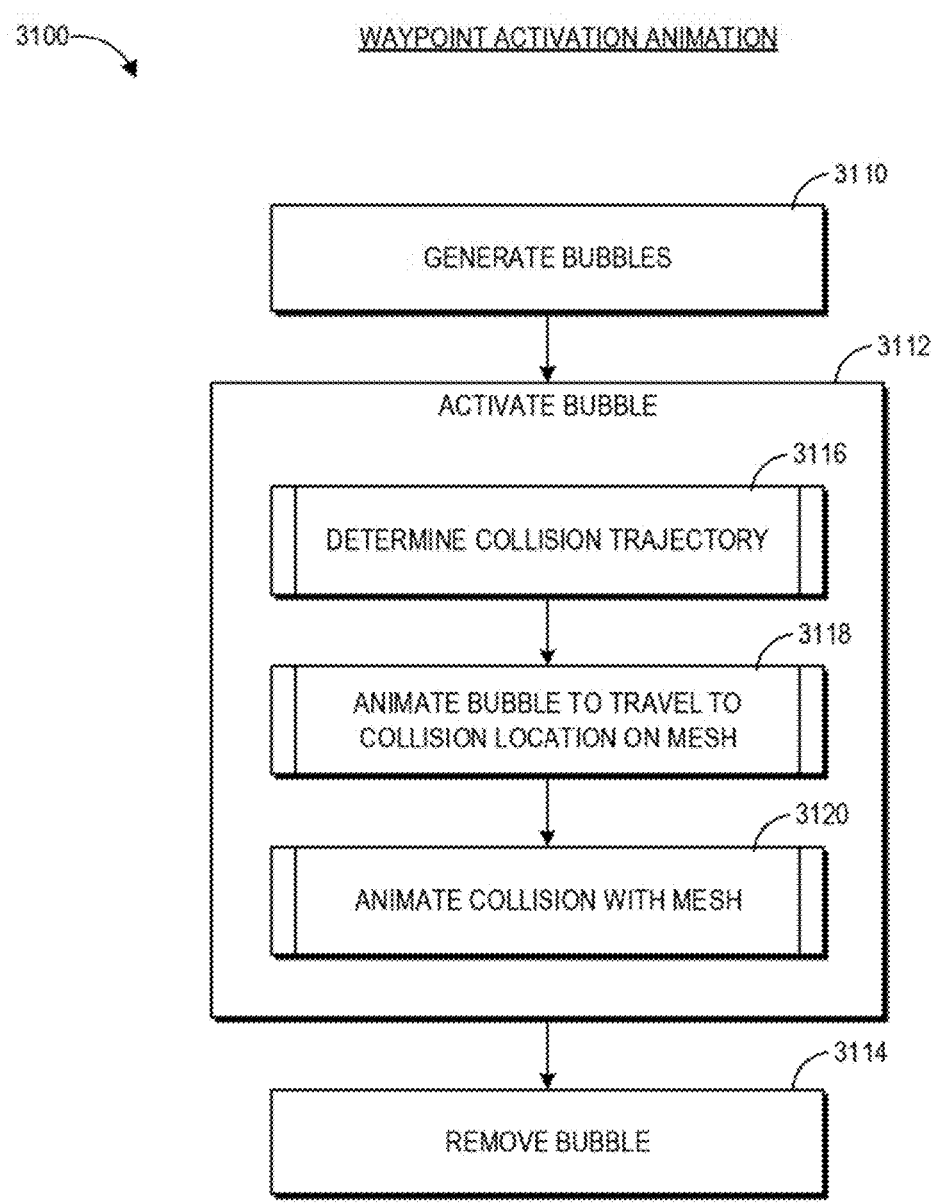
FIG. 33 illustrates an example waypoint animation process.

FIG. 33 illustrates an example waypoint animation process 3100 that may be performed to indicate activation of a waypoint. For example, the AR system can generate bubbles at block 3110, activate the bubbles at block 3112 by determining collision trajectory at block 3116, animating the bubble (e.g., to travel to a collision site in the user's environment), or animating the collision with an object or mesh within the user's environment, and removing the bubble from the display at block 3114. In other implementations, any other graphics and/or audio guides may be provided to the user as an indication of waypoint activation. In one example implementation, when the user activates their first waypoint, the AR system notifies them to "look around at the particles of light" (e.g., bubbles or some other visual effect). By looking at them, those particular bubbles will activate. This may have the beneficial side-effect of causing the user to look around their environment even more, thereby increasing their map quality. Thus, use of bubbles (and/or other visual effect) in this way may provide a fun visual/auditory reward to the user but also serve a practical benefit.

Figure 34A:
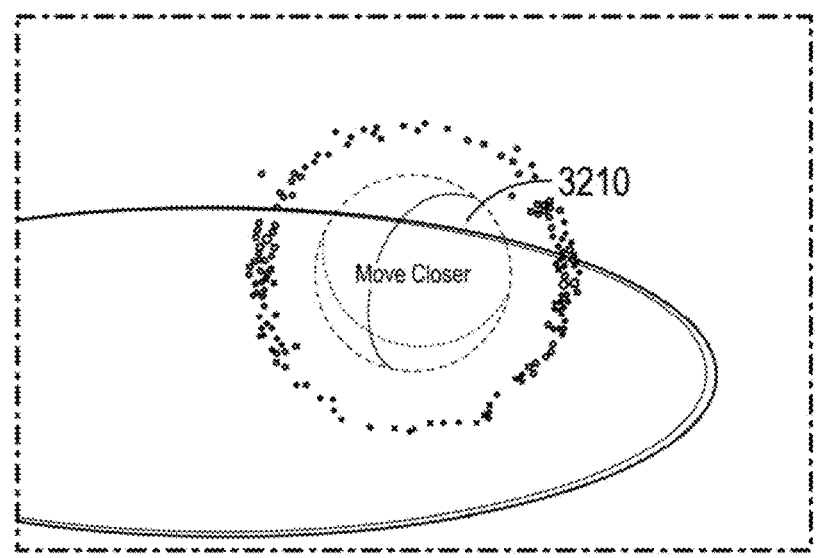
FIG. 34A-34C illustrate example stages of an example waypoint animation process.
Figure 34B:
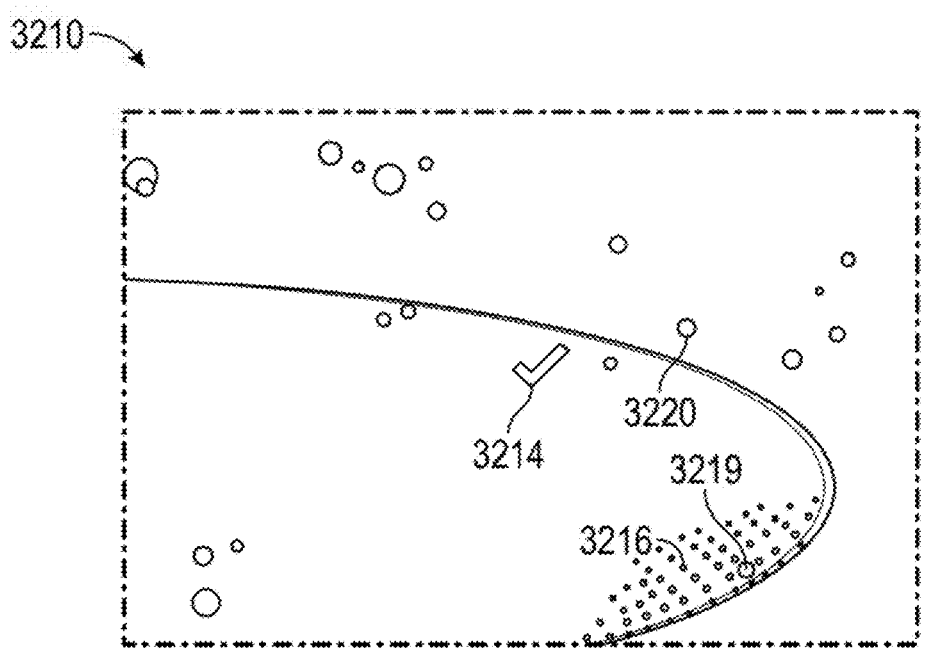

At block 3110, the AR system can generate one or more bubbles or other graphics. The bubbles or other graphics can be generated out of a waypoint. For example, as illustrated in FIG. 34A, a waypoint 3210 can include a graphic. Once the waypoint is activated such as described above, the AR system may pop or explode the waypoint into multiple smaller bubbles 3220, such as illustrated in FIG. 34B. The bubbles may be displayed at different points within the FOV of the user. For example, the bubbles may be displayed randomly within the user's FOV. In another example, the bubbles may be displayed such that the bubbles 3220 look as if the waypoint bubble 3210 has popped. Advantageously, locating the bubbles at dispersed points within the user's FOV can encourage the user to look around their environment near a waypoint location even more than they would without a bubble animation. The bubbles may be static or dynamic. In addition or in the alternative to the bubbles 3220, the AR system may display an indication 3214 of activation. The indication 3214 can include a check mark or other indication of successful activation. Additionally or alternatively, the AR system can play audio or generate haptic feedback associated with the indication.

In some examples, the AR system can direct the user to look at the bubbles (or other graphic surrounding or associated with a waypoint). When the AR system detects that the user has interacted with the bubbles or other graphic, the AR system may move to block 3116 to activate the bubbles. For example, the AR system may determine that the user has directed their gaze to a bubble. The AR system may then activate that bubble.

As discussed further below, in some implementations when a bubble is activated (e.g., by the user looking at it), the AR system calculates a close mesh to its location (that is also generally away from the user). The bubble then flies directly to that close mesh location and pops (e.g., triggering another animation). If there is no nearby mesh to the bubble, it may just fly away from the user and fade out without the larger pop animation. In some implementations, some or all bubbles that are activated may move in a random trajectory.

Figure 34C:
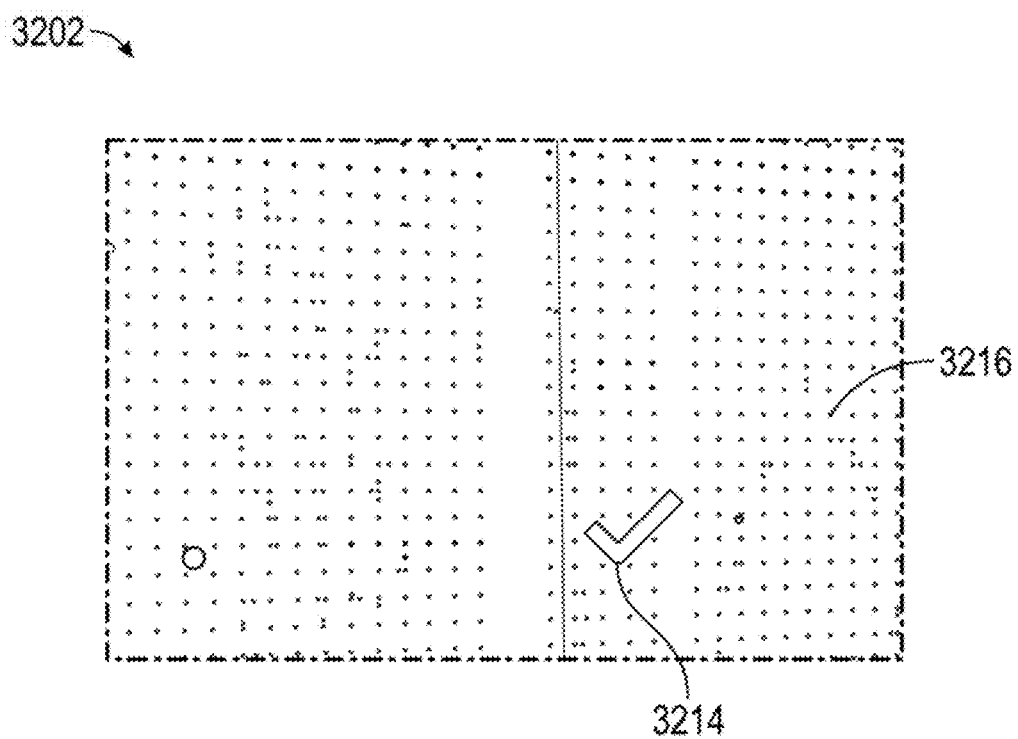

At block 3116, the AR system can determine a trajectory for one or more bubbles 3210. For example, the AR system can determine a direction of travel of the one or more bubbles 3210 within the user' environment. In some examples, the direction of travel of the bubble can follow a path from a point of origin, for example, a waypoint, to content within the user's environment, such as a mesh. For example, at least some of the bubbles may travel to areas of the mesh that were generated and/or updated through the user's activation of the waypoint. The AR system can select a trajectory of the bubbles 3210 towards the mesh or other content in the user's environment. At block 3118, the AR system can animate the bubbles 3210 to travel along the determined trajectory. At block 3120, the AR system may animate a collision between the bubbles 3210 and a mesh 3216 in the user's environment. For example, the AR system may display a collision 3218 and display a portion of the mesh 3216 around which the collision 3218 occurred. The AR system may continue to collide the bubbles 3210 until an end criteria is met. For example, the end criteria can include a display of a threshold portion of the calculated mesh 3216 in the user's environment. In another example, the end criteria can include a threshold number of displayed bubble collisions. At block 3114, once a bubble collision has occurred, the AR system can remove the bubble from the display. For example, the AR system may animate the bubble to dissipate by fading out the bubble or moving the bubble out of the FOV of the user. As illustrated in FIG. 34C, a result of the animation process 3100 can include a mesh 3216 that may be displayed in the area of the completed or activated waypoint 3214.

Q. Additional Examples

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein.

Example 1: an augmented reality (AR) system comprising: an AR display configured to present virtual content to a user of the AR system; an outward facing camera configured to capture one or more images of an environment of the user, wherein a portion of the environment of the user visible to the user comprises the Field of View (FOV) of the user; and a hardware processor in communication with the AR display and the outward facing camera, the hardware processor programmed to: generate a plurality of raycasts from a point of origin comprising a location associated with the head of the user; analyze the plurality of raycasts to identify a raycast associated with an unmapped location of the environment; update the virtual content to include a graphic associated with the unmapped location; collect data associated with the environment of the user; and in response to collecting sufficient data associated with the unmapped location, signal to the user that data was successfully collected.

Example 2: The AR system of Example 1, wherein the hardware processor is configured to direct the user to observe the graphic.

Example 3: The AR system of Examples 1 or 2, wherein the hardware processor is configured to in response to determining that there are additional unmapped locations within the environment, repeating said updating, directing, collecting, and signaling for the additional unmapped locations.

Example 4: The AR system of any one of Examples 1-3, wherein said updating, directing, collecting, and signaling is repeated until at least a minimum threshold of data associated with unmapped locations is obtained.

Example 5: The AR system of any one of Examples 1-4, wherein the hardware processor is further configured to: determine the presence of at least one persistent coordinate frame (PCF) in the environment of the user based on the collected data; wherein determining whether there are additional unmapped locations with the environment is based on the determination of whether at least one PCF is identified.

Example 6: The AR system of any one of Examples 1-5, wherein the hardware processor is further configured to: in response to determining presence of at least one PCF, load content associated with a saved map including the at least one PCF.

Example 7: The AR system of any one of Examples 1-6, wherein to analyze the plurality of raycasts, the hardware processor is configured to, for a raycast: determine a presence of a mesh along the raycast; calculate a distance of the mesh along the raycast; and determine a raycast type comprising a content type, no content type, or unobserved type based on the presence of the mesh, the presence of the content, and the distance of the mesh.

Example 8: The AR system of Example 7, wherein the content type comprises a raycast with content on the mesh within a maximum distance from at least one of: the user and other unobserved locations.

Example 9: The AR system of Example 8, wherein the maximum distance is 2 meters.

Example 10: The AR system of any one of Examples 7-9, wherein the no content type comprises a raycast with no content on the mesh within the maximum distance.

Example 11: The AR system of any one of Examples 7-10, wherein the unobserved type comprises a raycast with unknown content within the maximum distance.

Example 12: The AR system of any one of Examples 1-12, wherein the hardware processor is configured to display a graphic at a center of a FOV of the user.

Example 13: The AR system of Example 12, wherein the hardware processor is configured to display the graphic at the center of the FOV of the user prior to generating the graphic at the unobserved location.

Example 14: The AR system of any one of Examples 12-13, wherein the hardware processor is configured to: direct the user to observe the graphic at the center of the FOV of the user; and signal to the user that data was successfully collected near the at least one unobserved location, wherein the collected data comprises data associated with the center of the FOV of the user.

Example 15: The AR system of any one of Examples 1-14, wherein to signal to the user that data was successfully collected at the unobserved location, the hardware processor is configured to display an animation associated with the graphic at the unobserved location.

Example 16: The AR system of Example 15, wherein to display the animation, the AR system is configured to: generate at least one bubble associated with the graphic; determine a collision trajectory associated with the at least one bubble; animate the at least one bubble to move along the collision trajectory towards a collision location on a mesh associated with a map of the environment of the user; and display a collision of the at least one bubble with the mesh.

Example 17: The AR system of any one of Examples 1-16, wherein to direct a user to observe the graphic, the hardware processor is configured to display an indicator ring based on the unobserved location with respect to the position of the user.

Example 18: An augmented reality (AR) system comprising: an AR display configured to present virtual content to a user of the AR system; an outward facing camera configured to capture one or more images of an environment of the user, wherein a portion of the environment of the user visible to the user comprises the Field of View (FOV) of the user; and a hardware processor in communication with the AR display and the outward facing camera, the hardware processor programmed to: receive a user selection of a map; generate a plurality of raycasts from a point of origin comprising a location associated with the head of the user; analyze the plurality of raycasts to identify a raycast associated with an unmapped location of the environment; update the virtual content to include a graphic associated with the unmapped location; direct the user to observe the graphic; collect data associated with the environment of the user; in response to collecting sufficient data associated with the unmapped location, signal to the user that data was successfully collected; and in response to determining that at least one marker within the collected data correspond to at least one marker in the map, displaying virtual reality content associated with the map; or in response to determining that no marker in the collected data corresponds to a marker in the map, repeating said updating, directing, collecting, and signaling for another unmapped location.

Example 19: The AR system of Example 18, wherein the at least one marker comprises at least one PCF.

Example 20: The AR system of any one of Examples 18-19, wherein to analyze the plurality of raycasts, the hardware processor is configured to, for a raycast: determine a presence of a mesh along the raycast; calculate a distance of the mesh along the raycast; and determine a raycast type comprising a content type, no content type, or unobserved type based on the presence of the mesh, the presence of the content, and the distance of the mesh.

Example 21: The AR system of Example 20, wherein the content type comprises a raycast with content on the mesh within a maximum distance from at least one of: the user and other unobserved locations.

Example 22: The AR system of Example 21, wherein the maximum distance is 2 meters.

Example 23: The AR system of any one of Examples 20-22, wherein the no content type comprises a raycast with no content on the mesh within the maximum distance.

Example 24: The AR system of any one of Examples 20-23, wherein the unobserved type comprises a raycast with unknown content within the maximum distance.

Example 25: The AR system of any one of Examples 18-25, wherein the hardware processor is configured to display a graphic at a center of a FOV of the user.

Example 26: The AR system of Example 25, wherein the hardware processor is configured to display the graphic at the center of the FOV of the user prior to generating the graphic at the unobserved location.

Example 27: The AR system of any one of Examples 25-26, wherein the hardware processor is configured to: direct the user to observe the graphic at the center of the FOV of the user; and signal to the user that data was successfully collected near the at least one unobserved location, wherein the collected data comprises data associated with the center of the FOV of the user.

Example 28: The AR system of any one of Examples 18-27, wherein to signal to the user that data was successfully collected at the unobserved location, the hardware processor is configured to display an animation associated with the graphic at the unobserved location.

Example 29: The AR system of Example 28, wherein to display the animation, the AR system is configured to: generate at least one bubble associated with the graphic;

determine a collision trajectory associated with the at least one bubble; animate the at least one bubble to move along the collision trajectory towards a collision location on a mesh associated with a map of the environment of the user; and display a collision of the at least one bubble with the mesh.

Example 30: The AR system of any one of Examples 18-29, wherein to direct a user to observe the graphic, the hardware processor is configured to display an indicator ring based on the unobserved location with respect to the position of the user.

Example 31: A method of creating or updating an augmented reality map of a user environment, the method performed by a computing system having one or more hardware computer processors and one or more non-transitory computer readable storage device storing software instructions executable by the computing system to perform the computerized method comprising: obtaining distance data from each of a plurality of directions around a user, the distance data indicating distances at which physical objects are detected in the respective direction; creating a ranked list of the waypoints associated with distance data having distances exceeding a threshold distance, wherein a waypoint associated with a largest distance is first in the ranked list; displaying a graphic positioned with reference to the highest ranked waypoint for viewing on an augmented reality (AR) device worn by a user, the graphic configured to direct the user to an area of the user environment wherein the augmented reality map is incomplete; detecting movement of the user that allows collection of data by the AR device associated with waypoint; determining whether additional waypoints in the ranked list remain; in response to determining that additional waypoints remain in the ranked list, performing said displaying, detecting, and determining with the next highest ranked waypoint.

Example 32: The method of Example 31, wherein the ranked list comprises six waypoints.

Example 33: The method of Example 31 or 32, wherein said displaying, detecting, and determining is repeated until at least a minimum threshold of data is collected.

Example 34: The method of any one of Examples 31-33, further comprising: determining the presence of at least one persistent coordinate frame (PCF) in the environment of the user based on the collected data.

Example 35: The method of any one of Examples 31-34, comprising: in response to determining presence of at least one PCF, load content associated with a saved map including the at least one PCF.

Example 36: The method of any one of Examples 31-35, comprising: displaying a graphic at a center of a FOV of the user.

Example 37: The method of Example 36, wherein the hardware processor is configured to display the graphic at the center of the FOV of the user prior to generating the graphic positioned with reference to the highest ranked waypoint.

Example 38: The method of Example 36 or 37, comprising detecting movement of the user that allows collection of data by the AR device associated with the center of the FOV of the user.

Example 39: The method of any one of Examples 31-38, comprising displaying an animation associated with the graphic at the positioned with reference to the highest ranked waypoint.

Example 40: The method of Example 39, wherein displaying the animation comprises:
a. generating at least one bubble associated with the graphic; determining a collision trajectory associated with the at least one bubble; animating the at least one bubble to move along the collision trajectory towards a collision location on a mesh associated with a map of the environment of the user; and displaying a collision of the at least one bubble with the mesh.

Example 41: The method of any one of Examples 31-40, comprising guiding the user to the waypoint.

Example 42: The method of Example 41, wherein guiding the user comprises displaying an indicator ring.

Example 43: An augmented reality (AR) system comprising:
an AR display configured to present virtual content to a user of the AR system;
an outward facing camera configured to capture one or more images of a three-dimensional (3D) environment of the user; and
a hardware processor in communication with the AR display and the outward facing camera, the hardware processor programmed to:
receive an invitation to access a shared map;
facilitate user access to the shared map;
guide the user to observe the 3D environment of the user;
collect data associated with the 3D environment of the user; and
load content associated with the shared map if data associated with the shared map is found in the 3D environment of the user.

Example 44: The AR system of Example 43, wherein the hardware processor is further configured to:
determine the presence of at least one persistent coordinate frame (PCF) in the environment of the user based on the collected data; wherein determining whether data associated with the shared map is found in the 3D environment of the user is based on the determination of whether at least one PCF associated with the shared map is identified in the collected data.

Example 45: The AR system of any one of Examples 43-44, wherein to load content, the hardware processor is configured to: in response to determining presence of at least one PCF, load content associated with the shared map including the at least one PCF.

Example 46: The AR system of any one of Examples 43-45, wherein the hardware processor is configured to display a graphic at a center of a FOV of the user.

Example 47: The AR system of Example 46, wherein the hardware processor is configured to display the graphic at the center of the FOV of the user prior to generating a graphic at an unobserved location.

Example 48: The AR system of any one of Examples 43-47, wherein the hardware processor is configured to:
direct the user to observe the graphic at the center of the FOV of the user; and
signal to the user that data was successfully collected near the at least one unobserved location,
wherein the collected data comprises data associated with the center of the FOV of the user.

Example 49: The AR system of any one of Examples 43-48, wherein to signal to the user that data was successfully collected at the unobserved location, the hardware processor is configured to display an animation associated with the graphic at the unobserved location.

Example 50: The AR system of Example 49, wherein to display the animation, the AR system is configured to:
  generate at least one bubble associated with the graphic;
  determine a collision trajectory associated with the at least one bubble;
  animate the at least one bubble to move along the collision trajectory towards a collision location on a mesh associated with a map of the environment of the user; and
  display a collision of the at least one bubble with the mesh.

Example 51: The AR system of any one of Examples 43-50, wherein the shared map comprises a map stored at location external to the AR display.

Example 52: The AR system of any one of Examples 43-51, wherein the shared map comprises a map accessible to multiple AR devices or multiple users.

Example 53: The AR system of any one of Examples 43-52, wherein to direct a user to observe the graphic, the hardware processor is configured to display an indicator ring based on the unobserved location with respect to the position of the user.

Example 54: The AR system of any one of Examples 43-53, wherein the hardware processor is configured to:
  identify a map to store;
  determine a storage location comprising on-device storage or off-device storage;
  determine one or more user permissions associated with the identified map, wherein the one or more user permissions comprises an authorization of one or more users to access the identified map; and
  store the identified map based on the determined storage location and determined one or more user permissions.

Example 55: An augmented reality (AR) system comprising:
  an AR display configured to present virtual content to a user of the AR system;
  an outward facing camera configured to capture one or more images of a three-dimensional (3D) environment of the user; and
  a hardware processor in communication with the AR display and the outward facing camera, the hardware processor programmed to:
  receive user input to update a map;
  guide the user to observe the 3D environment of the user;
  collect data associated with the 3D environment of the user;
  determine a map quality index associated with the map;
  display an indication of the map quality index on the AR display;
  update the map based on the collected data; and
  stop guiding the user in response to identifying a stopping condition comprising a user input to stop or a determination that the map quality index passes a threshold.

Example 56: The AR system of Example 55, wherein the map quality index is based on a percentage of the 3D environment that has associated collected data.

Example 57: The AR system of any one of Examples 55-56, wherein the hardware processor is configured to display a graphic at a center of a FOV of the user.

Example 58: The AR system of Example 57, wherein the hardware processor is configured to display the graphic at the center of the FOV of the user prior to generating a graphic at an unobserved location.

Example 59: The AR system of any one of Examples 55-58, wherein the hardware processor is configured to:
  direct the user to observe the graphic at the center of the FOV of the user; and
  signal to the user that data was successfully collected near at least one unobserved location,
  wherein the collected data comprises data associated with the center of the FOV of the user.

Example 60: The AR system of any one of Examples 55-59, wherein to signal to the user that data was successfully collected at the unobserved location, the hardware processor is configured to display an animation associated with the graphic at the unobserved location.

Example 61: The AR system of Example 60, wherein to display the animation, the AR system is configured to:
  generate at least one bubble associated with the graphic;
  determine a collision trajectory associated with the at least one bubble;
  animate the at least one bubble to move along the collision trajectory towards a collision location on a mesh associated with a map of the environment of the user; and
  display a collision of the at least one bubble with the mesh.

Example 62: The AR system of any one of Examples 55-61, wherein to direct a user to observe the graphic, the hardware processor is configured to display an indicator ring based on the unobserved location with respect to the position of the user.

Any of the above examples may be combined in any suitable combination.

R. Other Considerations

Each of the processes, methods, and algorithms described herein or depicted in the attached figures may be embodied in, and fully or partially automated by, code modules executed by one or more physical computing systems, hardware computer processors, application-specific circuitry, or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations or embodiments shown herein but are to be accorded the widest scope consistent with this disclosure, the principles and the novel features disclosed herein.

Certain features that are described in this specification in the context of separate implementations or embodiments also can be implemented in combination in a single implementation or embodiment. Conversely, various features that are described in the context of a single implementation or embodiment also can be implemented in multiple implementations or embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without author input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An augmented reality (AR) system comprising:
an AR display configured to present virtual content to a user of the AR system;
an outward facing camera configured to capture one or more images of an environment of the user, wherein a portion of the environment of the user visible to the user comprises a Field of View (FOV) of the user; and
a hardware processor in communication with the AR display and the outward facing camera, the hardware processor programmed to:
generate a raycast from a point of origin comprising a location associated with the head of the user;
access a map that includes mesh data indicative of real objects in the environment;
determine a presence of a mesh along the raycast;
calculate a distance of the mesh along the raycast;
determine a raycast type comprising a content type, no content type, or unobserved type based on the presence of the mesh, the presence of content, and the distance of the mesh;
determine an unmapped location of the map based at least on the raycast type;
update the virtual content to include a graphic associated with the unmapped location;
collect data associated with the environment of the user; and
in response to collecting sufficient data associated with the unmapped location, signal to the user that data was successfully collected.

2. The AR system of claim 1, wherein the hardware processor is configured to direct the user to observe the graphic.

3. The AR system of claim 2, wherein the hardware processor is configured to, in response to determining that there are additional unmapped locations within the environment, repeat said updating, directing, collecting, and signaling for the additional unmapped locations.

4. The AR system of claim 2, wherein said updating, directing, collecting, and signaling is repeated until at least a minimum threshold of data associated with unmapped locations is obtained.

5. The AR system of claim 1, wherein the hardware processor is further configured to:
determine presence of at least one persistent coordinate frame (PCF) in the environment of the user based on the collected data; wherein determining whether there are additional unmapped locations within the environment is based on the determination of whether at least one PCF is identified.

6. The AR system of claim 1, wherein the hardware processor is further configured to:
in response to determining presence of at least one PCF, load content associated with a saved map including the at least one PCF.

7. The AR system of claim 1, wherein the content type comprises a raycast with content on the mesh within a maximum distance from at least one of: the user and other unobserved locations.

8. The AR system of claim 1, wherein the no content type comprises a raycast with no content on the mesh within a maximum distance.

9. The AR system of claim 1, wherein the unobserved type comprises a raycast with unknown content within a maximum distance.

10. A computerized method, performed by an augmented reality (AR) system comprising an AR display configured to present virtual content to a user of the AR system, an outward facing camera configured to capture one or more images of an environment of the user, wherein a portion of the environment of the user visible to the user comprises a Field of View (FOV) of the user, and a hardware processor programmed to:
generate a raycast from a point of origin comprising a location associated with the head of the user;
access a map that includes mesh data indicative of real objects in the environment;
determine a presence of a mesh along the raycast;
calculate a distance of the mesh along the raycast;
determine a raycast type comprising a content type, no content type, or unobserved type based on the presence of the mesh, the presence of content, and the distance of the mesh;
determine an unmapped location of the map based at least on the raycast type;
update the virtual content to include a graphic associated with the unmapped location;
collect data associated with the environment of the user; and
in response to collecting sufficient data associated with the unmapped location, signal to the user that data was successfully collected.

* * * * *